United States Patent
Togino

(12) 
(10) Patent No.: US 6,310,736 B1
(45) Date of Patent: Oct. 30, 2001

(54) IMAGE-FORMING OPTICAL SYSTEM AND VIEWING OPTICAL SYSTEM

(75) Inventor: Takayoshi Togino, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/332,155

(22) Filed: Jun. 14, 1999

(30) Foreign Application Priority Data

Aug. 21, 1998 (JP) .................................. 10-235724

(51) Int. Cl.[7] ............................. G02B 5/04; G02B 27/14

(52) U.S. Cl. ........................ 359/834; 359/631; 359/633; 359/637

(58) Field of Search ...................................... 359/833, 834, 359/836, 837, 726, 727, 728, 729, 730, 731, 732, 631, 633, 365, 366, 637; 345/7, 8

(56) References Cited

U.S. PATENT DOCUMENTS

| | | | |
|---|---|---|---|
| 5,663,833 | * 9/1997 | Nanba et al. | 359/631 |
| 5,699,194 | 12/1997 | Takahashi . | |
| 5,701,202 | 12/1997 | Takahashi . | |
| 5,745,295 | 4/1998 | Takahashi . | |
| 5,751,494 | * 5/1998 | Takahashi | 359/631 |
| 5,812,323 | * 9/1998 | Takahashi | 359/630 |
| 6,084,715 | * 7/2000 | Aoki et al. | 359/627 |
| 6,094,315 | * 7/2000 | Aoki | 359/731 |

OTHER PUBLICATIONS

European Abstract, Dialog(R)File 352: Derwent WPI, 1999, No. 010534976, Japanese Patent Pub. 7–333551 Jun. 1994, EPA 687932 Abst Dec. 1995.

European Abstract, Dialog(R)File 352: Derwent WPI, 1999, No. 011965452, Japanes Patent Pub. 10–153748 Jun. 1998.

European Abstract, Dialog(R)File 352: Derwent WPI, 1999, No. 010585485, Japanese Patent Pub. 07–333505 Dec. 1995.

Patent Abstracts of Japan, Pub. No. 08–292,368 Nov. 1996.
Patent Abstracts of Japan, Pub. No. 08–292,371 Nov. 1996.
Patent Abstracts of Japan, Pub. No. 08–292,372 Nov. 1996.

European Abstract, Dialog(R)File 352: Derwent WPI, 1999, No. 011144717, Japanese Patent Pub. 09–005650 Nov. 1997.

European Abstract, Dialog(R)File 352: Derwent WPI, 1999, No. 011662889, Japanese Patent Pub. 09–090229 Apr. 1997.

European Abstract, Dialog(R)File 352: Derwent WPI, 1999, No. 011459296, Japanese Patent Pub. 09–211331 Nov. 1996.

(List continued on next page.)

*Primary Examiner*—Cassandra Spyrou
*Assistant Examiner*—Euncha Cherry
(74) *Attorney, Agent, or Firm*—Pillsbury Winthrop LLP

(57) ABSTRACT

A viewing optical system and image-forming optical system in which an intermediate image is formed once and two decentered prisms, i.e. first and second prisms, are arranged to correct each other's decentration aberrations, thereby attaining a wide viewing field angle and a short focal length. The second prism is placed closer to the object side than the first prism and has three optical surfaces, of which a first surface is an entrance surface also serving as a reflecting surface, a second surface is a reflecting surface, and a third surface is an exit surface. At least one of the first and second surfaces has a rotationally asymmetric surface configuration that gives a power to a light beam and corrects aberrations due to decentration. The first prism has a reflecting surface, an entrance surface, and an exit surface. The reflecting surface has a rotationally asymmetric surface configuration that gives a power to a light beam and corrects aberrations due to decentration. An intermediate image surface is formed between the first surface of the second prism and the exit surface of the first prism.

82 Claims, 27 Drawing Sheets

OTHER PUBLICATIONS

European Abstract, Dialog(R)File 352: Derwent WPI, 1999, No. 011426976, Japanese Patent Pub. 09–222561 Feb. 1996.

European Abstract, Dialog(R)File 352: Derwent WPI, 1999, No. 011498469, Japanese Patent Pub. 09–222563 Aug. 1997, EP 790513 Abst Aug. 1997.

European Abstract, Dialog(R)File 352: Derwent WPI, 1999, No. 011529109, Japanese Patent Pub. 09–258105 Mar. 1996.

European Abstract, Dialog(R)File 352: Derwent WPI, 1999, No. 011529109, Japanese Patent Pub. 09–258106 Mar. 1993, EP 802436 A2 Oct. 1997.

European Abstract, Dialog(R)File 352: Derwent WPI, 1999, No. 011426976, Japanese Patent Pub. 10–020196 Jul. 1996, EP 790513 A2 Aug. 1997.

* cited by examiner

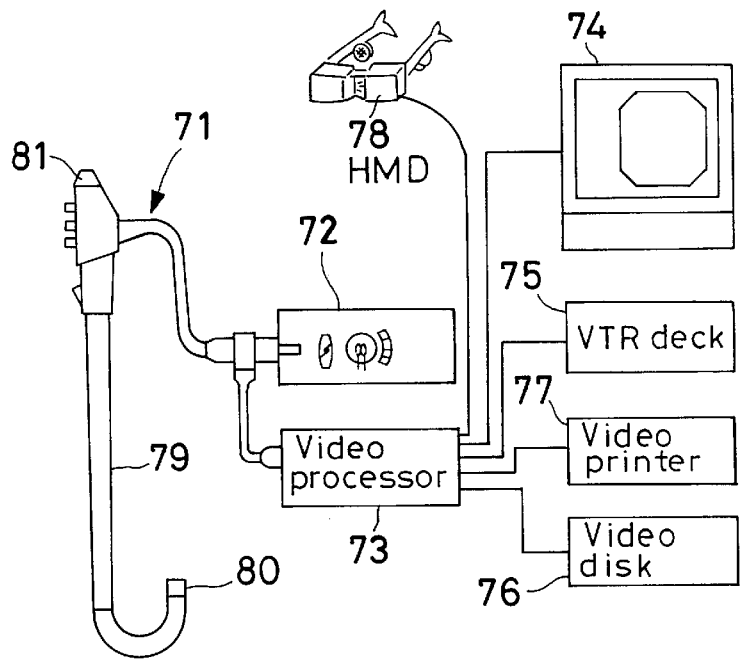
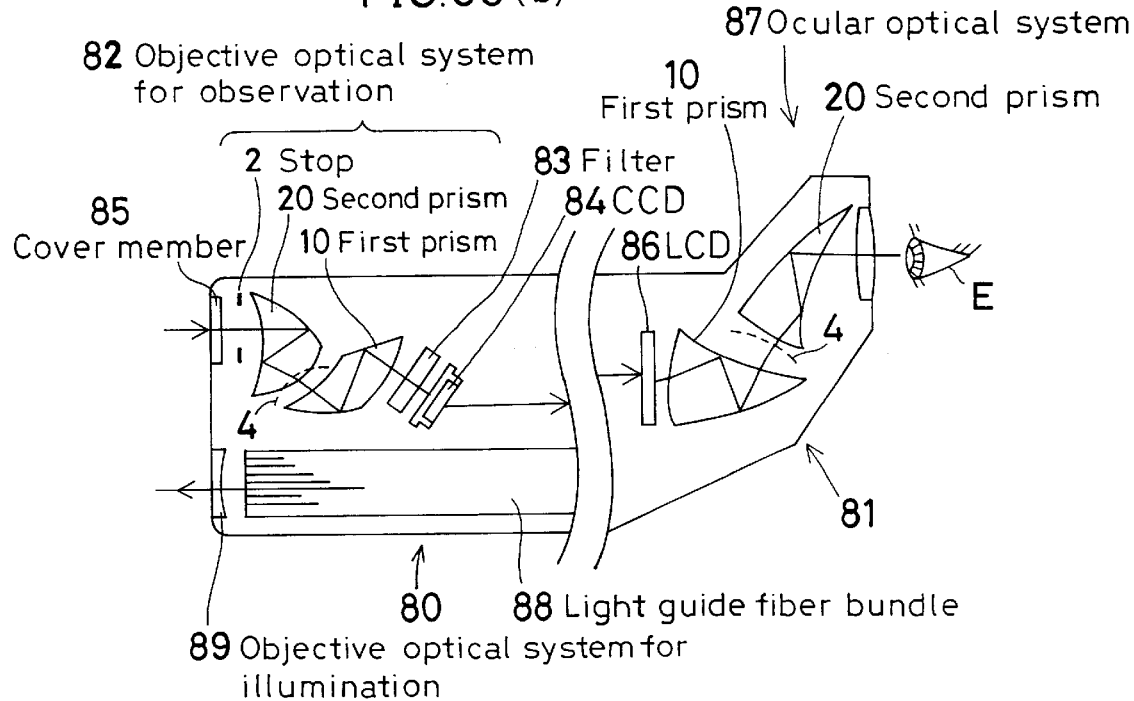

IMAGE-FORMING OPTICAL SYSTEM AND VIEWING OPTICAL SYSTEM

BACKGROUND OF THE INVENTION

The present invention relates to image-forming optical systems and viewing optical systems. More particularly, the present invention relates to decentered optical systems with a reflecting surface having a power for use in optical apparatus using a small-sized image pickup device, e.g. video cameras, digital still cameras, film scanners, and endoscopes, and also in optical apparatus using a small-sized image display device, e.g. head-mounted image display apparatus.

In recent years, head- or face-mounted image display apparatus have been developed for the purpose of enabling the user to enjoy a wide-screen image personally.

Japanese Patent Application Unexamined Publication Number [hereinafter referred to as "JP(A)"]7-333551 proposes an ocular optical system that leads an image displayed on an image display device to an observer's eyeball. The ocular optical'system is formed from a decentered prism optical system having three optical surfaces that face each other across a medium having a refractive index larger than 1. A light beam from a liquid crystal display device is made to enter the decentered prism optical system through the third surface thereof. Then, the light beam is totally reflected in the decentered prism optical system by the first surface thereof. The reflected light beam is internally reflected by the second surface, which is a concave mirror, so as to exit from the decentered prism optical system through the first surface, which serves as both reflecting and transmitting surfaces, thereby leading the image displayed on the image display device to an observer's eyeball without forming an intermediate image.

In this case, the number of optical surfaces constituting the decentered prism optical system is three, and the number of reflections in the decentered prism optical system is two. The present applicant et al. have proposed various types of decentered prism optical systems in which the number of constituent optical surfaces is two or four or more and the number of reflections is one or more. The present applicant has also proposed using such a decentered prism optical system as an image-forming optical system, e.g. an objective optical system of a camera.

JP(A) 10-153748 proposes an ocular optical system in which a relay lens system and a decentered prism optical system are combined together so that an image displayed on an image display device is led to an observer's eyeball after an intermediate image has been formed once by the relay optical system. The decentered prism optical system has three optical surfaces, and three reflections take place in the decentered prism optical system.

Incidentally, when an image display device used in an image display apparatus is compact in size, the viewing field angle cannot be widened unless the focal length of the ocular optical system is shortened. However, when the focal length of the ocular optical system is shortened, the exit pupil position comes close to the optical system. Therefore, it has heretofore been impossible to construct an ocular optical system having a short focal length while ensuring the required eye point distance.

In JP(A) 10-153748, a rotationally symmetric optical system is used in a relay optical system that forms an intermediate image. However, the ocular optical system in JP(A) 10-153748 uses a decentered prism optical system in an optical system that projects the intermediate image at a distant place. Therefore, decentration aberrations are produced by the decentered prism. In particular, when the image display device has a high display density, the ocular optical system is required to have optical performance that provides very high resolution. However, it is very difficult to reduce aberrations due to decentration, particularly the tilt of a first image-formation plane with respect to the principal ray, rotationally asymmetric curvature of field and rotationally asymmetric astigmatism. Such decentration aberrations cannot be corrected simply by tilting a rotationally symmetric relay optical system as in JP(A) 10-153748. The decentration aberrations can be corrected to a certain extent by using a free-form surface. However, it is impossible to correct decentration aberrations completely.

SUMMARY OF THE INVENTION

In view of the above-described problems of the prior art, an object of the present invention is to provide a viewing optical system and image-forming optical system in which an intermediate image is formed once and two decentered prisms are arranged to correct each other's decentration aberrations, thereby attaining a wide viewing field angle and a short focal length.

To meet the above-described demand, the present invention uses two decentered prism optical systems (a first prism and a second prism) as a viewing optical system (ocular optical system) or an image-forming optical system so that the two decentered prism optical systems correct each other's decentration aberrations, thereby making it possible to correct decentration aberrations almost completely.

To attain the above-described object, the present invention provides an image-forming optical system for forming an image of an object. The image-forming optical system has a first prism and a second prism, each of which is formed from a medium having a refractive index (n) larger than 1 (n>1). The second prism is placed closer to the object than the first prism.

The second prism has three optical surfaces, i.e. a first surface, a second surface, and a third surface, which transmit or reflect a light beam. The first surface allows a light beam from the object side to enter the second prism. The second surface reflects the light beam entering through the first surface in the second prism. The first surface also reflects the light beam reflected from the second surface in the second prism. The third surface allows the light beam reflected from the first surface to exit from the second prism. At least one of the first and second surfaces has a curved surface configuration that gives a power to a light beam. The curved surface configuration has a rotationally asymmetric surface configuration that corrects aberrations due to decentration.

The first prism has at least a decentered reflecting surface that has a curved surface configuration and internally reflects a light beam in the medium; an entrance surface through which a light beam enters the first prism; and an exit surface through which the light beam exits from the first prism. The reflecting surface has a rotationally asymmetric surface configuration that gives a power to a light beam and corrects aberrations due to decentration.

An intermediate image surface is formed between the first surface of the second prism and the exit surface of the first prism.

In addition, the present invention provides a viewing optical system that forms an exit pupil for viewing an observation image.

The viewing optical system has a first prism and a second prism, each of which is formed from a medium having a refractive index (n) larger than 1 (n>1). The second prism is placed closer to the exit pupil than the first prism.

The first prism has at least a decentered reflecting surface that has a curved surface configuration and internally reflects a light beam in the medium; an entrance surface through which a light beam from the observation image enters the first prism; and an exit surface through which the light beam exits from the first prism. The reflecting surface has a rotationally asymmetric surface configuration that gives a power to a light beam and corrects aberrations due to decentration.

The second prism has three optical surfaces, i.e. a first surface, a second surface, and a third surface, which transmit or reflect a light beam. The third surface allows the light beam exiting from the first prism to enter the second prism. The first surface reflects the light beam entering through the third surface in the second prism. The second surface reflects the light beam reflected from the first surface in the second prism. The first surface also allows the light beam reflected from the second surface to exit from the second prism. At least one of the first and second surfaces has a curved surface configuration that gives a power to a light beam. The curved surface configuration has a rotationally asymmetric surface configuration that corrects aberrations due to decentration.

An intermediate image surface is formed between the first surface of the second prism and the entrance surface of the first prism.

The reasons for adopting the above-described arrangements in the present invention, together with the functions thereof, will be described below.

First, let us describe the relationship between the image-forming optical system and viewing optical system according to the present invention. The viewing optical system is arranged as follows. An image displayed on an image display device or the like, which is placed in the vicinity of the entrance surface of the optical system, is projected at a distant place so that the displayed image can be observed as an enlarged image with an observer's eyeball. In the image-forming optical system, an image of an object located at a distant place is formed on an image plane located in the vicinity of the exit surface of the image-forming optical system, and the image thus formed is viewed as an enlarged image through an ocular optical system. Alternatively, the image thus formed is converted into an image signal or recorded by an image pickup device or the like. Thus, the image-forming optical system and the viewing optical system are the same in terms of the optical system. The optical system can be used as either of the image-forming optical system and the viewing optical system by reversing the optical path. More specifically, the image-forming optical system can be used as the viewing optical system by placing an image display device or the like in the image plane of the image-forming optical system and placing an observer's eyeball on the object light entrance side of the image-forming optical system. In the following description of the present invention, the image-forming optical system according to the present invention will be described as the viewing optical system (ocular optical system) unless otherwise specified. It should, however, be noted that the viewing optical system according to the present invention can be used as the image-forming optical system by reversing the optical path as stated above.

The present invention has succeeded in constructing an optical system capable of providing a viewing field angle of 30 degrees with a focal length of about 10 millimeters by combining together a relay optical system formed from a single decentered prism (first prism) and an ocular optical system formed from a single decentered prism (second prism). The feature of the present invention resides in that two decentered prisms are used to correct each other's decentration aberrations, thereby attaining an ocular optical system of the type in which an intermediate image is formed, and which has a short focal length and a wide viewing field angle and provides a sufficiently long eye point distance.

In this case, it is desirable to arrange the viewing optical system such that the relay optical system, which is formed from the first prism, projects a first image of an image display device in the form of a curved image, and an afocal optical system part that is formed from the second prism forms the curved first image as an enlarged flat virtual image.

It is more desirable for the first prism to project the first image at a tilt to the principal ray. The reason for this is as follows. A surface of the second prism that is placed to face opposite to an observer's eyeball and has only a reflecting action is decentered to a considerable extent. Because this surface is tilted with respect to the principal ray, the first image surface is tilted with respect to the principal ray. Therefore, the first prism is arranged to tilt the first image surface in advance so as to correct the tilt of the first image surface. This makes it possible to reduce the load of correcting decentration aberrations that is imposed on the second prism.

More specifically, the viewing optical system according to the present invention is a viewing optical system that forms an exit pupil for viewing an observation image. The viewing optical system has a first prism and a second prism, each of which is formed from a medium having a refractive index (n) larger than 1 (n>1). The second prism is placed closer to the exit pupil than the first prism. The first prism has at least a decentered reflecting surface that has a curved surface configuration and internally reflects a light beam in the medium; an entrance surface through which a light beam from the observation image enters the first prism; and an exit surface through which the light beam exits from the first prism. The reflecting surface has a rotationally asymmetric surface configuration that gives a power to a light beam and corrects aberrations due to decentration. The second prism has three optical surfaces, i.e. a first surface, a second surface, and a third surface, which transmit or reflect a light beam. The third surface allows the light beam exiting from the first prism to enter the second prism. The first surface reflects the light beam entering through the third surface in the second prism. The second surface reflects the light beam reflected from the first surface in the second prism. The first surface also allows the light beam reflected from the second surface to exit from the second prism. At least one of the first and second surfaces has a curved surface configuration that gives a power to a light beam. The curved surface configuration has a rotationally asymmetric surface configuration that corrects aberrations due to decentration. An intermediate image surface is formed between the first surface of the second prism and the entrance surface of the first prism. The image-forming optical system according to the present invention is an image-forming optical system that forms an image of an object. The image-forming optical system has a first prism and a second prism, each of which is formed from a medium having a refractive index (n) larger than 1 (n>1). The second prism is placed closer to the object than the first prism. The first prism and the second prism are similar to those of the above-described viewing optical system. An intermediate image surface is formed between the first surface of the second prism and the exit surface of the first prism.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, a viewing optical system and an image-forming optical system are required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

In the present invention, two prisms are arranged to correct each other's decentration aberrations, thereby enabling not only axial aberrations but also off-axis aberrations to be favorably corrected. If only one prism is provided, decentration aberrations cannot completely be corrected as stated above.

For the reasons stated above, the present invention adopts a basic arrangement in which the optical system has a first prism and a second prism, the second prism being placed closer to the exit pupil than the first prism, and an intermediate image surface is formed between the first surface of the second prism and the entrance surface of the first prism (in the case of the viewing optical system).

As has been stated above, adopting the basic arrangement of the present invention makes it possible to obtain a compact viewing optical system and image-forming optical system, which have a smaller number of constituent optical elements than in the case of a refracting optical system or an optical system using a rotationally symmetric relay optical system and a decentered prism, and which exhibit favorable performance throughout the image field, from the center to the periphery thereof.

Incidentally, the second prism used in the present invention has three optical surfaces, i.e. a first surface, a second surface, and a third surface, which transmit or reflect a light beam. The third surface allows the light beam exiting from the first prism to enter the second prism. The first surface reflects the light beam entering through the third surface in the second prism. The second surface reflects the light beam reflected from the first surface in the second prism. The first surface also allows the light beam reflected from the second surface to exit from the second prism. At least one of the first and second surfaces has a curved surface configuration that gives a power to a light beam. The curved surface configuration has a rotationally asymmetric surface configuration that corrects aberrations due to decentration.

By forming the first surface of the second prism from a surface serving as both an exit surface and a reflecting surface as stated above, it is possible to obtain a wide viewing field angle for the size of the prism.

In the case of the viewing optical system, the position of an observer's eyeball, that is, the position of the exit pupil of the ocular optical system, is set outside the optical system. Therefore, it is preferable for the second prism to use a prism optical system of the type described above, in which a positive power can be given to a reflecting surface that is closest to the exit surface in the prism.

Let us define an axial principal ray by a ray from the object center that passes through the center of the stop and reaches the center of the image plane in the forward ray tracing in the case of the image-forming optical system and in the backward ray tracing in the case of the viewing optical system. It is desirable that at least one reflecting surface should be decentered with respect to the axial principal ray. If at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one of the surfaces constituting each prism used in the present invention should be a rotationally asymmetric surface. It is particularly preferable from the viewpoint of aberration correction that at least one reflecting surface of each prism should be a rotationally asymmetric surface.

The reasons for adopting the above-described arrangements in the present invention will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma, and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air.

Consequently, as shown in FIG. 38, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 39, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 40, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[ 1 + \sqrt{\{1 - (1+k)c^2 r^2\}} \right] + \sum_{j=2}^{66} C_j X^m Y^n \quad (a)$$

In Eq. (a), the first term is a spherical surface term, and the second term is a free-form surface term.

In the spherical surface term:

C: the curvature at the vertex k: a conic constant r=$\sqrt{(X^2+Y^2)}$

The free-form surface term is given by $$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y +$$

-continued $$C_{31}X^5Y^2 + C_{32}X^4Y^3 + C_{33}X^3Y^4 + C_{34}X^2Y^5 +$$
$$C_{35}XY^6 + C_{36}Y^7$$
$$\ldots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses a rotationally asymmetric surface.

If the first surface of the second prism is formed from a surface serving as both a reflecting surface and an exit surface (in the case of the viewing optical system) as stated above, the reflecting surface reflects the incident rays toward the second surface, which is a reflecting surface, at a large angle of deviation, and the second surface bends the rays at a small angle of deviation. Therefore, it is possible to reduce the thickness of the prism in the direction of the emergent rays.

In a case where the second prism is arranged as stated above, it is preferable to give a positive power to the second surface, which is a reflecting surface (a negative power may be locally present in the second surface).

It is desirable for the first surface of the second prism to serve as both a reflecting surface and a transmitting surface through which the light beam exits from the second prism by performing total reflection as the internal reflecting action of the first surface.

It is desirable for the first prism to have a decentered reflecting surface that has a curved surface configuration and internally reflects a light beam in the medium; an entrance surface through which a light beam from the observation image enters the first prism; and an exit surface through which the light beam exits from the first prism. In this case, it is desirable for the reflecting surface to have a rotationally asymmetric surface configuration that gives a power to a light beam and corrects aberrations due to decentration.

In the case of the viewing optical system (in the case of the image-forming optical system, the positions of the entrance and exit surfaces are reverse to those in the viewing optical system), the first prism may be formed from three optical surfaces: an exit surface serving as both a reflecting surface and a transmitting surface; a reflecting surface; and an entrance surface. Examples 1 to 6 (described later) correspond to this arrangement. The prism configuration is similar to the second prism. In this type of prism, the exit surface serves as both a second transmitting surface and a first reflecting surface.

Consequently, the first reflecting surface reflects the incident rays toward the second reflecting surface at a large angle of deviation, and the second reflecting surface bends the rays at a small angle of deviation. Therefore, it is possible to reduce the thickness of the prism in the direction of the emergent rays.

In the case of the viewing optical system (in the case of the image-forming optical system, the positions of the entrance and exit surfaces are reverse to those in the viewing optical system), the first prism may be formed from three optical surfaces: an entrance surface serving as both a reflecting surface and a transmitting surface; a reflecting surface; and an exit surface. Examples 7 to 12 (described later) correspond to this arrangement. In this type of prism, the entrance surface serves as both a first transmitting surface and a second reflecting surface. Consequently, the first reflecting surface bends the incident rays at a small angle of deviation, and the second reflecting surface reflects the rays toward the second transmitting surface at a large angle of deviation. Therefore, it is possible to reduce the thickness of the prism in the direction of the incident rays.

In addition, because a positive power can be given to the first reflecting surface, which has a small angle of deviation, it is possible to place the principal point of the first prism at a position on the image side of the prism in the case of the image-forming optical system and hence possible to lengthen the back focus. This arrangement is favorable for use in a case where a filter or the like is placed immediately in front of the image-formation plane.

In the present invention, the first prism may be formed from four optical surfaces, i.e. two reflecting surfaces that give a power to a light beam, an entrance surface, and an exit surface. Examples 13 to 18 (described later) correspond to this arrangement. With this configuration of the first prism, the degree of freedom for aberration correction increases, and thus the amount of aberration produced in the first prism is minimized. In addition, because the relative decentration between the two reflecting surfaces is small, aberrations produced by the two reflecting surfaces are corrected with these reflecting surfaces by canceling the aberrations each other. Therefore, the amount of aberration produced in the first prism is favorably small. It is more desirable that the two reflecting surfaces should have powers of different signs. By doing so, it is possible to enhance the effect of correcting each other's aberrations by the two reflecting surfaces and hence possible to obtain high resolution.

It is preferable to minimize the relative decentration between the first and second reflecting surfaces at points where the optical axis is reflected by the two reflecting surfaces. By doing so, it becomes possible to reduce the amount of decentration aberrations produced from the first prism, and the amount of rotationally asymmetric aberrations produced from the first prism reduces.

In the present invention, various types of decentered prisms can be used as the first prism, as stated later, in addition to the above-described three forms.

It should be noted that in each optical surface having both transmitting and reflecting actions in the first and second prisms according to the present invention, the reflecting action should desirably be total reflection. If the condition for total reflection is not satisfied, the optical surface cannot have both reflecting and transmitting actions, and it becomes difficult to reduce the size of the prism.

In addition, reflecting surfaces other than the totally reflecting surfaces are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased.

The following is a description of the surface configurations of the first and second prisms, particularly the desirable surface configurations in regard to symmetry.

It is desirable that both the first and second surfaces of the second prism should be arranged to have a rotationally asymmetric surface configuration that gives a power to a light beam and corrects aberrations due to decentration.

In this case, it is desirable that the rotationally asymmetric surface configuration of at least one of the first and second surfaces of the second prism should be arranged in the form of a plane-symmetry free-form surface having only one plane of symmetry.

Furthermore, it is desirable that the rotationally asymmetric surface configurations of both the first and second surfaces of the second prism should be arranged in the form of plane-symmetry free-form surfaces each having only one plane of symmetry.

It is desirable for the second prism to be arranged such that the only one plane of symmetry of the plane-symmetry free-form surface that forms the first surface of the second prism and the only one plane of symmetry of the plane-symmetry free-form surface that forms the second surface of the second prism are formed in the same plane.

It is desirable that the third surface of the second prism should have a rotationally asymmetric surface configuration that gives a power to a light beam and corrects aberrations due to decentration. A refracting surface having such a surface configuration is effective in correcting aberrations due to decentration.

In this case, it is desirable that the rotationally asymmetric surface configuration of the third surface of the second prism should be arranged in the form of a plane-symmetry free-form surface having only one plane of symmetry.

Furthermore, it is desirable that the only one plane of symmetry of the plane-symmetry free-form surface that forms the third surface of the second prism should be coincident with a plane that connects the segments of a folded optical path of the axial principal ray that is formed by the reflections in the second prism.

It is desirable that the rotationally asymmetric surface configuration of the reflecting surface provided in the first prism should be a plane-symmetry free-form surface having only one plane of symmetry.

In this case, it is desirable to arrange the first and second prisms so that each of the first and second prisms has at least one plane-symmetry free-form surface having only one plane of symmetry and the only one plane of symmetry of the at least one plane-symmetry free-form surface in the first prism and that of the at least one plane-symmetry free-form surface in the second prism are placed in the same plane.

It is desirable that the first and second surfaces of the second prism and the two surfaces having a reflecting action in the first prism should be formed from rotationally asymmetric surfaces that correct decentration aberrations and each have only one plane of symmetry.

It is also desirable that the first and second surfaces of the second prism and the two surfaces having a reflecting action in the first prism should be formed from rotationally asymmetric surfaces that correct decentration aberrations and each have only one plane of symmetry, and that the only one plane of symmetry of each rotationally asymmetric surface should be coincident with each other in approximately the same plane.

It is desirable that all the optical surfaces constituting the first and second prisms should be formed from rotationally asymmetric surfaces that correct decentration aberrations and each have only one plane of symmetry, and that the only one plane of symmetry of each rotationally asymmetric surface should be coincident with each other in approximately the same plane.

It is desirable for the first and second prisms to be arranged so that an intermediate image surface is formed between the second surface of the second prism and the exit surface of the first prism (in the case of the viewing optical system; in the case of the image-forming optical system, between the second surface of the second prism and the entrance surface of the first prism).

In the case of the viewing optical system, the surface configurations of the decentration aberration-correcting optical surfaces in the first and second prisms should desirably be arranged so that the exit pupil surface and observation image surface of the viewing optical system are approximately flat surfaces, and so that the intermediate image surface formed between the exit pupil surface and the observation image surface has a non-planar, curved configuration. In the case of the image-forming optical system, the surface configurations of the decentration aberration-correcting optical surfaces in the first and second prisms should desirably be arranged so that the entrance pupil surface and image-formation surface of the image-forming optical system are approximately flat surfaces, and so that the intermediate image surface formed between the entrance pupil surface and the image-formation surface has a non-planar, curved configuration.

The viewing optical system according to the present invention may be provided with a cover member between the first surface of the second prism and the exit pupil to cover the first surface.

In this case, the cover member may be constructed in the form of a plane-parallel plate that gives no power to a light beam, or a positive lens that converges a light beam, or a negative lens that diverges a light beam.

In the case of the image-forming optical system according to the present invention, it is desirable for the first and second prisms to be arranged so that the entrance pupil of the image-forming optical system is formed on the object side of the second prism. A stop is placed on the entrance pupil.

Incidentally, the second prism in the viewing optical system and image-forming optical system according to the present invention has three optical surfaces that transmit or reflect a light beam, as stated above. However, in the case of the viewing optical system, the second prism may have a fourth surface placed in the optical path between the third and first surfaces of the second prism where the light beam entering through the third surface travels in the second prism until it is reflected by the first surface. That is, the second prism may be arranged as follows: The third surface allows the light beam exiting from the first prism to enter the second prism. The fourth surface reflects the light beam entering through the third surface in the second prism. The first surface reflects the light beam reflected from the fourth surface in the second prism. The second surface reflects the light beam reflected from the first surface in the second prism. The first surface also allows the light beam reflected from the second surface to exit from the second prism.

In this case, the arrangement may be such that the fourth and second surfaces are formed in the same surface, and a reflecting area of the surface that forms the fourth surface is closer to the intermediate image surface than a reflecting area of the surface that forms the second surface. Alternatively, the fourth and second surfaces may have different curved surface configurations.

The intermediate image surface may be placed on the third surface of the second prism. It is also possible to arrange the optical surfaces of the viewing optical system so that the intermediate image surface is placed on the third surface of the second prism in such a way that some area of the intermediate image surface lies inside the second prism and the remaining area of the intermediate image surface projects outside the second prism.

Let us define the power of a decentered optical system and that of an optical surface. As shown in FIG. 42, when the direction of decentration of a decentered optical system S is taken in the Y-axis direction, a light ray which is parallel to the axial principal ray of the decentered optical system S and which has a small height d in the YZ-plane is made to enter the decentered optical system S from the object side thereof. The angle that is formed between that ray and the axial principal ray exiting from the decentered optical system S when the two rays are projected onto the YZ-plane is denoted by δy, and δy/d is defined as the power Py in the Y-axis direction of the decentered optical system S. Similarly, a light ray which is parallel to the axial principal ray of the decentered optical system S and which has a small height d in the X-axis direction, which is perpendicular to the YZ-plane, is made to enter the decentered optical system S from the object side thereof. The angle that is formed between that ray and the axial principal ray exiting from the decentered optical system S when the two rays are projected onto a plane perpendicularly intersecting the YZ-plane and containing the axial principal ray is denoted by δx, and δx/d is defined as the power Px in the X-axis direction of the decentered optical system S. The power Pysn in the Y-axis direction and power Pxsn in the X-axis direction of a decentered optical surface n constituting the decentered optical system S are defined in the same way as the above.

Furthermore, the reciprocals of the above-described powers are defined as the focal length Fy in the Y-axis direction of the decentered optical system S, the focal length Fx in the X-axis direction of the decentered optical system S, the focal length Fysn in the Y-axis direction of the decentered optical surface n, and the focal length Fxsn in the X-axis direction of the decentered optical surface n, respectively.

In the viewing optical system according to the present invention, it is desirable to satisfy the following condition:

$$100 < EP/Px < 1000 \tag{1}$$

where EP is a distance (eye point distance) from the exit pupil of the ocular optical system to the exit surface of the second prism (the distance from the entrance pupil to the entrance surface of the second prism in the case of the image-forming optical system), and Px is the power in the X-axis direction of the entire ocular optical system (the reciprocal of the focal length).

This condition is necessary to satisfy in order to obtain a sufficiently long eye point distance while ensuring a somewhat wide viewing field angle. If EP/Px is not smaller than the upper limit of the condition, i.e. 1000, the eye point distance becomes excessively long, causing an image observation apparatus using the viewing optical system to become excessively large in size. In addition, the power becomes excessively weak, and it becomes impossible to widen the viewing field angle. If EP/Px is not larger than the lower limit, 100, a sufficiently long eye point distance cannot be obtained. Consequently, it may be difficult for the observer to view with his or her glasses on. In addition, the observer's eyelashes may touch the optical system, making it difficult to perform observation.

It is more desirable to satisfy the following condition:

$$100 < EP/Px < 600 \tag{1-1}$$

The meaning of the upper and lower limits of the condition (1-1) is the same as the above.

It is even more desirable to satisfy the following condition:

$$140 < EP/Px < 500 \tag{1-2}$$

The meaning of the upper and lower limits of the condition (1-2) is the same as the above.

It is still more desirable to satisfy the following condition:

$$200 < EP/Px < 400 \tag{1-3}$$

The meaning of the upper and lower limits of the condition (1-3) is the same as the above.

The following is a description of the condition concerning the magnification of the first prism for projecting the image of the image display device onto the first image-formation plane. Rays of small NA (Numerical Aperture) that are near the axial principal ray are traced from the image display device in the X- and Y-axis directions, and a magnification βx in the X-axis direction and a magnification βy in the Y-axis direction are obtained from NA' when the rays reach the first image-formation plane (in the case of the image-forming optical system, the magnification βx in the X-axis direction and magnification βy in the Y-axis direction of the intermediate image formed by the first prism in the backward ray tracing with respect to the image on the image-formation plane).

It is important to satisfy at least one of the following conditions:

$$0.8 < \beta x < 5,$$

$$0.8 < \beta y < 5 \tag{2}$$

If βx or βy is not larger than the lower limit of the condition (2), i.e. 0.8, the projection magnification at which the image of the image display device is projected onto the first image-formation plane becomes excessively small. Consequently, the viewing field angle becomes unfavorably small. Alternatively, it becomes necessary to use a largesized image display device, and the apparatus becomes unfavorably large in size. If it is intended to widen the viewing field angle by increasing the power of the first prism while keeping the image display device small in size, the load of correcting aberrations that is imposed on the second prism increases undesirably. This is unfavorable for the total aberration correction in the first and second prisms. If βx or βy is not smaller than the upper limit, i.e. 5, the projection magnification at which the image of the image display device is projected onto the first image-formation plane becomes excessively large, and the aberration correcting load imposed on the first prism becomes excessively heavy. Consequently, aberrations introduced into the intermediate image formed on the first image-formation plane become excessively large and impossible to correct by the second prism.

It is more desirable to satisfy at least one of the following conditions:

$$1 < \beta x < 2,$$

$$1 < \beta y < 2 \qquad (2\text{-}1)$$

The meaning of the upper and lower limits of these conditions is the same as the above.

It is even more desirable to satisfy the above-described conditions simultaneously.

Next, the power of the second prism will be described.

It is important to satisfy at least one of the following conditions:

$$0.2 < Px2/Px < 3,$$

$$0.2 < Py2/Py < 3 \qquad (3)$$

where Px2 is the power in the X-axis direction of the second prism, and Py2 is the power in the Y-axis direction of the second prism.

The condition (3) limits the power of the second prism with respect to the power of the entire ocular optical system. If Px2/Px or Py2/Py is not larger than the lower limit, i.e. 0.2, the power of the second prism becomes excessively small with respect to the power of the entire optical system, and it becomes necessary to enlarge the image projected on the first image-formation plane in order to obtain a wide viewing field angle. Consequently, the second prism becomes large in size, and it becomes impossible to form the whole optical system in a compact structure. If Px2/Px or Py2/Py is not smaller than the upper limit, i.e. 3, the power assigned to the second prism becomes excessively large, and it becomes impossible for the first prism to correct decentration aberrations produced in the second prism.

It is more desirable to satisfy at least one of the following conditions:

$$0.4 < Px2/Px < 2,$$

$$0.4 < Py2/Py < 2 \qquad (3\text{-}1)$$

The following is a description of the power of the second surface of the second prism, which has only a reflecting action and is placed to face opposite to the pupil position corresponding to the position of the observer's eyeball. It is important to satisfy at least one of the following conditions:

$$0.2 < Pxs3/Px < 3,$$

$$0.2 < Pys3/Py < 3 \qquad (4)$$

where Pxs3 is the power in the X-axis direction of the second surface at a position where the axial principal ray impinges on the second surface, and Pys3 is the power in the Y-axis direction of the second surface at that position. If Pxs3/Px or Pys3/Py is not larger than the lower limit of the condition (4), i.e. 0.2, it becomes impossible to make the power of the second prism strong with respect to the power of the entire optical system. Consequently, it becomes necessary to increase correspondingly the power assigned to the first prism. This is unfavorable from the viewpoint of aberration correction. If the power of the second prism is assigned to a surface other than the second surface, decentration aberrations becomes large. If the power is assigned to a transmitting surface, chromatic aberration becomes large. If Pxs3/Px or Pys3/Py is not smaller than the upper limit, i.e. 3, the power assigned to the second prism becomes excessively large, and decentration aberrations produced in the second prism become large.

It is more desirable to satisfy at least one of the following conditions:

$$0.4 < Pxs3/Px < 2,$$

$$0.4 < Pys3/Py < 2 \qquad (4\text{-}1)$$

It is even more desirable to satisfy at least one of the following conditions:

$$0.6 < Pxs3/Px < 1.5,$$

$$0.6 < Pys3/Py < 1.5 \qquad (4\text{-}2)$$

In a case where the first prism of the viewing optical system (in the case of the image-forming optical system, the positions of the entrance and exit surfaces are reverse to those in the viewing optical system) is formed from three optical surfaces, i.e. an exit surface serving as both a reflecting surface and a transmitting surface, a reflecting surface, and an entrance surface as stated above, it is important to satisfy at least one of the following conditions:

$$0 < Pxs9/Px < 5,$$

$$0 < Pys9/Py < 5 \qquad (5)$$

where Pxs9 is the power in the X-axis direction of the surface having only a reflecting action in the first prism, and Pys9 is the power in the Y-axis direction of that surface.

The condition (5) is a condition for the surface of the first prism that has the principal power of the prism. If Pxs9/Px or Pys9/Py is not larger than the lower limit of the condition (5), i.e. 0, it becomes necessary in order to keep the power of the first prism at a predetermined value to assign the required power to a surface other than the surface having only a reflecting action, and decentration aberrations produced by the surface assigned the power become large. Consequently, aberrations produced in the whole first prism become large and impossible to correct by the second prism. If Pxs9/Px or Pys9/Py is not smaller than the upper limit, i.e. 5, decentration aberrations produced by this surface become unfavorably large.

It is more desirable to satisfy at least one of the following conditions:

$$1 < Pxs9/Px < 3,$$

$$1 < Pys9/Py < 3 \qquad (5\text{-}1)$$

It is even more desirable to satisfy at least one of the following conditions:

$1.5 < Pxs9/Px < 2.5,$ $1.5 < Pys9/Py < 2.5$ (5-2)

In a case where the first prism of the viewing optical system (in the case of the image-forming optical system, the positions of the entrance and exit surfaces are reverse to those in the viewing optical system) is formed from three optical surfaces, i.e. an entrance surface serving as both a reflecting surface and a transmitting surface, a reflecting surface, and an exit surface as stated above, it is important to satisfy at least one of the following conditions:

$0 < Pxs10/Px < 5,$ $0 < Pys10/Py < 5$ (6)

where Pxs10 is the power in the X-axis direction of the surface having only a reflecting action in the first prism, and Pys10 is the power in the Y-axis direction of that surface.

The condition (6) is a condition for the surface of the first prism that has the principal power of the prism. If Pxs10/Px or Pys10/Py is not larger than the lower limit of the condition (6), i.e. 0, it becomes necessary in order to keep the power of the first prism at a predetermined value to assign the required power to a surface other than the surface having only a reflecting action, and decentration aberrations produced by the surface assigned the power become large. Consequently, aberrations produced in the whole first prism become large and impossible to correct by the second prism. If Pxs10/Px or Pys10/Py is not smaller than the upper limit, i.e. 5, decentration aberrations produced by this surface become unfavorably large.

It is more desirable to satisfy at least one of the following conditions:

$1 < Pxs10/Px < 4,$ $1 < Pys10/Py < 4$ (6-1)

It is even more desirable to satisfy at least one of the following conditions:

$1.5 < Pxs10/Px < 3,$ $1.5 < Pys10/Py < 3$ (6-2)

In a case where the first prism of the viewing optical system (in the case of the image-forming optical system, the positions of the entrance and exit surfaces are reverse to those in the viewing optical system) is formed from four optical surfaces, i.e. two reflecting surfaces that give a power to a light beam, an entrance surface, and an exit surface as stated above, it is important to satisfy at least one of the following conditions:

$-1 < Pxs9/Pxs10 < 2,$ $-1 < Pys9/Pys10 < 2$ (7)

where Pxs9 is the power in the X-axis direction of the reflecting surface of the first prism that is closer to the exit surface; Pys9 is the power in the Y-axis direction of the exit-side reflecting surface; Pxs10 is the power in the X-axis direction of the reflecting surface of the first prism that is closer to the entrance surface; and Pys10 is the power in the Y-axis direction of the entrance-side reflecting surface.

The condition (7) specifies which of the two reflecting surfaces of the first prism should have a principal power. If Pxs9/Pxs10 or Pys9/Pys10 is not larger than the lower limit of the condition (7), i.e. −1, the power of the exit-side reflecting surface becomes excessively small with respect to the power of the entrance-side reflecting surface. Consequently, the principal point in the prism comes excessively close to the image display device, and it becomes impossible to obtain an optimal first image projection magnification. If Pxs9/Pxs10 or Pys9/Pys10 is not smaller than the upper limit, i.e. 2, the power of the exit-side reflecting surface becomes excessively strong relative to the power of the entrance-side reflecting surface. Consequently, the principal point comes excessively close to the first image-formation plane, and it becomes impossible to obtain a high projection magnification at which the image of the image display device is projected onto the first image-formation plane.

It is more desirable to satisfy at least one of the following conditions:

$0 < Pxs9/Pxs10 < 1,$ $0 < Pys9/Pys10 < 1$ (7-1)

It is even more desirable to satisfy at least one of the following conditions:

$0 < Pxs9/Pxs10 < 0.5,$ $0 < Pys9/Pys10 < 0.5$ (7-2)

It is desirable to form the above-described viewing optical system and image-forming optical system according to the present invention so that the focal length is shorter than 12 millimeters.

In the image-forming optical system according to the present invention, focusing of the image-forming optical system can be effected by moving all the constituent elements or moving only one prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the image-forming optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the viewing optical system according to the present invention, diopter adjustment can be effected by moving all the constituent elements or moving only one prism. However, it is also possible to effect diopter adjustment by moving the image display surface in the direction in which the axial principal ray enters the surface closest to the image display device.

In the viewing optical system and image-forming optical system according to the present invention, if at least one prism is formed by using an organic material such as a plastic material, the cost can be reduced. It is desirable to use a material of low moisture absorption, such as amorphous polyolefin, because such a material has a minimum change in image-forming performance with changes in moisture.

In the present invention, it is desirable that each of a plurality of prisms should have a positioning portion for setting a relative position, which is provided on a surface having no optical action. In a case where a plurality of prisms each having a reflecting surface with a power are provided as in the present invention in particular, relative displacement of each prism causes the performance to be deteriorated. Therefore, in the present invention, a positioning portion for setting a relative position is provided on each surface of each prism that has no optical action, thereby ensuring the required positional accuracy. Thus, the desired performance can be ensured. In particular, if a plurality of prisms are integrated into one unit by using the positioning portions and coupling members, it becomes unnecessary to assemble and adjust a plurality of prisms which would otherwise be separate from each other. Accordingly, the cost can be further reduced.

Furthermore, the optical path can be folded in a direction different from the decentration direction of the image-forming optical system-according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, each of the viewing optical system and the image-forming optical system can be formed from prisms alone. By doing so, the number of components is reduced, and the cost is lowered. Furthermore, a plurality of prisms may be integrated into one prism. By doing so, the cost can be further reduced.

In the present invention, the optical system may include another lens (positive or negative lens) as a constituent element in addition to the first and second prisms at one or each of a plurality of positions selected from a position on the object side of the first and second prisms, a position between the two prisms, and a position on the image side of the two prisms.

Furthermore, each of the viewing optical system and image-forming optical system according to the present invention may be a fast, single focal length lens system. Alternatively, each of the viewing optical system and the image-forming optical system may be arranged in the form of a zoom lens system (variable-magnification optical system) by combining it with a single or plurality of refracting optical systems that may be provided between the two prisms or on the object or image side of the two prisms.

In the present invention, the refracting and reflecting surfaces of the image-forming optical system may be formed from spherical surfaces or rotationally symmetric aspherical surfaces.

In a case where the above-described image-forming optical system according to the present invention is placed in an image pickup part of an image pickup apparatus, or in a case where the image pickup apparatus is a photographic apparatus having a camera mechanism, it is possible to adopt an arrangement in which a prism member provided in the front unit is placed closest to the object side among optical elements having an optical action, and the entrance surface of the prism member is decentered with respect to the optical axis, and further a cover member is placed on the object side of the prism member at right angles to the optical axis. The arrangement may also be such that the prism member provided in the front unit has on the object side thereof an entrance surface decentered with respect to the optical axis, and a cover lens having a power is placed on the object side of the entrance surface of the prism member in coaxial relation to the optical axis so as to face the entrance surface across an air spacing.

If a prism member is placed closest to the object side and a decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

A finder optical system can be formed by using any of the above-described image-forming optical systems according to the present invention as a finder objective optical system and adding an image-inverting optical system for erecting an object image formed by the finder objective optical system and an ocular optical system.

In addition, it is possible to construct a camera apparatus by using the finder optical system and an objective optical system for photography provided in parallel to the finder optical system.

In addition, an image pickup optical system can be constructed by using any of the foregoing image-forming optical systems according to the present invention and an image pickup device placed in an image plane formed by the image-forming optical system.

In addition, a camera apparatus can be constructed by using any of the foregoing image-forming optical systems according to the present invention as an objective optical system for photography, and a finder optical system placed in an optical path separate from an optical path of the objective optical system for photography or in an optical path branched from the optical path of the objective optical system for photography.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

It is also possible to form a finder optical system by using any of the above-described viewing optical systems according to the present invention as a finder ocular optical system and placing an objective optical system in front of the finder ocular optical system to form an observation image to be viewed through the finder ocular optical system.

In this case, it is possible to construct a camera apparatus by using the finder optical system and an optical system for photography provided in parallel to the finder optical system.

In addition, an electronic finder optical system can be constructed by using an electronic image display device for forming an observation image on the display surface thereof and any of the viewing optical systems according to the present invention for viewing the image on the display surface of the image display device.

In addition, an electronic camera apparatus can be constructed by using an image-forming optical system, an image pickup device placed in an image plane formed by the image-forming optical system, a recording medium for recording image information received by the image pickup device, an image display device that receives image information from the recording medium or the image pickup device to form an image for observation on the display surface thereof, and any of the viewing optical systems according to the present invention for viewing the image on the display surface of the image display device.

In addition, an endoscope system can be constructed by using an observation system having an image-forming optical system and an image transmitting member for transmitting an image formed by the image-forming optical system along a longitudinal axis, and an illumination system having an illuminating light source and an illuminating light transmitting member for transmitting illuminating light from the illuminating light source along the longitudinal axis. The endoscope system further has any of the viewing optical systems according to the present invention to view the image transmitted by the image transmitting member of the observation system.

It is also possible to construct a head-mounted image display apparatus by using an apparatus body unit having an image display device for forming an observation image on an image display area thereof and any of the viewing optical systems according to the present invention, which is provided as an ocular optical system for viewing the observation image, and a support member arranged to be mounted on an observer's head to retain the apparatus body unit in front of the observer's face.

In this case, the head-mounted image display apparatus can be arranged to enable the observer to see with both eyes by preparing a combination of the image display device and the ocular optical system for each of the left and right eyes.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 30 is a conceptual view of a video endoscope system to which the image-forming optical system and viewing optical system according to the present invention are applied.

DESCRIPTION OF THE PREFERRED EMBODIMENTS

Examples 1 to 18 of the viewing optical system and image-forming optical system according to the present invention will be described below. Although these examples are described as image-forming optical systems, they can be used as viewing optical systems by placing an image display device in the image plane of each image-forming optical system and placing the pupil (exit pupil) of an observer's eyeball at the stop position in the image-forming optical system. In other words, the image-forming optical systems of Examples 1 to 18 can be used as viewing optical systems by reversing the optical path of each of the image-forming optical systems. It should be noted that constituent parameters of each example will be shown later.

Figure 1:
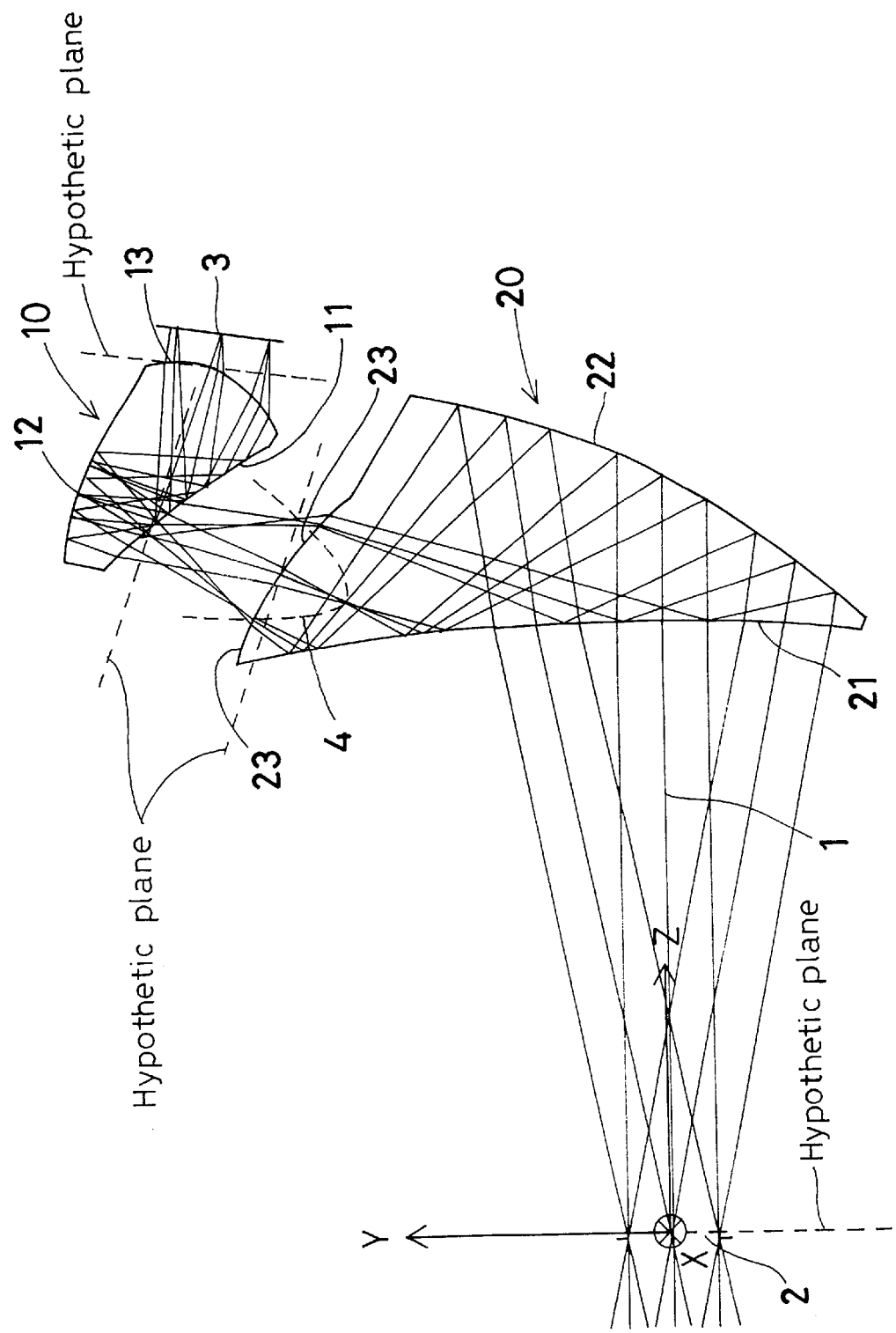
FIG. 1 is a sectional view of an image-forming optical system and viewing optical system according to Example 1 of the present invention.
Figure 2:
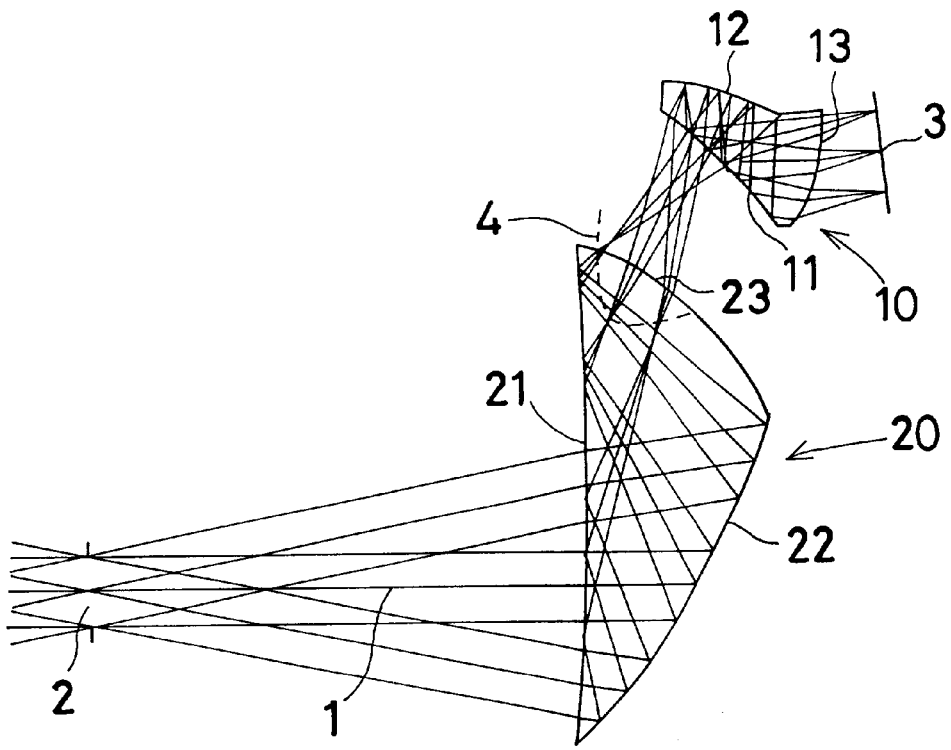
FIG. 2 is a sectional view of an image-forming optical system and viewing optical system according to Example 2 of the present invention.
Figure 3:
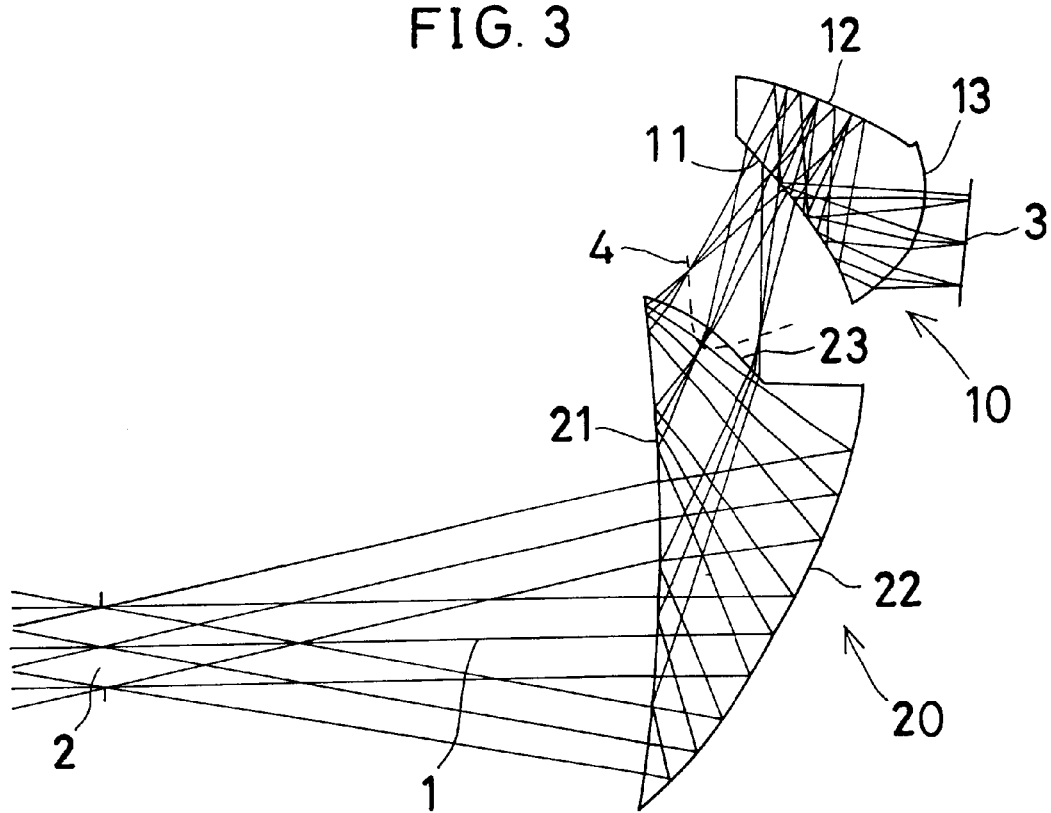
FIG. 3 is a sectional view of an image-forming optical system and viewing optical system according to Example 3 of the present invention.
Figure 4:
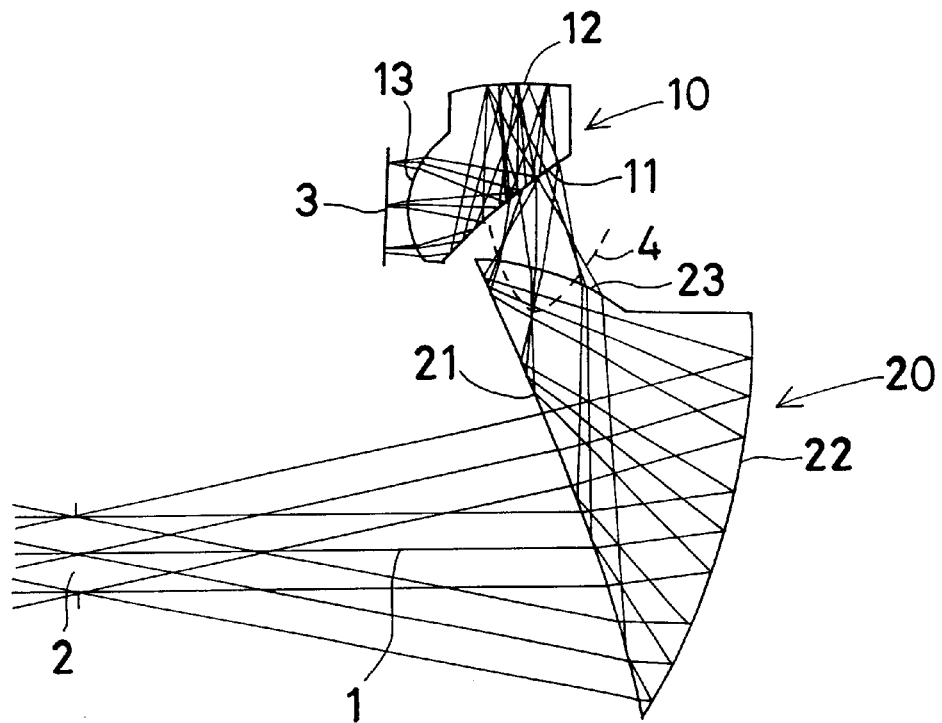
FIG. 4 is a sectional view of an image-forming optical system and viewing optical system according to Example 4 of the present invention.
Figure 5:
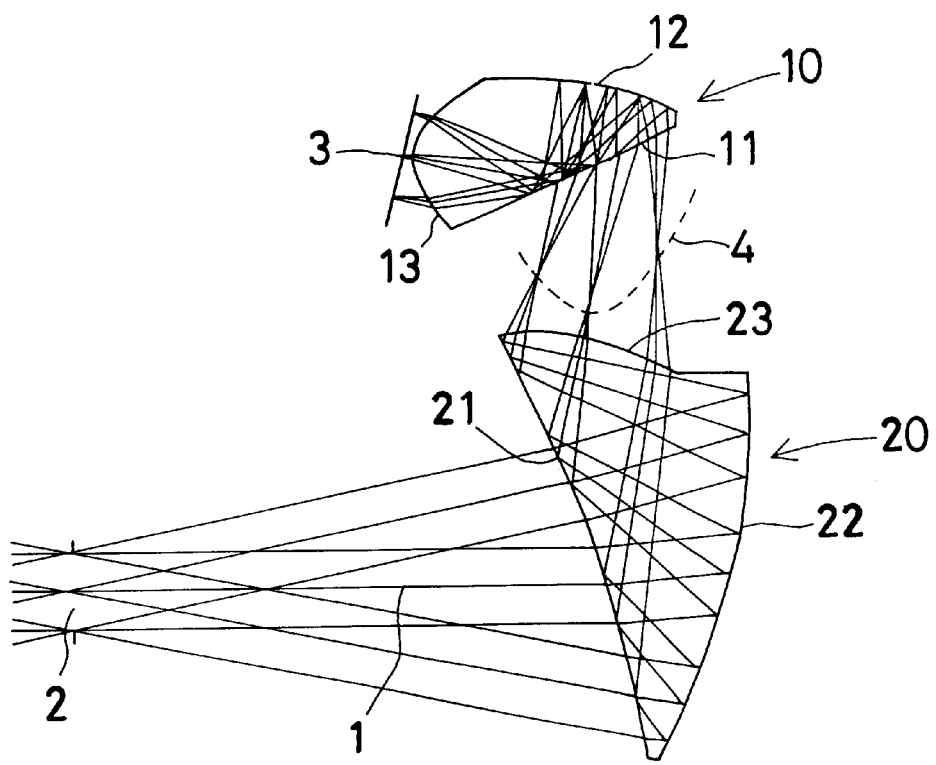
FIG. 5 is a sectional view of an image-forming optical system and viewing optical system according to Example 5 of the present invention.
Figure 6:
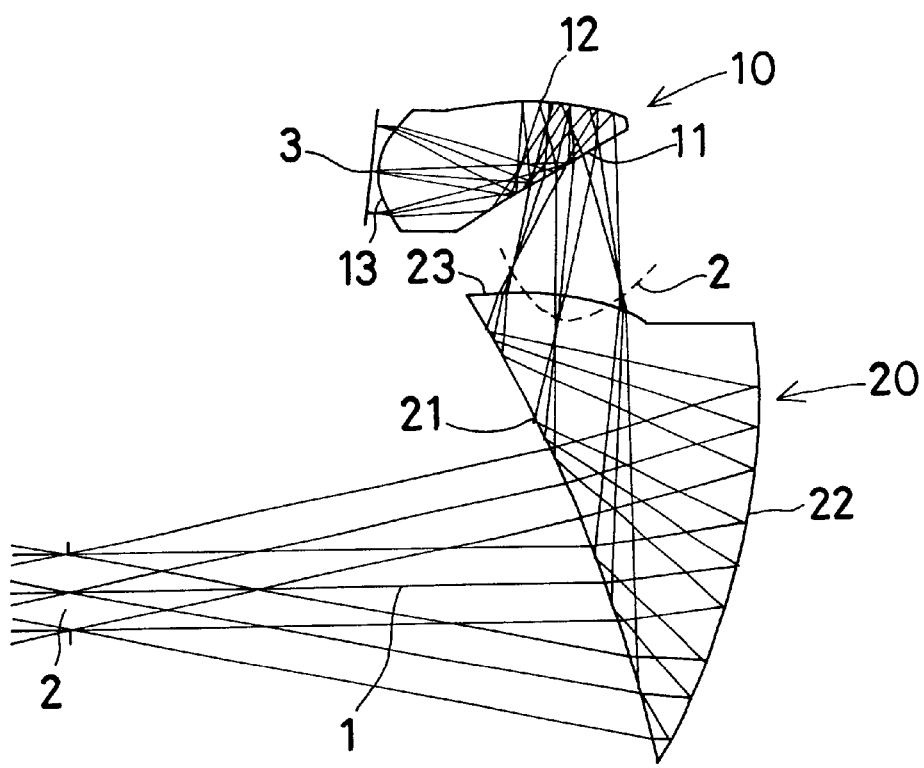
FIG. 6 is a sectional view of an image-forming optical system and viewing optical system according to Example 6 of the present invention.
Figure 7:
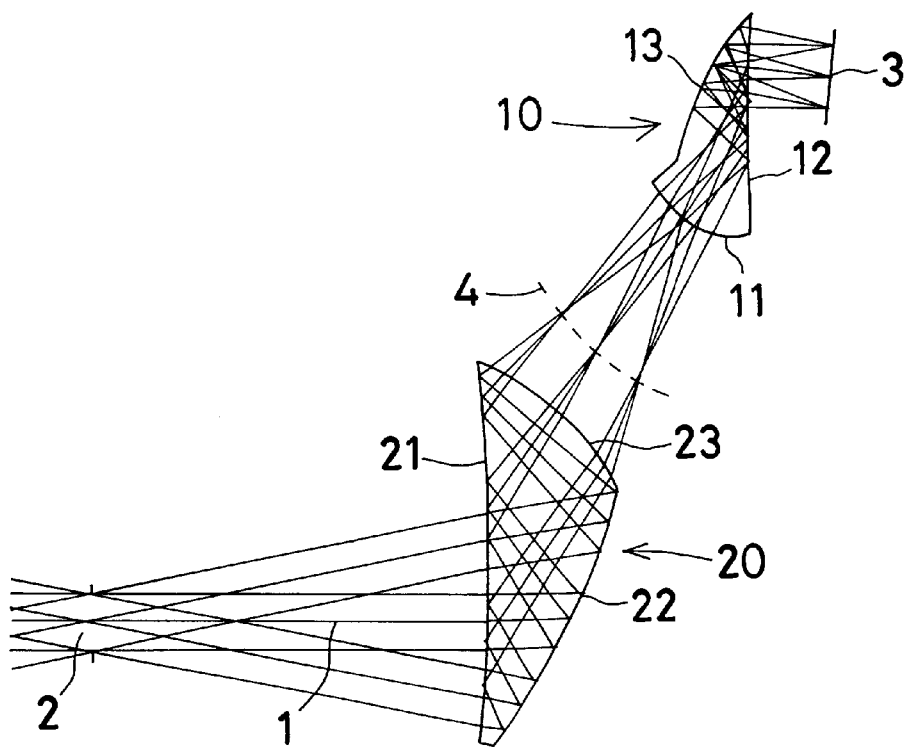
FIG. 7 is a sectional view of an image-forming optical system and viewing optical system according to Example 7 of the present invention.
Figure 8:
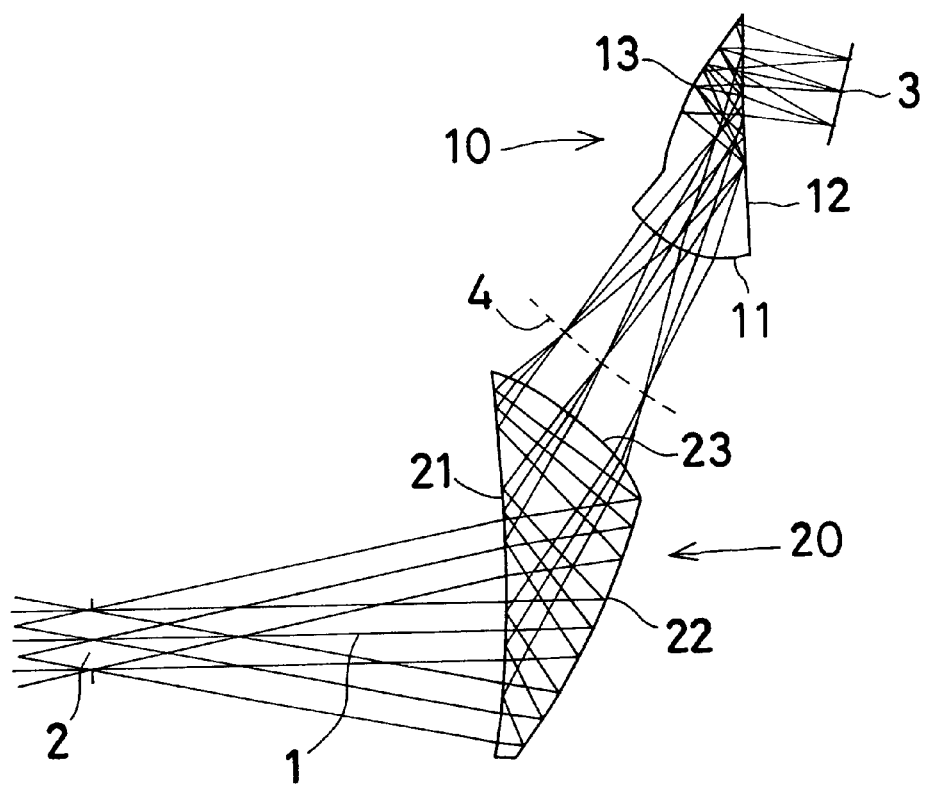
FIG. 8 is a sectional view of an image-forming optical system and viewing optical system according to Example 8 of the present invention.
Figure 9:
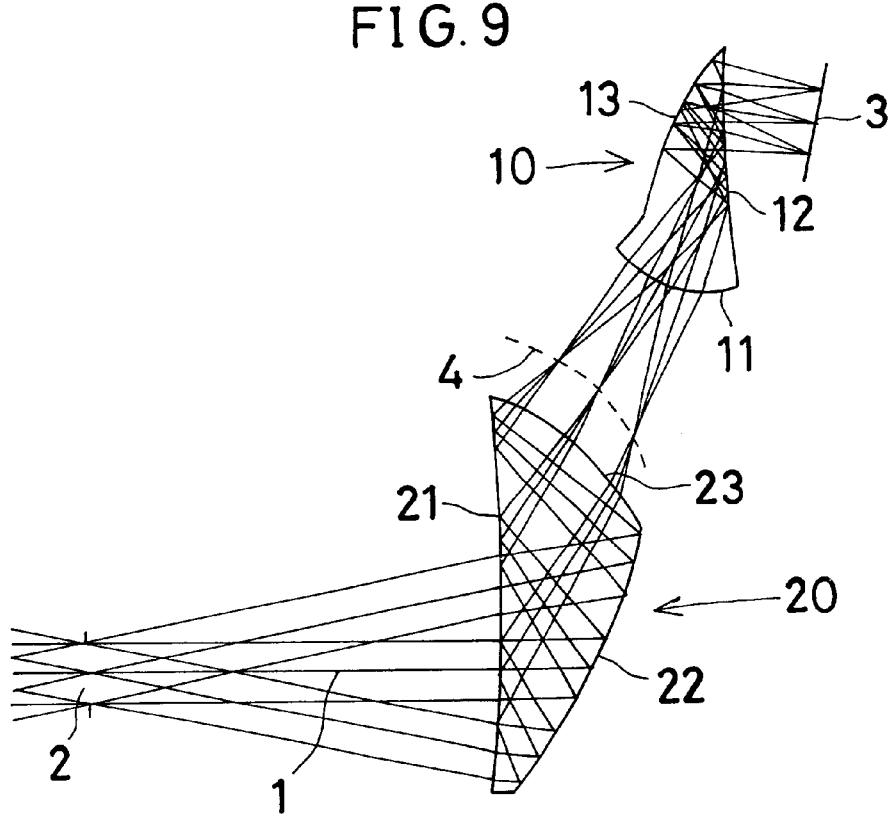
FIG. 9 is a sectional view of an image-forming optical system and viewing optical system according to Example 9 of the present invention.
Figure 10:
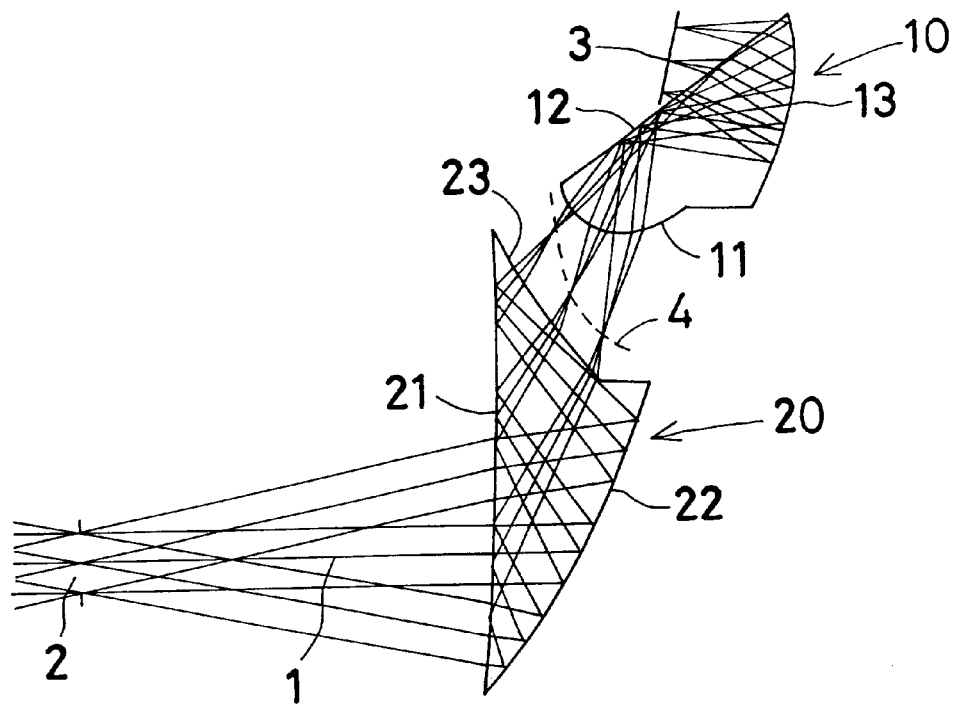
FIG. 10 is a sectional view of an image-forming optical system and viewing optical system according to Example 10 of the present invention.
Figure 11:
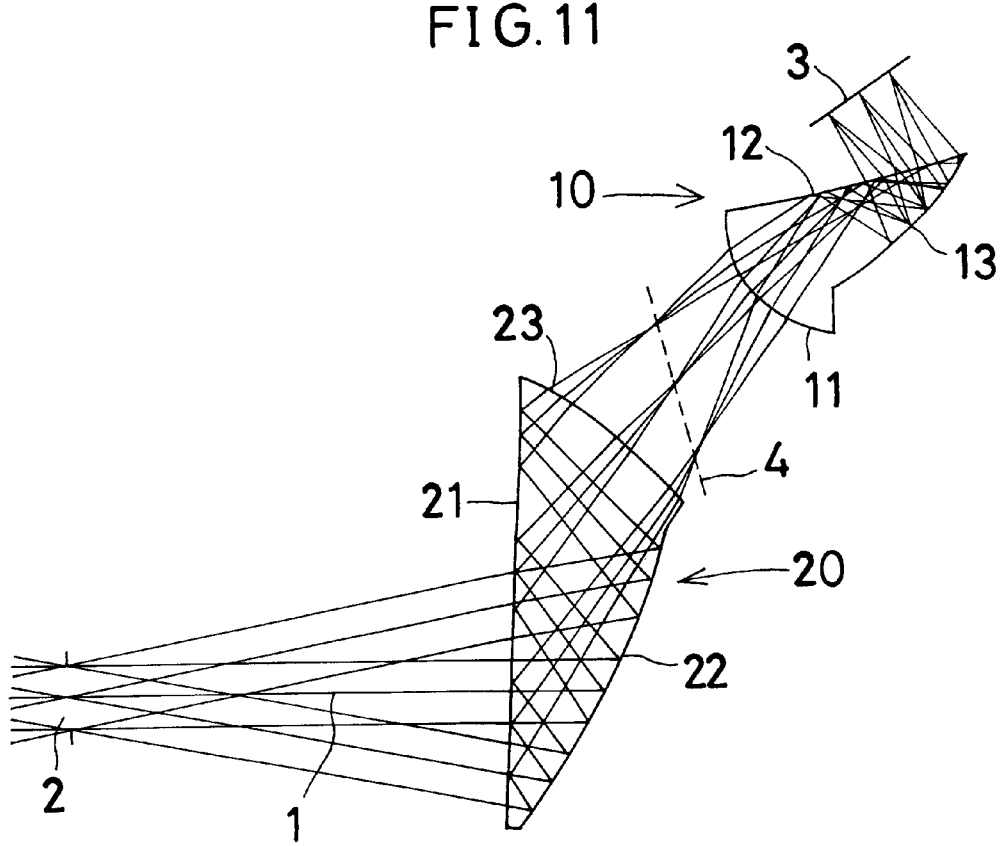
FIG. 11 is a sectional view of an image-forming optical system and viewing optical system according to Example 11 of the present invention.
Figure 12:
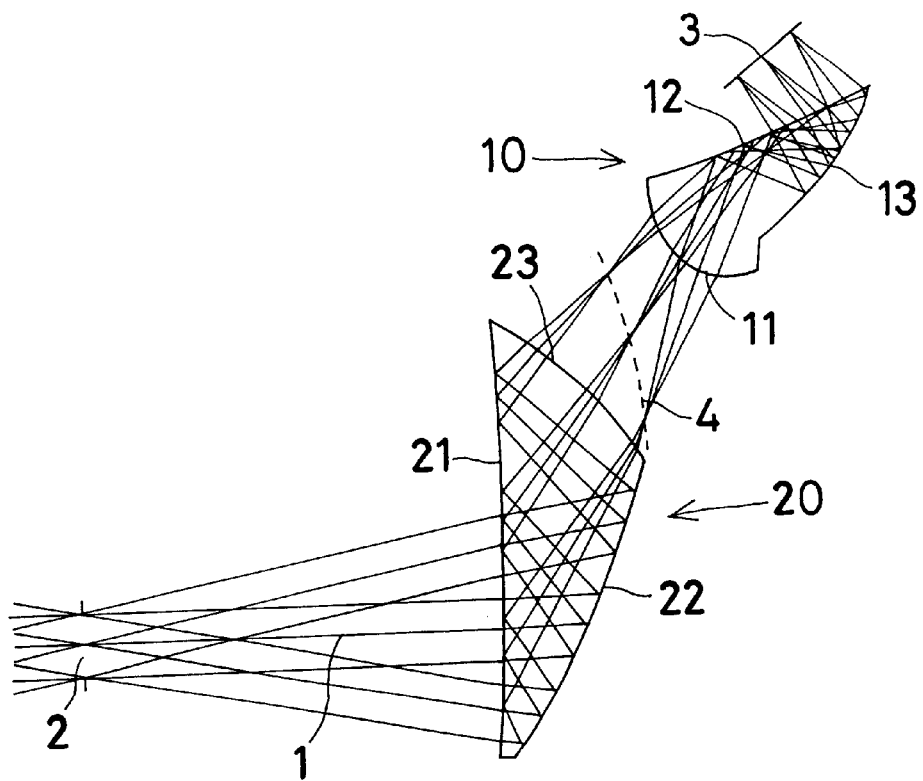
FIG. 12 is a sectional view of an image-forming optical system and viewing optical system according to Example 12 of the present invention.
Figure 13:
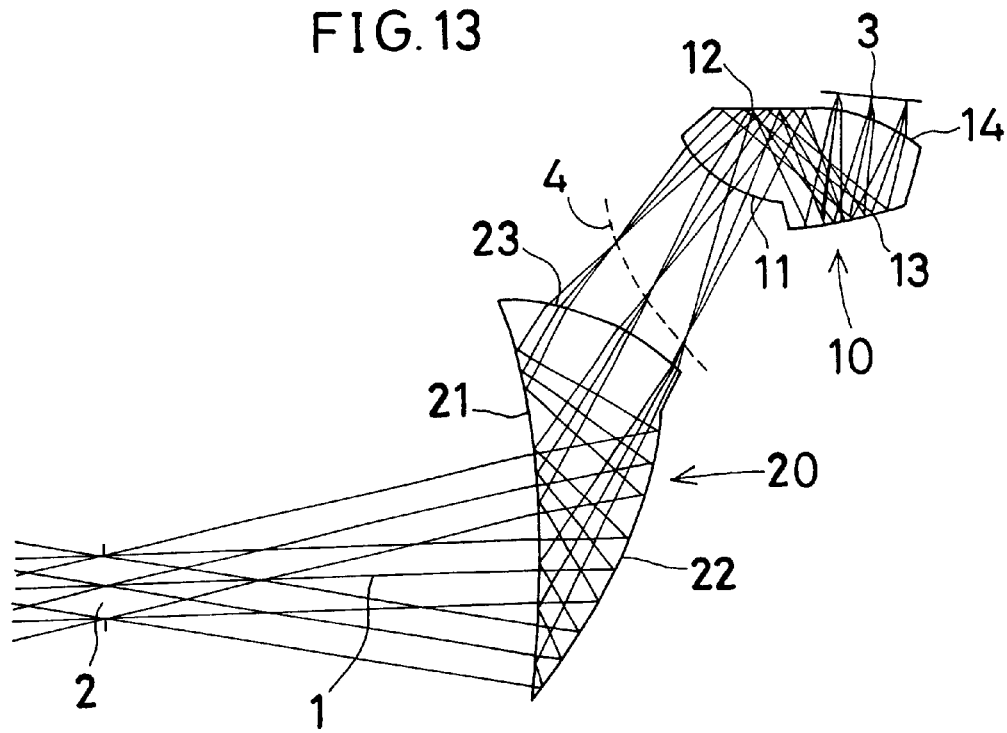
FIG. 13 is a sectional view of an image-forming optical system and viewing optical system according to Example 13 of the present invention.
Figure 14:
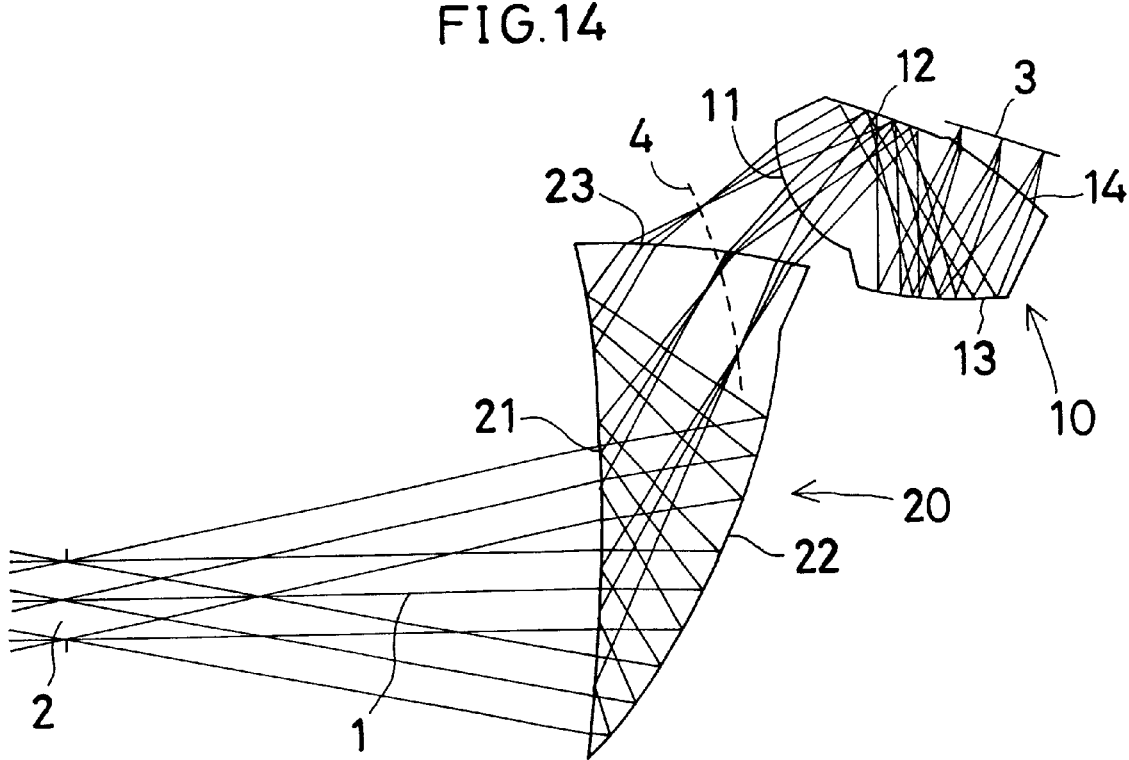
FIG. 14 is a sectional view of an image-forming optical system and viewing optical system according to Example 14 of the present invention.
Figure 15:
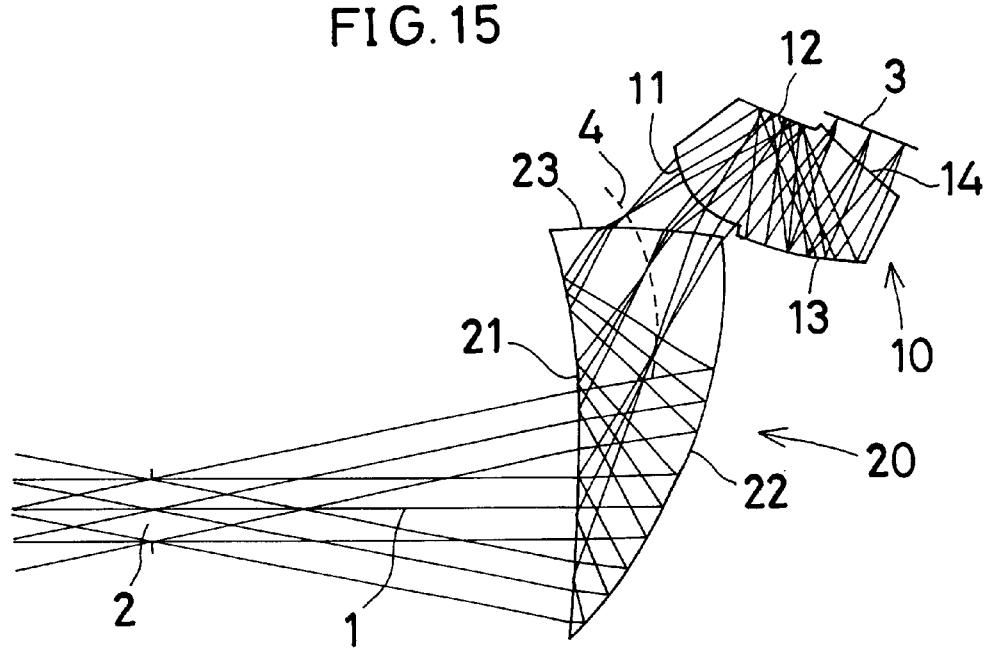
FIG. 15 is a sectional view of an image-forming optical system and viewing optical system according to Example 1 of the present invention.
Figure 16:
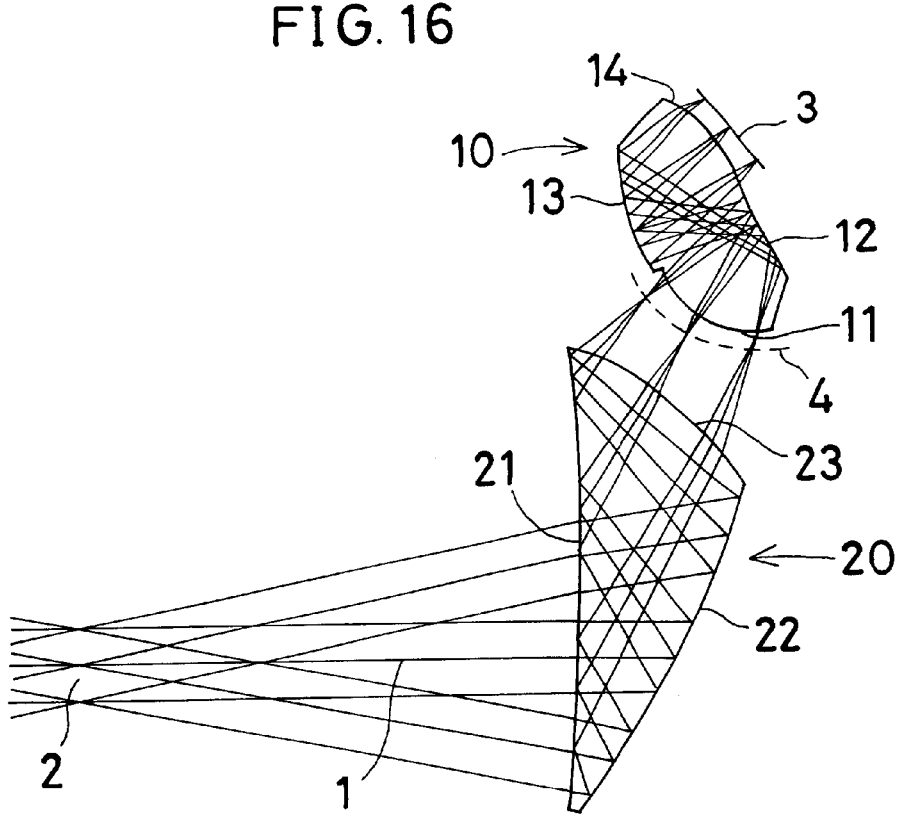
FIG. 16 is a sectional view of an image-forming optical system and viewing optical system according to Example 16 of the present invention.
Figure 17:
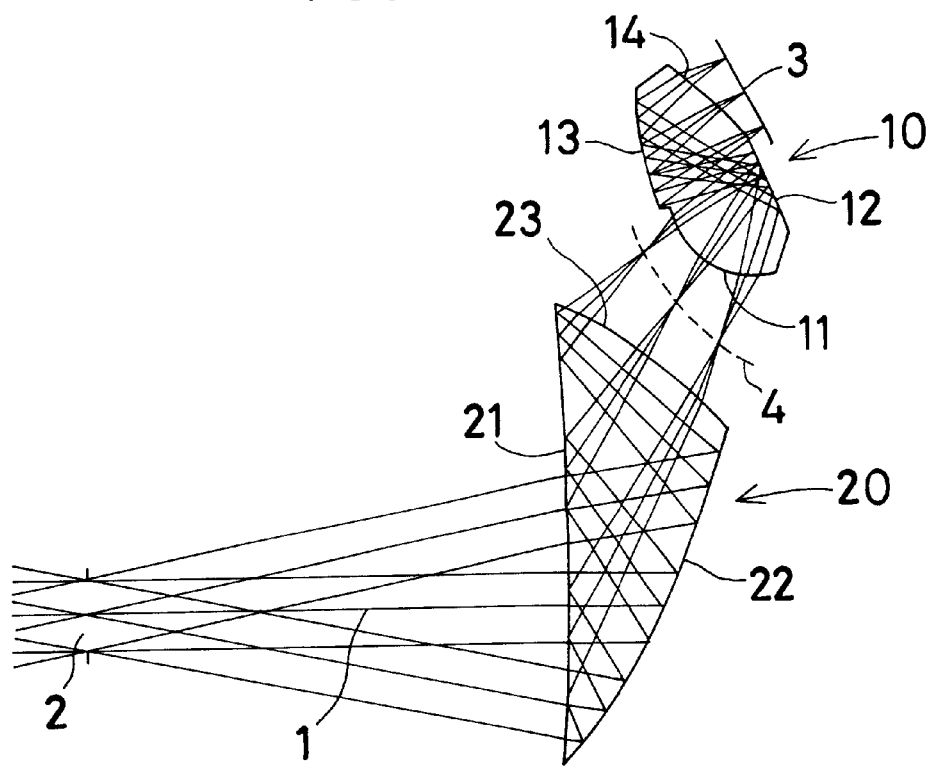
FIG. 17 is a sectional view of an image-forming optical system and viewing optical system according to Example 17 of the present invention.
Figure 18:
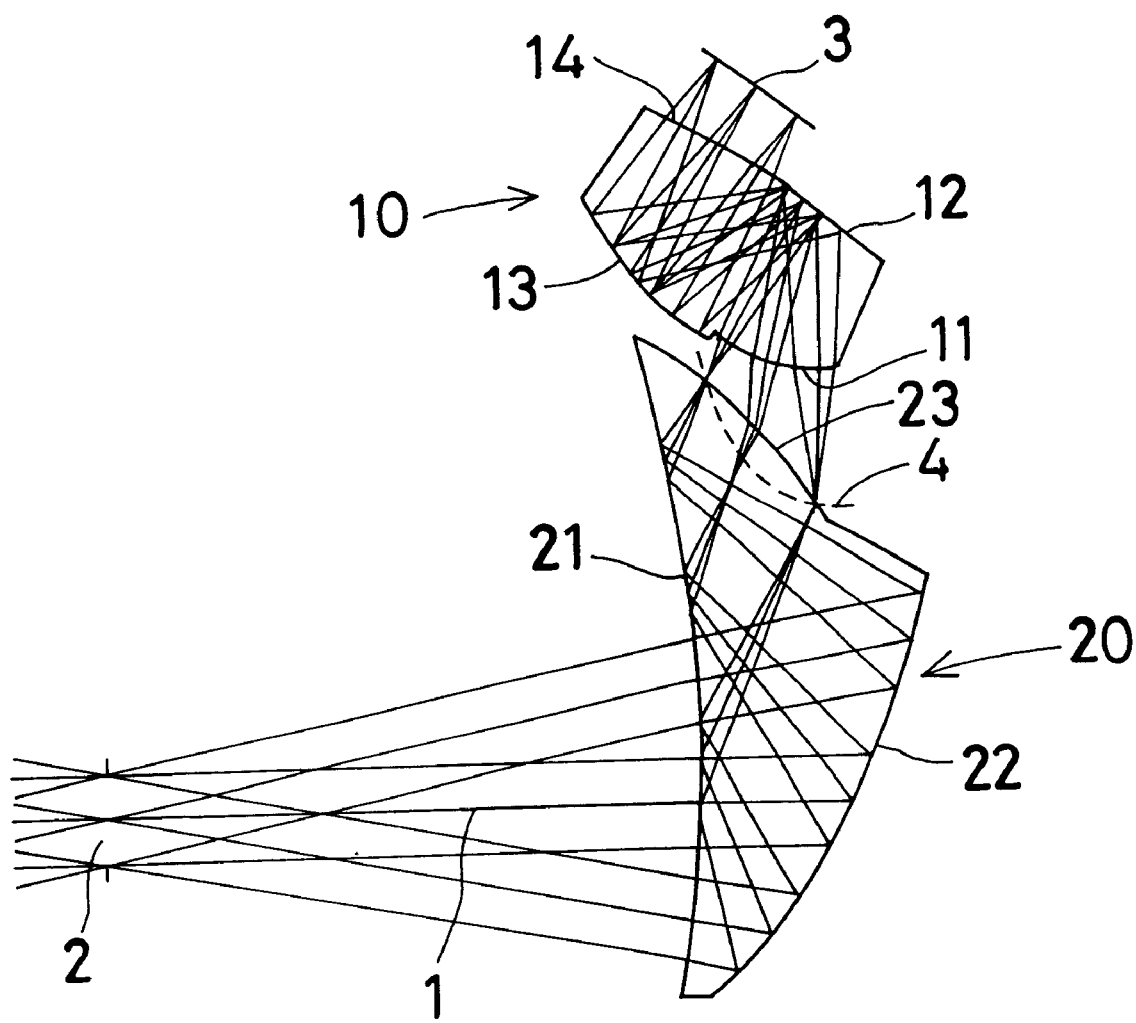
FIG. 18 is a sectional view of an image-forming optical system and viewing optical system according to Example 18of the present invention.

In each example, as shown in FIG. 1, an axial principal ray 1 is defined by a ray from the object center that passes through the center of a stop 2 and reaches the center of an image plane 3. A hypothetic plane is taken in the plane extending through the intersection between the axial principal ray 1 and the plane of the stop 2 at right angles to the axial principal ray 1 entering the plane of the stop 2. Another hypothetic plane is taken in the plane extending through the intersection between the axial principal ray 1 and the exit surface (third surface) 23 of a second prism 20 at right angles to the axial principal ray 1 exiting from the exit surface. Another hypothetic plane is taken in the plane extending through the intersection between the axial principal ray 1 and the entrance surface (first surface) 11 of a first prism 10 at right angles to the axial principal ray 1 entering the entrance surface. Another hypothetic plane is taken in the plane extending through the intersection between the axial principal ray 1 and the exit surface (third surface) 13 of the first prism 10 at right angles to the axial principal ray 1 exiting from the exit surface. The intersection of each hypothetic plane and the associated optical surface is defined as the origin for this optical surface and decentered optical surfaces present between it and the subsequent hypothetic plane (the image plane in the case of the final hypothetic plane). In the case of a hypothetic plane determined with respect to the intersection of an entrance surface, the direction in which the axial principal ray 1 enters the entrance surface is defined as a Z-axis direction. In the case of a hypothetic plane determined with respect to the intersection of an exit surface, the direction in which the axial principal ray 1 exits from the exit surface is defined as a Z-axis direction. The direction in which the axial principal ray 1 travels is defined as a positive direction of the Z-axis. A plane containing the Z-axis and the center of the image plane is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that forms a right-handed orthogonal coordinate system in combination with the X- and Z-axes is defined as a Y-axis. FIG. 1 shows the hypothetic planes and a coordinate system concerning the hypothetic plane determined with respect to the intersection of the plane of the stop 2. Illustration of the hypothetic planes and the coordinate system is omitted in FIG. 2 and figures subsequent thereto.

In Example 1 to 18, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method.

The configuration of each free-form surface used in the present invention is defined by the above equation (a). The Z-axis of the defining equation is the axis of the free-form surface.

In the constituent parameters (shown later), those terms concerning free-form surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (b). The Z-axis of the defining equation (b) is the axis of Zernike polynomial. A rotationally asymmetric surface is defined by polar coordinates of the height of the Z-axis with respect to the XY-plane. In the equation (b), A is the distance from the Z-axis in the XY-plane, and R is the azimuth angle about the Z-axis, which is expressed by the angle of rotation measured from the Z-axis.

$$x = R \times \cos(A)$$

$$y = R \times \sin(A)$$

$$Z = D_2 + D_3 R \cos(A) + D_4 R \sin(A) + D_5 R^2 \cos(2A) + D_6(R^2-1) + D_7 R^2 \sin(2A)$$

$$+ D_8 R^3 \cos(3A) + D_9(3R^3-2R)\cos(A) + D_{10}(3R^3-2R)\sin(A) + D_{11} R^3 \sin(3A) + D_{12} R^4 \cos(4A) + D_{13}(4R^4-3R^2)\cos(2A)$$

$$+ D_{14}(6R^4-6R^2+1) + D_{15}(4R^4-3R^2)\sin(2A) + D_{16} R^4 \sin(4A) + D_{17} R^5 \cos(5A) + D_{18}(5R^5-4R^3)\cos(3A)$$

$$+ D_{19}(10R^5-12R^3+3R)\cos(A) + D_{20}(10R^5-12R^3+3R)\sin(A) + D_{21}(5R^5-4R^3)\sin(3A) + D_{22} R^5 \sin(5A)$$

$$+ D_{23} R^6 \cos(6A) + D_{24}(6R^6-5R^4)\cos(4A) + D_{25}(15R^6-20R^4+6R^2)\cos(2A) + D_{26}(20R^6-30R^4+12R^2-1)$$

$$+ D_{27}(15R^6-20R^4+6R^2)\sin(2A) + D_{28}(6R^6-5R^4)\sin(4A) + D_{29} R^6 \sin(6A) \quad (b)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (c):

$$Z = \Sigma \Sigma C_{nm} XY$$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + C_8 y^3 + C_9 y^2|x| + C_{10} y x^2 + C_{11}|x^3|$$

$$+ C_{12} y^4 + C_{13} y^3|x| + C_{14} y^2 x^2 + C_{15} y|x^3| + C_{16} x^4 + C_{17} y^5 + C_{18} y^4|x| + C_{19} y^3 x^2 + C_{20} y^2|x^3| + C_{21} y x^4 + C_{22}|x^5|$$

$$+ C_{23} y^6 + C_{24} y^5|x| + C_{25} y^4 x^2 + C_{26} y^3|x^3| + C_{27} y^2 x^4 + C_{28} y|x^5| + C_{29} x^6$$

$$+ C_{30} y^7 + C_{31} y^6|x| + C_{32} y^5 x^2 + C_{33} y^4|x^3| + C_{34} y^3 x^4 + C_{35} y^2|x^5| + C_{36} y x^6 + C_{37}|x^7| \quad (c)$$

Although in the surface configuration is expressed by a free-form surface using the above equation (a), it should be noted that the same advantageous effect can be obtained by using the above equation (b) or (c).

In a case where Examples 1 to 18 are viewing optical systems, the viewing field angles are as follows: The horizontal half field angle is 15°, and the vertical half field angle is 11.56°. The size of the image display device is 5.89×4.42 millimeters. The pupil diameter is 4 millimeters. The focal length is 11 millimeters.

FIGS. 1 to 6 are sectional views of Examples 1 to 6, respectively, taken along the YZ-plane containing the optical axis. Examples 1 to 6 each have, in order in which light passes from the object side, a stop 2, a second prism 20, an intermediate image surface 4, a first prism 10, and an image plane (image-formation plane) 3. It should be noted that the intermediate image surface 4 may partly or wholly lie inside the second prism 20. The second prism 20 is formed from a first surface 21, a second surface 22, and a third surface 23. The first surface 21 allows a light beam from the object side to enter the second prism 20. The second surface 22 reflects the light beam entering through the first surface 21 in the second prism 20. The first surface 21 also reflects the light beam reflected from the second surface 22 in the second prism 20. The third surface 23 allows the light beam reflected from the first surface 21 to exit from the second prism 20. The first prism 10 is formed from a first surface 11, a second surface 12, and a third surface 13. The first surface 11 allows a light beam from the object side to enter the first prism 10. The second surface 12 reflects the light beam entering through the first surface 11 in the first prism 10. The first surface 11 also reflects the light beam reflected from the second surface 12 in the first prism 10. The third surface 13 allows the light beam reflected from the first surface 11 to exit from the first prism 10. The first surface 21 of the second prism 20 and the first surface 11 of the first prism 10 are optical surfaces each having both transmitting and reflecting actions.

In the constituent parameters (shown later), the displacements of each of the surface Nos. 2 to 6 are expressed by the amounts of displacement from the hypothetic plane 1 of surface No. 1. The vertex position of the surface No. 7 (hypothetic plane 3) is expressed by only the surface separation along the axial principal ray from the hypothetic plane 2 of surface No. 6. The displacements of each of the surface Nos. 8 to 12 are expressed by the amounts of displacement from the hypothetic plane 3 of surface No. 7. The image plane is expressed by only the surface separation along the axial principal ray from the hypothetic plane 4 of surface No. 12.

FIGS. 7 to 12 are sectional views of Examples 7 to 12, respectively, taken along the YZ-plane containing the optical axis. Examples 7 to 12 each have, in order in which light passes from the object side, a stop 2, a second prism 20, an intermediate image surface 4, a first prism 10, and an image plane (image-formation plane) 3. It should be noted that the intermediate image surface 4 may partly or wholly lie inside the second prism 20. The second prism 20 is formed from a first surface 21, a second surface 22, and a third surface 23. The first surface 21 allows a light beam from the object side to enter the second prism 20. The second surface 22 reflects the light beam entering through the first surface 21 in the second prism 20. The first surface 21 also reflects the light beam reflected from the second surface 22 in the second prism 20. The third surface 23 allows the light beam reflected from the first surface 21 to exit from the second prism 20. The first prism 10 is formed from a first surface 11, a second surface 12, and a third surface 13. The first surface 11 allows a light beam from the object side to enter the first prism 10. The second surface 12 reflects the light beam entering through the first surface 11 in the first prism 10. The third surface 13 reflects the light beam reflected from the second surface 12 in the first prism 10. The second surface 12 also allows the light beam reflected from the third surface 13 to exit from the first prism 10. The first surface 21 of the second prism 20 and the second surface 12 of the first prism 10 are optical surfaces each having both transmitting and reflecting actions.

In the constituent parameters (shown later), the displacements of each of the surface Nos. 2 to 6 are expressed by the amounts of displacement from the hypothetic plane 1 of surface No. 1. The vertex position of the surface No. 7 (hypothetic plane 3) is expressed by only the surface separation along the axial principal ray from the hypothetic plane 2 of surface No. 6. The displacements of each of the surface Nos. 8 to 12 are expressed by the amounts of displacement from the hypothetic plane 3 of surface No. 7. The image plane is expressed by only the surface separation along the axial principal ray from the hypothetic plane 4 of surface No. 12.

FIGS. 13 to 18 are sectional views of Examples 13 to 18, respectively, taken along the YZ-plane containing the optical axis. Examples 13 to 18 each have, in order in which light passes from the object side, a stop 2, a second prism 20, an intermediate image surface 4, a first prism 10, and an image plane (image-formation plane) 3. It should be noted that the intermediate image surface 4 may partly or wholly lie inside the second prism 20. The second prism 20 is formed from a first surface 21, a second surface 22, and a third surface 23. The first surface 21 allows a light beam from the object side to enter the second prism 20. The second surface 22 reflects the light beam entering through the first surface 21 in the second prism 20. The first surface 21 also reflects the light beam reflected from the second surface 22 in the second prism 20. The third surface 23 allows the light beam reflected from the first surface 21 to exit from the second prism 20. The first prism 10 is formed from a first surface 11, a second surface 12, a third surface 13, and a fourth surface 14. The first surface 11 allows a light beam from the object side to enter the first prism 10. The second surface 12 reflects the light beam entering through the first surface 11. The third surface 13 reflects the light beam reflected from the second surface 12. The fourth surface 14 allows the light beam reflected from the third surface 13 to exit from the first prism 10. The first surface 21 of the second prism 20 is an optical surface having both transmitting and reflecting actions.

In the constituent parameters (shown later), the displacements of each of the surface Nos. 2 to 6 are expressed by the amounts of displacement from the hypothetic plane 1 of surface No. 1. The vertex position of the surface No. 7 (hypothetic plane 3) is expressed by only the surface separation along the axial principal ray from the hypothetic plane 2 of surface No. 6. The displacements of each of the surface Nos. 8 to 12 are expressed by the amounts of displacement from the hypothetic plane 3 of surface No. 7. The image plane is expressed by only the surface separation along the axial principal ray from the hypothetic plane 4 of surface No. 12.

The viewing optical system and image-forming optical system according to the present invention can be applied to other sizes, as a matter of course. The present invention includes not only an image pickup optical system and display optical system using the viewing optical system and image-forming optical system according to the present invention but also image pickup apparatus and the like incorporating such optical systems.

Constituent parameters in the foregoing Examples 1 to 18 are shown below. In the tables below: "FFS" denotes a free-form surface, and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 6.39 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ④ | | (5) | 1.4924 | 57.6 |
| 11 | FFS ⑥ | | (7) | | |
| 12 | ∞ (HRP4) | 1.64 | (8) | | |
| Image plane | ∞ | | | | |

FFS ①

| $C_4$ | $-1.1512 \times 10^{-2}$ | $C_6$ | $-4.9046 \times 10^{-3}$ |

FFS ②

| $C_4$ | $-1.8899 \times 10^{-2}$ | $C_6$ | $-1.4300 \times 10^{-2}$ |

FFS ③

| $C_4$ | $-1.6839 \times 10^{-2}$ | $C_6$ | $-4.1816 \times 10^{-2}$ |

FFS ④

| $C_4$ | $-2.2786 \times 10^{-2}$ | $C_6$ | $-1.2035 \times 10^{-2}$ |

FFS ⑤

| $C_4$ | $-4.2045 \times 10^{-2}$ | $C_6$ | $-3.7398 \times 10^{-2}$ |

FFS ⑥

| $C_4$ | $-1.0214 \times 10^{-1}$ | $C_6$ | $-1.2058 \times 10^{-1}$ |

Displacement and tilt (1)

| X | 0.00 | Y | 10.71 | Z | 27.71 |
| α | 4.57 | β | 0.00 | γ | 0.00 |

Displacement and tilt (2)

| X | 0.00 | Y | −0.05 | Z | 34.71 |
| α | −28.73 | β | 0.00 | γ | 0.00 |

Displacement and tilt (3)

| X | 0.00 | Y | 17.35 | Z | 30.65 |
| α | 55.89 | β | 0.00 | γ | 0.00 |

Displacement and tilt (4)

| X | 0.00 | Y | 17.35 | Z | 30.65 |
| α | 71.27 | β | 0.00 | γ | 0.00 |

Displacement and tilt (5)

| X | 0.00 | Y | −1.89 | Z | −1.29 |
| α | −35.82 | β | 0.00 | γ | 0.00 |

Displacement and tilt (6)

| X | 0.00 | Y | −0.71 | Z | 3.48 |
| α | 1.24 | β | 0.00 | γ | 0.00 |

Displacement and tilt (7)

| X | 0.00 | Y | −8.13 | Z | −0.81 |
| α | −95.84 | β | 0.00 | γ | 0.00 |

Displacement and tilt (8)

| X | 0.00 | Y | −8.13 | Z | −0.81 |
| α | −80.49 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 8.00 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ④ | | (5) | 1.4924 | 57.6 |
| 11 | FFS ⑥ | | (7) | | |
| 12 | ∞ (HRP4) | 3.43 | (8) | | |
| Image plane | ∞ | | | | |

FFS ①

| $C_4$ | $-1.1821 \times 10^{-2}$ | $C_6$ | $-3.0739 \times 10^{-3}$ | $C_6$ | $-1.5502 \times 10^{-4}$ |
| $C_{10}$ | $-4.6568 \times 10^{-5}$ | | | | |

FFS ②

| $C_4$ | $-1.8419 \times 10^{-2}$ | $C_6$ | $-1.3158 \times 10^{-2}$ | $C_8$ | $-5.3804 \times 10^{-5}$ |
| $C_{10}$ | $-5.5639 \times 10^{-5}$ | | | | |

FFS ③

| $C_4$ | $-2.3974 \times 10^{-2}$ | $C_6$ | $-3.3242 \times 10^{-2}$ |

FFS ④

| $C_4$ | $-3.5836 \times 10^{-2}$ | $C_6$ | $-1.6437 \times 10^{-2}$ | $C_8$ | $2.9147 \times 10^{-3}$ |
| $C_{10}$ | $8.6989 \times 10^{-4}$ | | | | |

FFS ⑤

| $C_4$ | $-4.5007 \times 10^{-2}$ | $C_6$ | $-3.8205 \times 10^{-2}$ | $C_8$ | $3.3039 \times 10^{-4}$ |
| $C_{10}$ | $1.6831 \times 10^{-4}$ | | | | |

FFS ⑥

| $C_4$ | $-1.1578 \times 10^{-1}$ | $C_6$ | $-7.9374 \times 10^{-2}$ |

Displacement and tilt (1)

| X | 0.00 | Y | 11.92 | Z | 27.98 |
| α | 1.83 | β | 0.00 | γ | 0.00 |

Displacement and tilt (2)

| X | 0.00 | Y | −0.05 | Z | 34.67 |
| α | −30.60 | β | 0.00 | γ | 0.00 |

Displacement and tilt (3)

| X | 0.00 | Y | 17.72 | Z | 30.75 |
| α | 63.42 | β | 0.00 | γ | 0.00 |

Displacement and tilt (4)

| X | 0.00 | Y | 17.72 | Z | 30.75 |
| α | 64.95 | β | 0.00 | γ | 0.00 |

Displacement and tilt (5)

| X | 0.00 | Y | −2.12 | Z | −0.59 |
| α | −17.48 | β | 0.00 | γ | 0.00 |

Displacement and tilt (6)

| X | 0.00 | Y | −0.24 | Z | 2.88 |
| α | 11.89 | β | 0.00 | γ | 0.00 |

Displacement and tilt (7)

| X | 0.00 | Y | −7.12 | Z | 1.91 |
| α | −74.41 | β | 0.00 | γ | 0.00 |

Displacement and tilt (8)

| X | 0.00 | Y | −7.12 | Z | 1.91 |
| α | −57.87 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 8.43 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ④ | | (5) | 1.4924 | 57.6 |
| 11 | FFS ⑥ | | (7) | | |
| 12 | ∞ (HRP4) | 2.38 | (8) | | |
| Image plane | ∞ | | | | |

FFS ①

| $C_4$ | $-1.2763 \times 10^{-2}$ | $C_6$ | $-6.0544 \times 10^{-3}$ | $C_8$ | $-2.2400 \times 10^{-4}$ |
| $C_{10}$ | $-6.2698 \times 10^{-5}$ | $C_{11}$ | $-3.5825 \times 10^{-6}$ | $C_{13}$ | $-1.9229 \times 10^{-7}$ |
| $C_{15}$ | $-1.5331 \times 10^{-12}$ | | | | |

FFS ②

| $C_4$ | $-1.9531 \times 10^{-2}$ | $C_6$ | $-1.4608 \times 10^{-2}$ | $C_8$ | $-9.9513 \times 10^{-5}$ |
| $C_{10}$ | $-1.6849 \times 10^{-5}$ | $C_{11}$ | $-3.4635 \times 10^{-6}$ | $C_{13}$ | $-5.3826 \times 10^{-5}$ |
| $C_{15}$ | $-7.2511 \times 10^{-7}$ | | | | |

FFS ③

| $C_4$ | $-9.2278 \times 10^{-3}$ | $C_6$ | $-3.7181 \times 10^{-2}$ | $C_8$ | $1.5626 \times 10^{-4}$ |

FFS ④

| $C_4$ | $-2.4232 \times 10^{-2}$ | $C_6$ | $-1.1813 \times 10^{-2}$ | $C_8$ | $2.0957 \times 10^{-4}$ |
| $C_{10}$ | $9.9504 \times 10^{-5}$ | $C_{11}$ | $-1.6861 \times 10^{-4}$ | $C_{13}$ | $7.8272 \times 10^{-5}$ |
| $C_{15}$ | $-5.6900 \times 10^{-7}$ | | | | |

FFS ⑤

| $C_4$ | $-3.7981 \times 10^{-2}$ | $C_6$ | $-3.3865 \times 10^{-2}$ | $C_8$ | $-7.3606 \times 10^{-5}$ |
| $C_{10}$ | $-5.1435 \times 10^{-5}$ | $C_{11}$ | $-5.3290 \times 10^{-5}$ | $C_{13}$ | $-4.1754 \times 10^{-5}$ |
| $C_{15}$ | $-3.2544 \times 10^{-5}$ | | | | |

FFS ⑥

| $C_4$ | $-8.8231 \times 10^{-2}$ | $C_6$ | $-1.0138 \times 10^{-1}$ | $C_8$ | $-1.3950 \times 10^{-2}$ |

Displacement and tilt (1)

| X | 0.00 | Y | 9.90 | Z | 28.16 |
| α | 2.13 | β | 0.00 | γ | 0.00 |

Displacement and tilt (2)

| X | 0.00 | Y | −0.13 | Z | 34.19 |
| α | −30.09 | β | 0.00 | γ | 0.00 |

Displacement and tilt (3)

| X | 0.00 | Y | 14.91 | Z | 30.69 |
| α | 55.45 | β | 0.00 | γ | 0.00 |

Displacement and tilt (4)

| X | 0.00 | Y | 14.91 | Z | 30.69 |
| α | 67.11 | β | 0.00 | γ | 0.00 |

Displacement and tilt (5)

| X | 0.00 | Y | −2.29 | Z | −1.34 |
| α | −32.27 | β | 0.00 | γ | 0.00 |

Displacement and tilt (6)

| X | 0.00 | Y | −0.76 | Z | 4.34 |
| α | 2.60 | β | 0.00 | γ | 0.00 |

Displacement and tilt (7)

| X | 0.00 | Y | −8.04 | Z | −0.29 |
| α | −91.02 | β | 0.00 | γ | 0.00 |

-continued

|   | Displacement and tilt (8) |   |   |   |   |
|---|---|---|---|---|---|
| X | 0.00 | Y | −8.04 | Z | −0.29 |
| α | −73.85 | β | 0.00 | γ | 0.00 |

-continued

|   | Displacement and tilt (8) |   |   |   |   |
|---|---|---|---|---|---|
| X | 0.00 | Y | 7.02 | Z | −1.43 |
| α | 87.14 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 5.04 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ④ | | (5) | 1.4924 | 57.6 |
| 11 | FFS ⑥ | | (7) | | |
| 12 | ∞ (HRP4) | 1.00 | (8) | | |
| Image plane | ∞ | | | | |

FFS ①

$C_4$ $-1.1740 \times 10^{-2}$  $C_6$ $-3.6667 \times 10^{-3}$

FFS ②

$C_4$ $-1.6987 \times 10^{-2}$  $C_6$ $-1.4413 \times 10^{-2}$

FFS ③

$C_4$ $-1.7505 \times 10^{-2}$  $C_6$ $-3.4621 \times 10^{-2}$

FFS ④

$C_4$ $1.6462 \times 10^{-2}$  $C_6$ $-9.9311 \times 10^{-3}$

FFS ⑤

$C_4$ $-3.3964 \times 10^{-2}$  $C$ $-3.6688 \times 10^{-2}$

FFS ⑥

$C_4$ $-9.8865 \times 10^{-2}$  $C_6$ $-1.4776 \times 10^{-1}$

Displacement and tilt (1)

| X | 0.00 | Y | 9.25 | Z | 24.36 |
|---|---|---|---|---|---|
| α | 23.55 | β | 0.00 | γ | 0.00 |

Displacement and tilt (2)

| X | 0.00 | Y | 0.82 | Z | 35.17 |
|---|---|---|---|---|---|
| α | −15.70 | β | 0.00 | γ | 0.00 |

Displacement and tilt (3)

| X | 0.00 | Y | 14.77 | Z | 24.84 |
|---|---|---|---|---|---|
| α | 74.37 | β | 0.00 | γ | 0.00 |

Displacement and tilt (4)

| X | 0.00 | Y | 14.77 | Z | 24.84 |
|---|---|---|---|---|---|
| α | 90.43 | β | 0.00 | γ | 0.00 |

Displacement and tilt (5)

| X | 0.00 | Y | 2.17 | Z | −1.66 |
|---|---|---|---|---|---|
| α | 38.98 | β | 0.00 | γ | 0.00 |

Displacement and tilt (6)

| X | 0.00 | Y | 1.10 | Z | 4.84 |
|---|---|---|---|---|---|
| α | 1.70 | β | 0.00 | γ | 0.00 |

Displacement and tilt (7)

| X | 0.00 | Y | 7.02 | Z | −1.43 |
|---|---|---|---|---|---|
| α | 87.68 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 9.56 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ④ | | (5) | 1.4924 | 57.6 |
| 11 | FFS ⑥ | | (7) | | |
| 12 | ∞ (HRP4) | 0.51 | (8) | | |
| Image plane | ∞ | | | | |

FFS ①

$C_4$ $-1.5055 \times 10^{-2}$  $C_6$ $-8.5856 \times 10^{-3}$  $C_8$ $-3.3790 \times 10^{-4}$
$C_{10}$ $-1.0404 \times 10^{-4}$

FFS ②

$C_4$ $-1.8580 \times 10^{-2}$  $C_6$ $-1.5345 \times 10^{-2}$  $C_8$ $2.0759 \times 10^{-5}$
$C_{10}$ $1.7143 \times 10^{-5}$

FFS ③

$C_4$ $-1.3978 \times 10^{-2}$  $C_6$ $-3.4820 \times 10^{-2}$

FFS ④

$C_4$ $-4.0939 \times 10^{-3}$  $C_6$ $4.8208 \times 10^{-3}$  $C_8$ $-2.5493 \times 10^{-3}$
$C_{10}$ $3.6057 \times 10^{-5}$

FFS ⑤

$C_4$ $-3.3823 \times 10^{-2}$  $C_5$ $-2.5597 \times 10^{-2}$  $C_8$ $-1.0466 \times 10^{-3}$
$C_{10}$ $-6.5767 \times 10^{-4}$

FFS ⑥

$C_4$ $-1.1225 \times 10^{-1}$  $C_6$ $-1.8840 \times 10^{-1}$

Displacement and tilt (1)

| X | 0.00 | Y | 6.48 | Z | 25.64 |
|---|---|---|---|---|---|
| α | 23.08 | β | 0.00 | γ | 0.00 |

Displacement and tilt (2)

| X | 0.00 | Y | 0.66 | Z | 34.52 |
|---|---|---|---|---|---|
| α | −13.75 | β | 0.00 | γ | 0.00 |

Displacement and tilt (3)

| X | 0.00 | Y | 12.66 | Z | 26.80 |
|---|---|---|---|---|---|
| α | 79.56 | β | 0.00 | γ | 0.00 |

Displacement and tilt (4)

| X | 0.00 | Y | 12.66 | Z | 26.80 |
|---|---|---|---|---|---|
| α | 79.37 | β | 0.00 | γ | 0.00 |

Displacement and tilt (5)

| X | 0.00 | Y | 2.81 | Z | −1.97 |
|---|---|---|---|---|---|
| α | 34.07 | β | 0.00 | γ | 0.00 |

Displacement and tilt (6)

| X | 0.00 | Y | 0.76 | Z | 3.34 |
|---|---|---|---|---|---|
| α | −4.19 | β | 0.00 | γ | 0.00 |

-continued

|   | Displacement and tilt (7) | | | | |
|---|---|---|---|---|---|
| X | 0.00 | Y | 10.39 | Z | −1.87 |
| α | 94.60 | β | 0.00 | γ | 0.00 |
|   | Displacement and tilt (8) | | | | |
| X | 0.00 | Y | 10.39 | Z | −1.87 |
| α | 86.65 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 7.00 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ④ | | (5) | 1.4924 | 57.6 |
| 11 | FFS ⑥ | | (7) | | |
| 12 | ∞ (HRP4) | 0.41 | (8) | | |
| Image plane | ∞ | | | | |

FFS ①

$C_4$ −1.7887 × 10⁻² $C_6$ −7.1191 × 10⁻³ $C_8$ −7.1811 × 10⁻⁴
$C_{10}$ −8.7381 × 10⁻⁵ $C_{11}$ −1.5915 × 10⁻⁶ $C_{13}$ −1.3947 × 10⁻⁵
$C_{15}$ 1.6001 × 10⁻⁶

FFS ②

$C_4$ −1.8463 × 10⁻² $C_6$ −1.4668 × 10⁻² $C_8$ −3.9541 × 10⁻⁵
$C_{10}$ 3.5790 × 10⁻⁶ $C_{11}$ −1.7710 × 10⁻⁶ $C_{13}$ −3.2373 × 10⁻⁶
$C_{15}$ −4.7180 × 10⁻⁷

FFS ③

$C_4$ −1.1402 × 10⁻² $C_6$ −3.6961 × 10⁻²

FFS ④

$C_4$ −1.7857 × 10⁻³ $C_6$ 3.8405 × 10⁻³ $C_8$ −1.9232 × 10⁻³
$C_{10}$ −4.2231 × 10⁻⁵ $C_{11}$ −6.1348 × 10⁻⁵ $C_{13}$ −1.3605 × 10⁻⁴
$C_{15}$ −1.4801 × 10⁻⁵

FFS ⑤

$C_4$ −3.6345 × 10⁻² $C_6$ −2.7942 × 10⁻² $C_8$ −9.3574 × 10⁻⁴
$C_{10}$ −6.5448 × 10⁻⁴ $C_{11}$ −2.8906 × 10⁻⁵ $C_{13}$ 3.8571 × 10⁻⁵
$C_{15}$ 1.9050 × 10⁻⁶

FFS ⑥

$C_4$ −1.2578 × 10⁻¹ $C_6$ −1.6091 × 10⁻¹

|   | Displacement and tilt (1) | | | | |
|---|---|---|---|---|---|
| X | 0.00 | Y | 7.40 | Z | 24.99 |
| α | 25.04 | β | 0.00 | γ | 0.00 |
|   | Displacement and tilt (2) | | | | |
| X | 0.00 | Y | 0.82 | Z | 35.05 |
| α | −13.26 | β | 0.00 | γ | 0.00 |
|   | Displacement and tilt (3) | | | | |
| X | 0.00 | Y | 14.81 | Z | 25.87 |
| α | 81.32 | β | 0.00 | γ | 0.00 |
|   | Displacement and tilt (4) | | | | |
| X | 0.00 | Y | 14.81 | Z | 25.87 |
| α | 84.20 | β | 0.00 | γ | 0.00 |

-continued

|   | Displacement and tilt (5) | | | | |
|---|---|---|---|---|---|
| X | 0.00 | Y | 2.06 | Z | −1.52 |
| α | 35.77 | β | 0.00 | γ | 0.00 |
|   | Displacement and tilt (6) | | | | |
| X | 0.00 | Y | 0.65 | Z | 2.78 |
| α | −2.50 | β | 0.00 | γ | 0.00 |
|   | Displacement and tilt (7) | | | | |
| X | 0.00 | Y | 10.04 | Z | −1.48 |
| α | 91.70 | β | 0.00 | γ | 0.00 |
|   | Displacement and tilt (8) | | | | |
| X | 0.00 | Y | 10.04 | Z | −1.48 |
| α | 88.74 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 15.78 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑤ | | (6) | | |
| 12 | ∞ (HRP4) | 5.53 | (8) | | |
| Image plane | ∞ | | | | |

FFS ①

$C_4$ −2.1352 × 10⁻³ $C_6$ −2.7821 × 10⁻³

FFS ②

$C_4$ −1.0991 × 10⁻² $C_6$ −1.0014 × 10⁻²

FFS ③

$C_4$ 1.6930 × 10⁻² $C_6$ −2.8124 × 10⁻³

FFS ④

$C_4$ 9.9432 × 10⁻² $C_6$ 8.9863 × 10⁻²

FFS ⑤

$C_4$ 8.5061 × 10⁻³ $C_6$ 7.9882 × 10⁻⁴

FFS ⑥

$C_4$ 3.1308 × 10⁻² $C_6$ 2.2950 × 10⁻²

|   | Displacement and tilt (1) | | | | |
|---|---|---|---|---|---|
| X | 0.00 | Y | 7.50 | Z | 28.01 |
| α | 1.15 | β | 0.00 | γ | 0.00 |
|   | Displacement and tilt (2) | | | | |
| X | 0.00 | Y | −0.04 | Z | 33.94 |
| α | −26.11 | β | 0.00 | γ | 0.00 |
|   | Displacement and tilt (3) | | | | |
| X | 0.00 | Y | 14.32 | Z | 32.95 |
| α | 49.11 | β | 0.00 | γ | 0.00 |
|   | Displacement and tilt (4) | | | | |
| X | 0.00 | Y | 14.32 | Z | 32.95 |
| α | 56.56 | β | 0.00 | γ | 0.00 |

-continued

|  | Displacement and tilt (5) | | | | |
|---|---|---|---|---|---|
| X | 0.00 | Y | 0.00 | Z | 0.00 |
| α | −3.28 | β | 0.00 | γ | 0.00 |
|  | Displacement and tilt (6) | | | | |
| X | 0.00 | Y | 0.33 | Z | 8.52 |
| α | −53.52 | β | 0.00 | γ | 0.00 |
|  | Displacement and tilt (7) | | | | |
| X | 0.00 | Y | 4.45 | Z | 9.96 |
| α | −83.39 | β | 0.00 | γ | 0.00 |
|  | Displacement and tilt (8) | | | | |
| X | 0.00 | Y | 2.36 | Z | 11.29 |
| α | −59.35 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 13.08 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑤ | | (6) | | |
| 12 | ∞ (HRP4) | 6.43 | (8) | | |
| Image plane | ∞ | | | | |

FFS ①

$C_4$ −3.8633 × 10⁻³  $C_6$ −4.5631 × 10⁻³  $C_8$ 1.1650 × 10⁻⁴
$C_{10}$ −6.3018 × 10⁻⁵

FFS ②

$C_4$ −1.2245 × 10⁻²  $C_6$ 1.1465 × 10⁻²  $C_8$ 7.9339 × 10⁻⁵
$C_{10}$ −2.5206 × 10⁻⁵

FFS ③

$C_4$ −1.8839 × 10⁻²  $C_6$ −3.0866 × 10⁻²

FFS ④

$C_4$ 8.0932 × 10⁻²  $C_6$ 7.5633 × 10⁻²

FFS ⑤

$C_4$ 5.7606 × 10⁻³  $C_6$ 1.7559 × 10⁻³  $C_8$ −8.9206 × 10⁻⁴
$C_{10}$ −9.8984 × 10⁻⁵

FFS ⑥

$C_4$ 3.0744 × 10⁻²  $C_6$ 2.4660 × 10⁻²  $C_8$ −5.9988 × 10⁻⁴
$C_{10}$ −1.4801 × 10⁻⁵

|  | Displacement and tilt (1) | | | | |
|---|---|---|---|---|---|
| X | 0.00 | Y | 7.77 | Z | 28.05 |
| α | 1.48 | β | 0.00 | γ | 0.00 |
|  | Displacement and tilt (2) | | | | |
| X | 0.00 | Y | −0.07 | Z | 34.00 |
| α | −26.70 | β | 0.00 | γ | 0.00 |
|  | Displacement and tilt (3) | | | | |
| X | 0.00 | Y | 14.36 | Z | 32.53 |
| α | 52.98 | β | 0.00 | γ | 0.00 |
|  | Displacement and tilt (4) | | | | |
| X | 0.00 | Y | 14.36 | Z | 32.53 |
| α | 57.09 | β | 0.00 | γ | 0.00 |
|  | Displacement and tilt (5) | | | | |
| X | 0.00 | Y | 0.00 | Z | 0.00 |
| α | 4.16 | β | 0.00 | γ | 0.00 |
|  | Displacement and tilt (6) | | | | |
| X | 0.00 | Y | −0.45 | Z | 9.31 |
| α | −59.98 | β | 0.00 | γ | 0.00 |
|  | Displacement and tilt (7) | | | | |
| X | 0.00 | Y | 3.78 | Z | 11.48 |
| α | −93.67 | β | 0.00 | γ | 0.00 |
|  | Displacement and tilt (8) | | | | |
| X | 0.00 | Y | 1.30 | Z | 12.38 |
| α | −75.03 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 12.03 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑤ | | (6) | | |
| 12 | ∞ (HRP4) | 6.23 | (8) | | |
| Image plane | ∞ | | | | |

FFS ①

$C_4$ −7.0727 × 10⁻³  $C_6$ −4.9587 × 10⁻³  $C_8$ −5.1470 × 10⁻⁵
$C_{10}$ −4.3045 × 10⁻⁵  $C_{11}$ 5.5605 × 10⁻⁶  $C_{13}$ −7.1396 × 10⁻⁷
$C_{15}$ 1.0627 × 10⁻⁶

FFS ②

$C_4$ −1.4125 × 10⁻²  $C_6$ −1.1427 × 10⁻²  $C_8$ −5.8968 × 10⁻⁷
$C_{10}$ −9.1522 × 10⁻⁶  $C_{11}$ −1.1269 × 10⁻⁶  $C_{13}$ −6.2541 × 10⁻⁶
$C_{15}$ 1.3733 × 10⁻⁶

FFS ③

$C_4$ −1.4184 × 10⁻²  $C_6$ −3.4193 × 10⁻²  $C_{13}$ 2.4078 × 10⁻⁴

FFS ④

$C_4$ 8.9892 × 10⁻²  $C_6$ 7.6715 × 10⁻²

FFS ⑤

$C_4$ 5.4587 × 10⁻³  $C_6$ 1.4111 × 10⁻³  $C_8$ −1.1974 × 10⁻³
$C_{10}$ −2.3577 × 10⁻⁴  $C_{11}$ 2.1034 × 10⁻⁴  $C_{13}$ 1.6784 × 10⁻⁴
$C_{15}$ 1.9207 × 10⁻⁵

FFS ⑥

$C_4$ 2.9628 × 10⁻²  $C_6$ 2.5278 × 10⁻²  $C_8$ −4.9455 × 10⁻⁴
$C_{10}$ −2.9133 × 10⁻⁴  $C_{11}$ 6.6538 × 10⁻⁵  $C_{13}$ 4.3675 × 10⁻⁵
$C_{15}$ −8.5366 × 10⁻⁶

|  | Displacement and tilt (1) | | | | |
|---|---|---|---|---|---|
| X | 0.00 | Y | 8.27 | Z | 28.13 |
| α | 1.22 | β | 0.00 | γ | 0.00 |

-continued

|  | Displacement and tilt (2) | | | | |
|---|---|---|---|---|---|
| X | 0.00 | Y | −0.10 | Z | 34.26 |
| α | −27.37 | β | 0.00 | γ | 0.00 |
|  | Displacement and tilt (3) | | | | |
| X | 0.00 | Y | 14.97 | Z | 32.61 |
| α | 53.17 | β | 0.00 | γ | 0.00 |
|  | Displacement and tilt (4) | | | | |
| X | 0.00 | Y | 14.97 | Z | 32.61 |
| α | 57.76 | β | 0.00 | γ | 0.00 |
|  | Displacement and tilt (5) | | | | |
| X | 0.00 | Y | 0.00 | Z | 0.00 |
| α | 6.85 | β | 0.00 | γ | 0.00 |
|  | Displacement and tilt (6) | | | | |
| X | 0.00 | Y | −0.73 | Z | 9.04 |
| α | −62.57 | β | 0.00 | γ | 0.00 |
|  | Displacement and tilt (7) | | | | |
| X | 0.00 | Y | 3.53 | Z | 11.56 |
| α | −95.73 | β | 0.00 | γ | 0.00 |
|  | Displacement and tilt (8) | | | | |
| X | 0.00 | Y | 1.02 | Z | 12.43 |
| α | −74.92 | β | 0.00 | γ | 0.00 |

-continued

|  | Displacement and tilt (2) | | | | |
|---|---|---|---|---|---|
| X | 0.00 | Y | −0.09 | Z | 34.10 |
| α | −29.28 | β | 0.00 | γ | 0.00 |
|  | Displacement and tilt (3) | | | | |
| X | 0.00 | Y | 15.19 | Z | 32.53 |
| α | 35.99 | β | 0.00 | γ | 0.00 |
|  | Displacement and tilt (4) | | | | |
| X | 0.00 | Y | 15.19 | Z | 32.53 |
| α | 65.34 | β | 0.00 | γ | 0.00 |
|  | Displacement and tilt (5) | | | | |
| X | 0.00 | Y | 0.00 | Z | 0.00 |
| α | 1.13 | β | 0.00 | γ | 0.00 |
|  | Displacement and tilt (6) | | | | |
| X | 0.00 | Y | −0.10 | Z | 7.72 |
| α | 59.32 | β | 0.00 | γ | 0.00 |
|  | Displacement and tilt (7) | | | | |
| X | 0.00 | Y | −8.39 | Z | 12.40 |
| α | 102.55 | β | 0.00 | γ | 0.00 |
|  | Displacement and tilt (8) | | | | |
| X | 0.00 | Y | −3.11 | Z | 12.79 |
| α | 100.86 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 6.80 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑤ | | (6) | | |
| 12 | ∞ (HRP4) | 3.18 | (8) | | |
| Image plane | ∞ | | | | |

FFS ①

$C_4$ $-1.3180 \times 10^{-2}$  $C_6$ $-1.1026 \times 10^{-3}$

FFS ②

$C_4$ $-1.4413 \times 10^{-2}$  $C_6$ $-1.0398 \times 10^{-2}$

FFS ③

$C_4$ $-3.1202 \times 10^{-2}$  $C_6$ $2.2095 \times 10^{-3}$

FFS ④

$C_4$ $1.0578 \times 10^{-1}$  $C_6$ $1.4512 \times 10^{-1}$

FFS ⑤

$C_4$ $1.8082 \times 10^{-3}$  $C_6$ $-5.8333 \times 10^{-5}$

FFS ⑥

$C_4$ $4.0767 \times 10^{-2}$  $C_6$ $2.5861 \times 10^{-2}$

Displacement and tilt (1)

| X | 0.00 | Y | 9.11 | Z | 28.30 |
|---|---|---|---|---|---|
| α | −1.29 | β | 0.00 | γ | 0.00 |

EXAMPLE 11

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 12.28 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑤ | | (6) | | |
| 12 | ∞ (HRP4) | 5.68 | (8) | | |
| Image plane | ∞ | | | | |

FFS ①

$C_4$ $-1.6910 \times 10^{-2}$  $C_6$ $-5.8723 \times 10^{-4}$  $C_8$ $-6.9774 \times 10^{-5}$
$C_{10}$ $-3.4139 \times 10^{-6}$

FFS ②

$C_4$ $-1.7033 \times 10^{-2}$  $C_6$ $-8.3835 \times 10^{-3}$  $C_8$ $1.4296 \times 10^{-4}$
$C_{10}$ $3.6675 \times 10^{-5}$

FFS ③

$C_4$ $-4.0988 \times 10^{-2}$  $C_6$ $-1.8291 \times 10^{-2}$

FFS ④

$C_4$ $9.4988 \times 10^{-2}$  $C_6$ $8.8917 \times 10^{-2}$

FFS ⑤

$C_4$ $1.0855 \times 10^{-2}$  $C_6$ $3.6718 \times 10^{-3}$  $C_8$ $1.5822 \times 10^{-3}$
$C_{10}$ $1.0889 \times 10^{-4}$

FFS ⑥

$C_4$ $3.4243 \times 10^{-2}$  $C_6$ $2.9492 \times 10^{-2}$  $C_8$ $1.9938 \times 10^{-4}$
$C_{10}$ $-4.7959 \times 10^{-4}$ -continued Displacement and tilt (1)

| | | | | | |
|---|---|---|---|---|---|
| X | 0.00 | Y | 7.05 | Z | 28.25 |
| α | −1.82 | β | 0.00 | γ | 0.00 |

Displacement and tilt (2)

| | | | | | |
|---|---|---|---|---|---|
| X | 0.00 | Y | −0.07 | Z | 33.60 |
| α | −26.93 | β | 0.00 | γ | 0.00 |

Displacement and tilt (3)

| | | | | | |
|---|---|---|---|---|---|
| X | 0.00 | Y | 14.95 | Z | 35.00 |
| α | 50.13 | β | 0.00 | γ | 0.00 |

Displacement and tilt (4)

| | | | | | |
|---|---|---|---|---|---|
| X | 0.00 | Y | 14.95 | Z | 35.00 |
| α | 49.16 | β | 0.00 | γ | 0.00 |

Displacement and tilt (5)

| | | | | | |
|---|---|---|---|---|---|
| X | 0.00 | Y | 0.00 | Z | 0.00 |
| α | −10.82 | β | 0.00 | γ | 0.00 |

Displacement and tilt (6)

| | | | | | |
|---|---|---|---|---|---|
| X | 0.00 | Y | 1.16 | Z | 9.11 |
| α | 64.98 | β | 0.00 | γ | 0.00 |

Displacement and tilt (7)

| | | | | | |
|---|---|---|---|---|---|
| X | 0.00 | Y | −2.90 | Z | 11.71 |
| α | 100.50 | β | 0.00 | γ | 0.00 |

Displacement and tilt (8)

| | | | | | |
|---|---|---|---|---|---|
| X | 0.00 | Y | −0.27 | Z | 12.26 |
| α | 84.37 | β | 0.00 | γ | 0.00 |

EXAMPLE 12

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 10.91 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑤ | | (6) | | |
| 12 | ∞ (HRP4) | 5.18 | (8) | | |
| Image plane | ∞ | | | | |

FFS ①

$C_4$ −1.9096 × 10⁻² $C_6$ −1.3547 × 10⁻³ $C_8$ −5.6210 × 10⁻⁴
$C_{10}$ −6.4461 × 10⁻⁶ $C_{11}$ −1.1098 × 10⁻⁵ $C_{13}$ −2.3560 × 10⁻⁵
$C_{15}$ 3.3761 × 10⁻⁸

FFS ②

$C_4$ −1.8239 × 10⁻² $C_6$ −8.9171 × 10⁻³ $C_8$ 1.1406 × 10⁻⁵
$C_{10}$ 5.3241 × 10⁻⁵ $C_{11}$ −6.3250 × 10⁻⁶ $C_{13}$ −2.6267 × 10⁻⁶
$C_{15}$ −3.0365 × 10⁻⁶

FFS ③

$C_4$ −3.0246 × 10⁻² $C_6$ −1.7398 × 10⁻²

FFS ④

$C_4$ 1.1524 × 10⁻¹ $C_6$ 1.1446 × 10⁻¹ $C_{13}$ 7.5953 × 10⁻⁴

FFS ⑤

$C_4$ 1.6397 × 10⁻² $C_6$ 5.0103 × 10⁻³ $C_8$ 1.3889 × 10⁻³
$C_{10}$ 1.7312 × 10⁻⁴ $C_{11}$ 6.3731 × 10⁻⁴ $C_{13}$ 1.3225 × 10⁻⁴
$C_{15}$ 2.1708 × 16⁻⁶

FFS ⑥

$C_4$ 3.5295 × 10⁻² $C_6$ 3.2153 × 10⁻² $C_8$ −2.8039 × 10⁻⁴
$C_{10}$ −6.9556 × 10⁻⁴ $C_{11}$ 1.8135 × 10⁻⁴ $C_{13}$ 2.2391 × 10⁻⁴
$C_{15}$ 1.9137 × 10⁻⁶

Displacement and tilt (1)

| | | | | | |
|---|---|---|---|---|---|
| X | 0.00 | Y | 7.15 | Z | 28.08 |
| α | −0.14 | β | 0.00 | γ | 0.00 |

Displacement and tilt (2)

| | | | | | |
|---|---|---|---|---|---|
| X | 0.00 | Y | −0.04 | Z | 33.70 |
| α | −26.21 | β | 0.00 | γ | 0.00 |

Displacement and tilt (3)

| | | | | | |
|---|---|---|---|---|---|
| X | 0.00 | Y | 15.11 | Z | 34.36 |
| α | 43.62 | β | 0.00 | γ | 0.00 |

Displacement and tilt (4)

| | | | | | |
|---|---|---|---|---|---|
| X | 0.00 | Y | 15.11 | Z | 34.36 |
| α | 55.79 | β | 0.00 | γ | 0.00 |

Displacement and tilt (5)

| | | | | | |
|---|---|---|---|---|---|
| X | 0.00 | Y | 0.00 | Z | 0.00 |
| α | −5.75 | β | 0.00 | γ | 0.00 |

Displacement and tilt (6)

| | | | | | |
|---|---|---|---|---|---|
| X | 0.00 | Y | 0.64 | Z | 9.53 |
| α | 61.30 | β | 0.00 | γ | 0.00 |

Displacement and tilt (7)

| | | | | | |
|---|---|---|---|---|---|
| X | 0.00 | Y | −4.02 | Z | 12.09 |
| α | 96.39 | β | 0.00 | γ | 0.00 |

Displacement and tilt (8)

| | | | | | |
|---|---|---|---|---|---|
| X | 0.00 | Y | −1.14 | Z | 12.91 |
| α | 79.57 | β | 0.00 | γ | 0.00 |

EXAMPLE 13

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 11.14 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑦ | | (8) | | |
| 12 | ∞ (HRP4) | 1.34 | (9) | | |
| Image plane | ∞ | | | | |

FFS ①

$C_4$ −2.3499 × 10⁻² $C_6$ −8.6520 × 10⁻³ $C_8$ −4.2543 × 10⁻⁴
$C_{10}$ −1.7155 × 10⁻⁴

FFS ②

$C_4$ −1.9807 × 10⁻² $C_6$ −1.4787 × 10⁻² $C_8$ 3.8056 × 10⁻⁵
$C_{10}$ 1.7079 × 10⁻⁵

FFS ③

$C_4$ −2.8245 × 10⁻² $C_6$ −3.8828 × 10⁻²

FFS ④

-continued

| | | | | | | |
|---|---|---|---|---|---|---|
| $C_4$ | $1.3907 \times 10^{-1}$ | $C_6$ | $7.1665 \times 10^{-2}$ | | | |

FFS ⑤

| | | | | | | |
|---|---|---|---|---|---|---|
| $C_4$ | $1.0570 \times 10^{-3}$ | $C_6$ | $-8.4255 \times 10^{-3}$ | $C_8$ | $1.1555 \times 10^{-3}$ | |
| $C_{10}$ | $4.7859 \times 10^{-4}$ | | | | | |

FFS ⑥

| | | | | | | |
|---|---|---|---|---|---|---|
| $C_4$ | $3.0156 \times 10^{-2}$ | $C_6$ | $2.1314 \times 10^{-2}$ | $C_8$ | $-5.6154 \times 10^{-5}$ | |
| $C_{10}$ | $-5.4065 \times 10^{-5}$ | | | | | |

FFS ⑦

| | | | | |
|---|---|---|---|---|
| $C_4$ | $-1.1029 \times 10^{-1}$ | $C_6$ | $-5.6921 \times 10^{-2}$ | |

Displacement and tilt (1)

| X | 0.00 | Y | 6.11 | Z | 27.99 |
|---|---|---|---|---|---|
| α | 2.71 | β | 0.00 | γ | 0.00 |

Displacement and tilt (2)

| X | 0.00 | Y | −0.06 | Z | 33.04 |
|---|---|---|---|---|---|
| α | −25.76 | β | 0.00 | γ | 0.00 |

Displacement and tilt (3)

| X | 0.00 | Y | 15.30 | Z | 34.14 |
|---|---|---|---|---|---|
| α | 59.93 | β | 0.00 | γ | 0.00 |

Displacement and tilt (4)

| X | 0.00 | Y | 15.30 | Z | 34.14 |
|---|---|---|---|---|---|
| α | 54.38 | β | 0.00 | γ | 0.00 |

Displacement and tilt (5)

| X | 0.00 | Y | 0.00 | Z | 0.00 |
|---|---|---|---|---|---|
| α | −1.42 | β | 0.00 | γ | 0.00 |

Displacement and tilt (6)

| X | 0.00 | Y | −0.05 | Z | 5.66 |
|---|---|---|---|---|---|
| α | 33.54 | β | 0.00 | γ | 0.00 |

Displacement and tilt (7)

| X | 0.00 | Y | −8.13 | Z | 2.32 |
|---|---|---|---|---|---|
| α | 45.23 | β | 0.00 | γ | 0.00 |

Displacement and tilt (8)

| X | 0.00 | Y | −5.49 | Z | 8.56 |
|---|---|---|---|---|---|
| α | 12.29 | β | 0.00 | γ | 0.00 |

Displacement and tilt (9)

| X | 0.00 | Y | −5.49 | Z | 8.56 |
|---|---|---|---|---|---|
| α | 28.25 | β | 0.00 | γ | 0.00 |

EXAMPLE 14

| Surface No. | Radius of curvature | Surface separation | Displacement and tilt | Refractive index | Abbe's No. |
|---|---|---|---|---|---|
| Object plane | ∞ | −1000.00 | | | |
| 1 | (Stop) (HRP1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |
| 5 | FFS ③ | | (3) | | |
| 6 | ∞ (HRP2) | 4.47 | (4) | | |
| 7 | ∞ (HRP3) | | | | |
| 8 | FFS ④ | | (5) | 1.4924 | 57.6 |
| 9 | FFS ⑤ | | (6) | 1.4924 | 57.6 |
| 10 | FFS ⑥ | | (7) | 1.4924 | 57.6 |
| 11 | FFS ⑦ | | (8) | | |
| 12 | ∞ (HRP4) | 1.89 | (9) | | |
| Image plane | ∞ | | | | |

FFS ①

| | | | | | | |
|---|---|---|---|---|---|---|
| $C_4$ | $-1.9161 \times 10^{-2}$ | $C_6$ | $-5.8442 \times 10^{-3}$ | $C_8$ | $-4.9432 \times 10^{-4}$ | |
| $C_{10}$ | $-1.1103 \times 10^{-4}$ | | | | | |

FFS ②

| | | | | | | |
|---|---|---|---|---|---|---|
| $C_4$ | $-1.9087 \times 10^{-2}$ | $C_6$ | $-1.3669 \times 10^{-2}$ | $C_8$ | $5.7404 \times 10^{-5}$ | |
| $C_{10}$ | $6.4353 \times 10^{-5}$ | | | | | |

FFS ③

| | | | | |
|---|---|---|---|---|
| $C_4$ | $-1.1135 \times 10^{-2}$ | $C_6$ | $-1.1057 \times 10^{-2}$ | |

FFS ④

| | | | | |
|---|---|---|---|---|
| $C_4$ | $1.0545 \times 10^{-1}$ | $C_6$ | $8.1797 \times 10^{-2}$ | |

FFS ⑤

| | | | | | | |
|---|---|---|---|---|---|---|
| $C_4$ | $-5.1182 \times 10^{-3}$ | $C_6$ | $-8.1314 \times 10^{-3}$ | $C_8$ | $2.4366 \times 10^{-3}$ | |
| $C_{10}$ | $1.1208 \times 10^{-3}$ | | | | | |

FFS ⑥

| | | | | | | |
|---|---|---|---|---|---|---|
| $C_4$ | $3.2033 \times 10^{-2}$ | $C_6$ | $2.5913 \times 10^{-2}$ | $C_8$ | $-2.3266 \times 10^{-4}$ | |
| $C_{10}$ | $-1.8538 \times 10^{-4}$ | | | | | |

FFS ⑦

| | | | | |
|---|---|---|---|---|
| $C_4$ | $-9.4509 \times 10^{-2}$ | $C_6$ | $-5.2203 \times 10^{-3}$ | |

Displacement and tilt (1)

| X | 0.00 | Y | 7.08 | Z | 28.05 |
|---|---|---|---|---|---|
| α | 1.62 | β | 0.00 | γ | 0.00 |

Displacement and tilt (2)

| X | 0.00 | Y | −0.07 | Z | 33.56 |
|---|---|---|---|---|---|
| α | −26.56 | β | 0.00 | γ | 0.00 |

Displacement and tilt (3)

| X | 0.00 | Y | 17.17 | Z | 34.95 |
|---|---|---|---|---|---|
| α | 80.43 | β | 0.00 | γ | 0.00 |

Displacement and tilt (4)

| X | 0.00 | Y | 17.17 | Z | 34.95 |
|---|---|---|---|---|---|
| α | 41.73 | β | 0.00 | γ | 0.00 |

Displacement and tilt (5)

| X | 0.00 | Y | 0.00 | Z | 0.00 |
|---|---|---|---|---|---|
| α | −11.87 | β | 0.00 | γ | 0.00 |

Displacement and tilt (6)

| X | 0.00 | Y | −0.43 | Z | 6.16 |
|---|---|---|---|---|---|
| α | 29.66 | β | 0.00 | γ | 0.00 |

Displacement and tilt (7)

| X | 0.00 | Y | −8.83 | Z | 1.93 |
|---|---|---|---|---|---|
| α | 43.49 | β | 0.00 | γ | 0.00 |

Displacement and tilt (8)

| X | 0.00 | Y | −6.03 | Z | 8.29 |
|---|---|---|---|---|---|
| α | 8.28 | β | 0.00 | γ | 0.00 |

Displacement and tilt (9)

| X | 0.00 | Y | −6.03 | Z | 8.29 |
|---|---|---|---|---|---|
| α | 31.70 | β | 0.00 | γ | 0.00 |

EXAMPLE 15

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP 1) | | | | |
| 2 | FFS ① | | (1) | 1.4924 | 57.6 |
| 3 | FFS ② | | (2) | 1.4924 | 57.6 |
| 4 | FFS ① | | (1) | 1.4924 | 57.6 |

-continued

| | | | | | | |
|---|---|---|---|---|---|---|
| 5 | FFS③ | | (3) | | | |
| 6 | ∞ (HRP2) | 2.51 | (4) | | | |
| 7 | ∞ (HRP3) | | | | | |
| 8 | FFS④ | | (5) | 1.4924 | 57.6 | |
| 9 | FFS⑤ | | (6) | 1.4924 | 57.6 | |
| 10 | FFS⑥ | | (7) | 1.4924 | 57.6 | |
| 11 | FFS⑦ | | (8) | | | |
| 12 | ∞ (HRP4) | 2.07 | (9) | | | |
| Image plane | ∞ | | | | | |

FFS①

| | | | | | |
|---|---|---|---|---|---|
| $C_4$ | $-2.0479 \times 10^{-2}$ | $C_6$ | $-8.7015 \times 10^{-3}$ | $C_8$ | $-9.9888 \times 10^{-4}$ |
| $C_{10}$ | $-4.2781 \times 10^{-4}$ | $C_{11}$ | $4.3580 \times 10^{-6}$ | $C_{13}$ | $-2.9671 \times 10^{-5}$ |
| $C_{15}$ | $-7.1280 \times 10^{-6}$ | | | | |

FFS②

| | | | | | |
|---|---|---|---|---|---|
| $C_4$ | $-1.7860 \times 10^{-2}$ | $C_6$ | $-1.4499 \times 10^{-2}$ | $C_8$ | $-6.8791 \times 10^{-5}$ |
| $C_{10}$ | $-6.8404 \times 10^{-5}$ | $C_{11}$ | $-1.8544 \times 10^{-6}$ | $C_{13}$ | $-5.6568 \times 10^{-6}$ |
| $C_{15}$ | $-1.0225 \times 10^{-6}$ | | | | |

FFS③

| | | | |
|---|---|---|---|
| $C_4$ | $-1.4680 \times 10^{-2}$ | $C_6$ | $-1.3961 \times 10^{-2}$ |

FFS④

| | | | | | |
|---|---|---|---|---|---|
| $C_4$ | $1.1172 \times 10^{-1}$ | $C_6$ | $1.1549 \times 10^{-1}$ | $C_{13}$ | $1.1962 \times 10^{-4}$ |

FFS⑤

| | | | | | |
|---|---|---|---|---|---|
| $C_4$ | $-7.2706 \times 10^{-3}$ | $C_6$ | $-7.2547 \times 10^{-3}$ | $C_8$ | $1.8149 \times 10^{-3}$ |
| $C_{10}$ | $1.1574 \times 10^{-3}$ | $C_{11}$ | $4.8973 \times 10^{-4}$ | $C_{13}$ | $4.7130 \times 10^{-4}$ |
| $C_{15}$ | $1.1543 \times 10^{-4}$ | | | | |

FFS⑥

| | | | | | |
|---|---|---|---|---|---|
| $C_4$ | $3.7106 \times 10^{-2}$ | $C_6$ | $2.8250 \times 10^{-2}$ | $C_8$ | $-3.0084 \times 10^{-5}$ |
| $C_{10}$ | $6.1226 \times 10^{-5}$ | $C_1$ | $-4.6409 \times 10^{-5}$ | $C_{13}$ | $6.4701 \times 10^{-5}$ |
| $C_{15}$ | $-1.1812 \times 10^{-5}$ | | | | |

FFS⑦

| | | | | | |
|---|---|---|---|---|---|
| $C_4$ | $-6.7795 \times 10^{-2}$ | $C_6$ | $1.7998 \times 10^{-2}$ | $C_{13}$ | $-1.4615 \times 10^{-3}$ |

Displacement and tilt (1)

| X | 0.00 | Y | 7.79 | Z | 28.07 |
|---|---|---|---|---|---|
| α | 2.10 | β | 0.00 | γ | 0.00 |

Displacement and tilt (2)

| X | 0.00 | Y | -0.07 | Z | 33.77 |
|---|---|---|---|---|---|
| α | -27.33 | β | 0.00 | γ | 0.00 |

Displacement and tilt (3)

| X | 0.00 | Y | 17.42 | Z | 34.03 |
|---|---|---|---|---|---|
| α | 83.74 | β | 0.00 | γ | 0.00 |

Displacement and tilt (4)

| X | 0.00 | Y | 17.42 | Z | 34.03 |
|---|---|---|---|---|---|
| α | 43.71 | β | 0.00 | γ | 0.00 |

Displacement and tilt (5)

| X | 0.00 | Y | 0.00 | Z | 0.00 |
|---|---|---|---|---|---|
| α | -1.40 | β | 0.00 | γ | 0.00 |

Displacement and tilt (6)

| X | 0.00 | Y | -0.06 | Z | 7.99 |
|---|---|---|---|---|---|
| α | 26.39 | β | 0.00 | γ | 0.00 |

Displacement and tilt (7)

| X | 0.00 | Y | -7.21 | Z | 2.66 |
|---|---|---|---|---|---|
| α | 35.09 | β | 0.00 | γ | 0.00 |

Displacement and tilt (8)

| X | 0.00 | Y | -5.22 | Z | 9.18 |
|---|---|---|---|---|---|
| α | 1.55 | β | 0.00 | γ | 0.00 |

Displacement and tilt (9)

| X | 0.00 | Y | -5.22 | Z | 9.18 |
|---|---|---|---|---|---|
| α | 24.87 | β | 0.00 | γ | 0.00 |

EXAMPLE 16

| Surface No. | Radius of curvature | Surface separation | Displacement and tilt | Refractive index | Abbe's No. |
|---|---|---|---|---|---|
| Object plane | ∞ | -1000 | | | |
| 1 | ∞ (Stop) (HRP 1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP 2) | 4.76 | (4) | | |
| 7 | ∞ (HRP 3) | | | | |
| 8 | FFS④ | | (5) | 1.4924 | 57.6 |
| 9 | FFS⑤ | | (6) | 1.4924 | 57.6 |
| 10 | FFS⑥ | | (7) | 1.4924 | 57.6 |
| 11 | FFS⑦ | | (8) | | |
| 12 | ∞ (HRP 4) | 1.00 | (9) | | |
| Image plane | ∞ | | | | |

FFS①

| | | | |
|---|---|---|---|
| $C_4$ | $-7.6454 \times 10^{-3}$ | $C_6$ | $-2.8468 \times 10^{-3}$ |

FFS②

| | | | |
|---|---|---|---|
| $C_4$ | $-1.6854 \times 10^{-2}$ | $C_6$ | $-1.0929 \times 10^{-2}$ |

FFS③

| | | | |
|---|---|---|---|
| $C_4$ | $1.5779 \times 10^{-2}$ | $C_6$ | $-2.8018 \times 10^{-2}$ |

FFS④

| | | | |
|---|---|---|---|
| $C_4$ | $2.0881 \times 10^{-1}$ | $C_6$ | $1.1255 \times 10^{-1}$ |

FFS⑤

| | | | |
|---|---|---|---|
| $C_4$ | $-3.7791 \times 10^{-3}$ | $C_6$ | $-1.0593 \times 10^{-2}$ |

FFS⑥

| | | | |
|---|---|---|---|
| $C_4$ | $3.7853 \times 10^{-2}$ | $C_6$ | $4.1047 \times 10^{-2}$ |

FFS⑦

| | | | |
|---|---|---|---|
| $C_4$ | $-9.8021 \times 10^{-2}$ | $C_6$ | $-7.5079 \times 10^{-2}$ |

Displacement and tilt (1)

| X | 0.00 | Y | 7.94 | Z | 27.95 |
|---|---|---|---|---|---|
| α | 1.62 | β | 0.00 | γ | 0.00 |

Displacement and tilt (2)

| X | 0.00 | Y | -0.03 | Z | 33.65 |
|---|---|---|---|---|---|
| α | -27.38 | β | 0.00 | γ | 0.00 |

Displacement and tilt (3)

| X | 0.00 | Y | 14.70 | Z | 32.23 |
|---|---|---|---|---|---|
| α | 55.88 | β | 0.00 | γ | 0.00 |

Displacement and tilt (4)

| X | 0.00 | Y | 14.70 | Z | 32.23 |
|---|---|---|---|---|---|
| α | 58.58 | β | 0.00 | γ | 0.00 |

Displacement and tilt (5)

| X | 0.00 | Y | 0.00 | Z | 0.00 |
|---|---|---|---|---|---|
| α | -3.21 | β | 0.00 | γ | 0.00 |

Displacement and tilt (6)

| X | 0.00 | Y | -0.11 | Z | 6.07 |
|---|---|---|---|---|---|
| α | -32.02 | β | 0.00 | γ | 0.00 |

Displacement and tilt (7)

| X | 0.00 | Y | 6.31 | Z | 2.80 |
|---|---|---|---|---|---|
| α | -41.29 | β | 0.00 | γ | 0.00 |

Displacement and tilt (8)

| X | 0.00 | Y | 4.20 | Z | 8.74 |
|---|---|---|---|---|---|
| α | -20.70 | β | 0.00 | γ | 0.00 |

Displacement and tilt (9)

| X | 0.00 | Y | 4.20 | Z | 8.74 |
|---|---|---|---|---|---|
| α | -19.04 | β | 0.00 | γ | 0.00 |

EXAMPLE 17

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP 1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP 2) | 6.23 | (4) | | |
| 7 | ∞ (HRP 3) | | | | |
| 8 | FFS④ | | (5) | 1.4924 | 57.6 |
| 9 | FFS⑤ | | (6) | 1.4924 | 57.6 |
| 10 | FFS⑥ | | (7) | 1.4924 | 57.6 |
| 11 | FFS⑦ | | (8) | | |
| 12 | ∞ (HRP 4) | 1.51 | (9) | | |
| Image plane | ∞ | | | | |

FFS①
$C_4$ −2.4194 × 10$^{-3}$  $C_6$ −2.1663 × 10$^{-3}$  $C_8$ −2.1360 × 10$^{-5}$
$C_{10}$ −2.4917 × 10$^{-5}$

FFS②
$C_4$ −1.3725 × 10$^{-2}$  $C_6$ −1.0513 × 10$^{-2}$  $C_8$ 6.5365 × 10$^{-6}$
$C_{10}$ 5.5702 × 10$^{-6}$

FFS③
$C_4$ 1.4700 × 10$^{-3}$  $C_6$ −1.9997 × 10$^{-2}$

FFS④
$C_4$ 1.8506 × 10$^{-1}$  $C_6$ 1.2799 × 10$^{-1}$

FFS⑤
$C_4$ −7.6141 × 10$^{-3}$  $C_6$ −8.5729 × 10$^{-3}$  $C_8$ −5.9719 × 10$^{-5}$
$C_{10}$ −4.8917 × 10$^{-4}$

FFS⑥
$C_4$ 3.7905 × 10$^{-2}$  $C_6$ 3.8264 × 10$^{-2}$  $C_8$ −2.1999 × 10$^{-3}$
$C_{10}$ −1.1893 × 10$^{-3}$

FFS⑦
$C_4$ −7.0960 × 10$^{-2}$  $C_6$ −3.1329 × 10$^{-2}$

| | Displacement and tilt (1) | | | | |
|---|---|---|---|---|---|
| X | 0.00 | Y | 7.80 | Z | 28.01 |
| α | 0.80 | β | 0.00 | γ | 0.00 |
| | Displacement and tilt (2) | | | | |
| X | 0.00 | Y | −0.03 | Z | 33.78 |
| α | −26.96 | β | 0.00 | γ | 0.00 |
| | Displacement and tilt (3) | | | | |
| X | 0.00 | Y | 14.33 | Z | 32.54 |
| α | 56.00 | β | 0.00 | γ | 0.00 |
| | Displacement and tilt (4) | | | | |
| X | 0.00 | Y | 14.33 | Z | 32.54 |
| α | 54.84 | β | 0.00 | γ | 0.00 |
| | Displacement and tilt (5) | | | | |
| X | 0.00 | Y | 0.00 | Z | 0.00 |
| α | −3.39 | β | 0.00 | γ | 0.00 |
| | Displacement and tilt (6) | | | | |
| X | 0.00 | Y | −0.12 | Z | 6.00 |
| α | −32.16 | β | 0.00 | γ | 0.00 |
| | Displacement and tilt (7) | | | | |
| X | 0.00 | Y | 6.10 | Z | 2.86 |
| α | −42.02 | β | 0.00 | γ | 0.00 |
| | Displacement and tilt (8) | | | | |
| X | 0.00 | Y | 4.22 | Z | 7.81 |
| α | −9.50 | β | 0.00 | γ | 0.00 |
| | Displacement and tilt (9) | | | | |
| X | 0.00 | Y | 4.22 | Z | 7.81 |
| α | −26.55 | β | 0.00 | γ | 0.00 |

EXAMPLE 18

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞ (Stop) (HRP 1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP 2) | 2.98 | (4) | | |
| 7 | ∞ (HRP 3) | | | | |
| 8 | FFS④ | | (5) | 1.4924 | 57.6 |
| 9 | FFS⑤ | | (6) | 1.4924 | 57.6 |
| 10 | FFS⑥ | | (7) | 1.4924 | 57.6 |
| 11 | FFS⑦ | | (8) | | |
| 12 | ∞ (HRP 4) | 3.12 | (9) | | |
| Image plane | ∞ | | | | |

FFS①
$C_4$ −1.5567 × 10$^{-2}$  $C_6$ −9.8265 × 10$^{-3}$  $C_8$ 9.2621 × 10$^{-6}$
$C_{10}$ 1.9950 × 10$^{-4}$  $C_{11}$ 1.2100 × 10$^{-5}$  $C_{13}$ 1.3242 × 10$^{-5}$
$C_{15}$ 1.3443 × 10$^{-5}$

FFS②
$C_4$ −1.8725 × 10$^{-2}$  $C_6$ −1.4875 × 10$^{-2}$  $C_8$ 8.0934 × 10$^{-6}$
$C_{10}$ 2.7949 × 10$^{-5}$  $C_{11}$ −4.0076 × 10$^{-6}$  $C_{13}$ −8.1320 × 10$^{-6}$
$C_{15}$ −3.4300 × 10$^{-6}$

FFS③
$C_4$ 9.3211 × 10$^{-4}$  $C_6$ −2.4180 × 10$^{-2}$  $C_{13}$ 1.3613 × 10$^{-4}$

FFS④
$C_4$ 8.2881 × 10$^{-2}$  $C_6$ 9.5692 × 10$^{-2}$  $C_{13}$ −2.0805 × 10$^{-4}$

FFS⑤
$C_4$ −1.0583 × 10$^{-2}$  $C_6$ −3.8868 × 10$^{-3}$  $C_8$ −5.4366 × 10$^{-4}$
$C_{10}$ −1.1937 × 10$^{-4}$  $C_{11}$ 1.9092 × 10$^{-4}$  $C_{13}$ 4.5836 × 10$^{-4}$
$C_{15}$ 3.4440 × 10$^{-4}$

FFS⑥
$C_4$ 2.6673 × 10$^{-2}$  $C_6$ 2.7967 × 10$^{-2}$  $C_8$ −9.4163 × 10$^{-4}$
$C_{10}$ −6.6668 × 10$^{-4}$  $C_{11}$ 2.0790 × 10$^{-5}$  $C_{13}$ 1.9783 × 10$^{-5}$
$C_{15}$ 2.6945 × 10$^{-5}$

FFS⑦
$C_4$ −6.3450 × 10$^{-3}$  $C_6$ −7.8176 × 10$^{-3}$  $C_{13}$ −1.3227 × 10$^{-3}$

| | Displacement and tilt (1) | | | | |
|---|---|---|---|---|---|
| X | 0.00 | Y | 9.34 | Z | 27.73 |
| α | 7.21 | β | 0.00 | γ | 0.00 |
| | Displacement and tilt (2) | | | | |
| X | 0.00 | Y | −0.14 | Z | 34.95 |
| α | −26.97 | β | 0.00 | γ | 0.00 |
| | Displacement and tilt (3) | | | | |
| X | 0.00 | Y | 16.65 | Z | 30.81 |
| α | 42.00 | β | 0.00 | γ | 0.00 |
| | Displacement and tilt (4) | | | | |
| X | 0.00 | Y | 16.65 | Z | 30.81 |
| α | 81.40 | β | 0.00 | γ | 0.00 |
| | Displacement and tilt (5) | | | | |
| X | 0.00 | Y | 0.00 | Z | 0.00 |
| α | −13.29 | β | 0.00 | γ | 0.00 |
| | Displacement and tilt (6) | | | | |
| X | 0.00 | Y | −0.59 | Z | 7.60 |
| α | −31.92 | β | 0.00 | γ | 0.00 |
| | Displacement and tilt (7) | | | | |
| X | 0.00 | Y | 6.50 | Z | 3.41 |
| α | −42.43 | β | 0.00 | γ | 0.00 |
| | Displacement and tilt (8) | | | | |
| X | 0.00 | Y | 3.55 | Z | 9.61 |
| α | −20.98 | β | 0.00 | γ | 0.00 |
| | Displacement and tilt (9) | | | | |
| X | 0.00 | Y | 3.55 | Z | 9.61 |
| α | −27.66 | β | 0.00 | γ | 0.00 |

Figure 19:
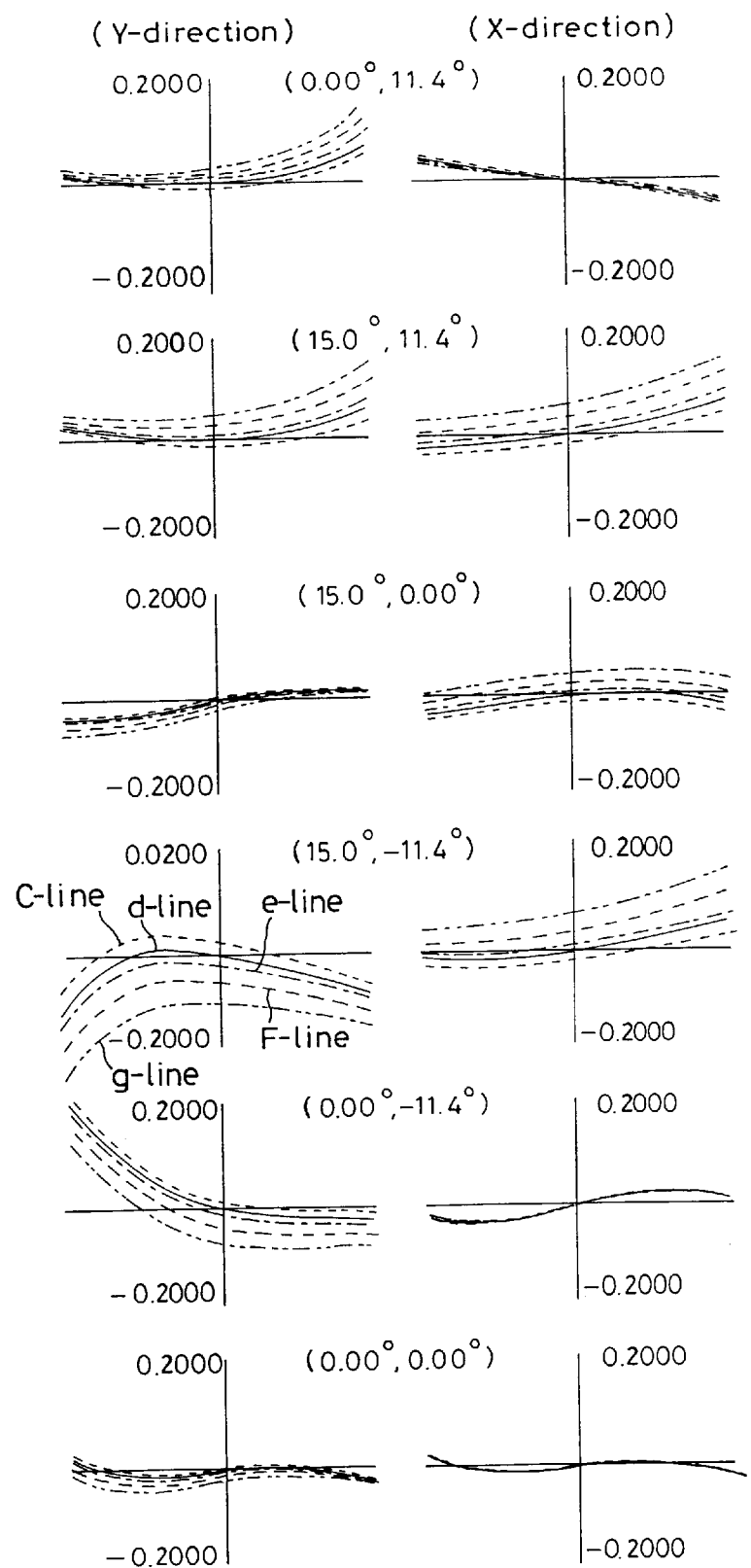
FIG. 19 is an aberrational diagram showing lateral aberrations in Example 1.

FIG. 19 is an aberrational diagram showing lateral aberrations in the above-described Example 1. In the diagram showing lateral aberrations, the numerals in the parentheses denote [horizontal (X-direction) field angle, vertical (Y-direction) field angle], and lateral aberrations at the field angles are shown.

The values concerning the conditions (1) to (7) in the above-described Examples 1 to 18 are as follows:

|  |  | Ex. 1 | Ex. 2 | Ex. 3 | Ex. 4 | Ex. 5 | Ex. 6 |
|---|---|---|---|---|---|---|---|
| (1) |  | 280 | 280 | 280 | 280 | 280 | 280 |
| (2) | X | 1.207 | 1.279 | 1.156 | 1.250 | 1.242 | 1.229 |
|  | Y | 1.458 | 1.233 | 1.253 | 1.174 | 1.443 | 1.365 |
| (3) | X | 0.829 | 0.782 | 0.865 | 0.800 | 0.805 | 0.814 |
|  | Y | 0.686 | 0.811 | 0.798 | 0.852 | 0.693 | 0.733 |
| (4) | X | 1.14 | 1.09 | 1.18 | 1.04 | 1.12 | 1.13 |
|  | Y | 0.78 | 0.83 | 0.90 | 0.89 | 0.97 | 0.95 |
| (5) | X | 2.53 | 2.65 | 2.30 | 2.08 | 2.04 | 2.22 |
|  | Y | 2.05 | 2.40 | 2.08 | 2.26 | 1.62 | 1.81 |

|  |  | Ex. 7 | Ex. 8 | Ex. 9 | Ex. 10 | Ex. 11 | Ex. 12 |
|---|---|---|---|---|---|---|---|
| (1) |  | 311 | 350 | 350 | 311 | 350 | 350 |
| (2) | X | 1.465 | 1.415 | 1.369 | 1.704 | 1.452 | 1.388 |
|  | Y | 1.518 | 1.478 | 1.459 | 1.236 | 1.618 | 1.435 |
| (3) | X | 0.683 | 0.707 | 0.730 | 0.587 | 0.689 | 0.721 |
|  | Y | 0.659 | 0.676 | 0.685 | 0.809 | 0.618 | 0.697 |
| (4) | X | 0.77 | 0.86 | 1.01 | 0.94 | 1.27 | 1.39 |
|  | Y | 0.69 | 0.80 | 0.83 | 0.73 | 0.54 | 0.67 |
| (6) | X | 2.19 | 2.16 | 2.11 | 2.65 | 2.56 | 2.69 |
|  | Y | 1.57 | 1.73 | 1.83 | 1.82 | 1.89 | 2.41 |

|  |  | Ex. 13 | Ex. 14 | Ex. 15 | Ex. 16 | Ex. 17 | Ex. 18 |
|---|---|---|---|---|---|---|---|
| (1) |  | 350 | 311 | 311 | 350 | 350 | 311 |
| (2) | X | 1.438 | 1.550 | 1.624 | 1.108 | 1.189 | 1.131 |
|  | Y | 1.577 | 1.256 | 1.208 | 1.459 | 1.416 | 1.207 |
| (3) | X | 0.696 | 0.645 | 0.616 | 0.903 | 0.841 | 0.884 |
|  | Y | 0.634 | 0.796 | 0.828 | 0.686 | 0.706 | 0.828 |
| (4) | X | 1.56 | 1.23 | 1.21 | 1.27 | 1.03 | 1.26 |
|  | Y | 1.02 | 0.93 | 1.03 | 0.72 | 0.72 | 1.05 |
| (7) | X | −0.034 | 0.160 | 0.194 | 0.101 | 0.200 | 0.394 |
|  | Y | 0.397 | 0.313 | 0.255 | 0.257 | 0.222 | 0.136 |

In the above-described Examples 1 to 18, the first prism 10 that constitutes the image-forming optical system and viewing optical system according to the present invention is of the type in which there are two internal reflections. It should, however, be noted that prisms usable in the image-forming optical system and viewing optical system according to the present invention are not necessarily limited to the described type. Some examples of prisms usable as the first prism 10 in the image-forming optical system and viewing optical system according to the present invention will be described below with reference to FIGS. 31 to 37. In all the following examples, the prisms will be described as a prism P that forms an image on an image plane 36. It should, however, be noted that these prisms are also usable as a prism P in which rays from an image display device enter the prism P from the image plane side (36) and an image is formed on the pupil side (31), by reversing the illustrated optical path.

Figure 31:
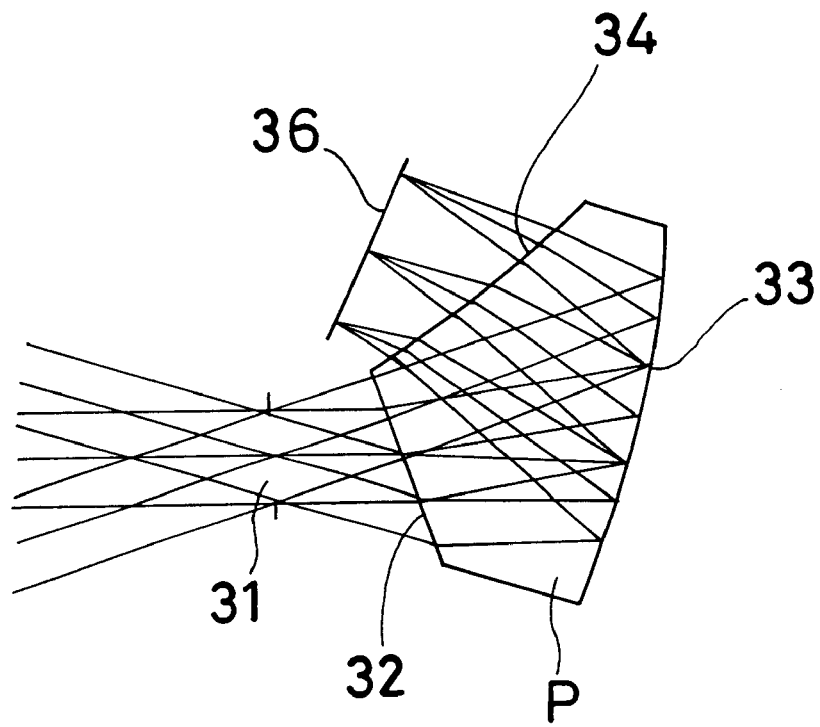
FIG. 31 is a diagram showing one example of decentered prisms applicable to the first prism in the image-forming optical system and viewing optical system according to the present invention.

In the case of FIG. 31, a prism P has a first surface 32, a second surface 33, and a third surface 34. Incident light passing through an entrance pupil 31 enters the prism P while being refracted through the first surface 32. The incident light is internally reflected by the second surface 33. The reflected light is refracted by the third surface 34 to form an image on an image plane 36.

Figure 32:
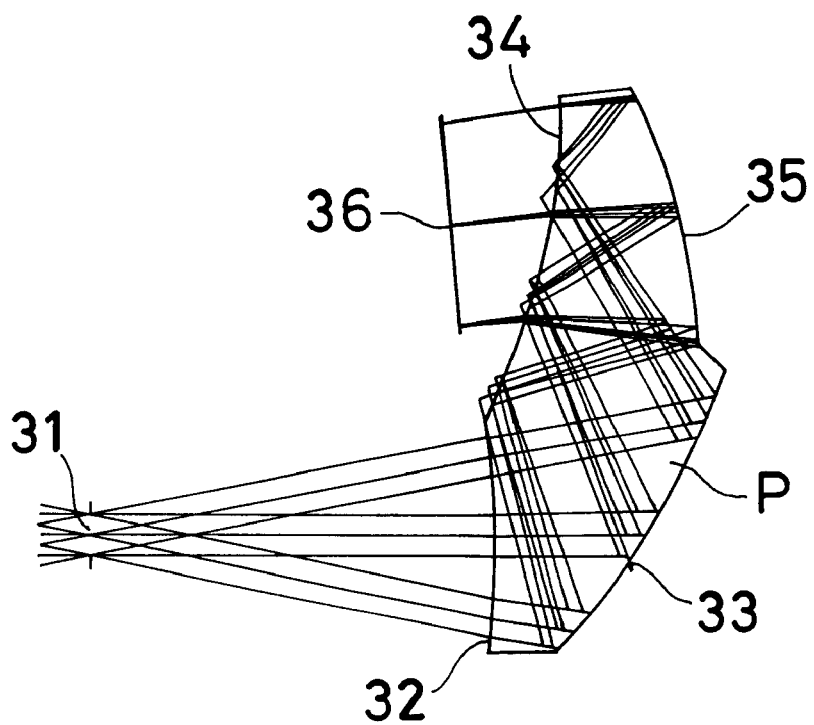
FIG. 32 is a diagram showing another example of decentered prisms applicable to the first prism in the image-forming optical system and viewing optical system according to the present invention.

In the case of FIG. 32, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and then totally reflected by the third surface 34. The reflected light is internally reflected by the fourth surface 35 and then refracted by the third surface 34 to form an image on an image plane 36.

Figure 33:
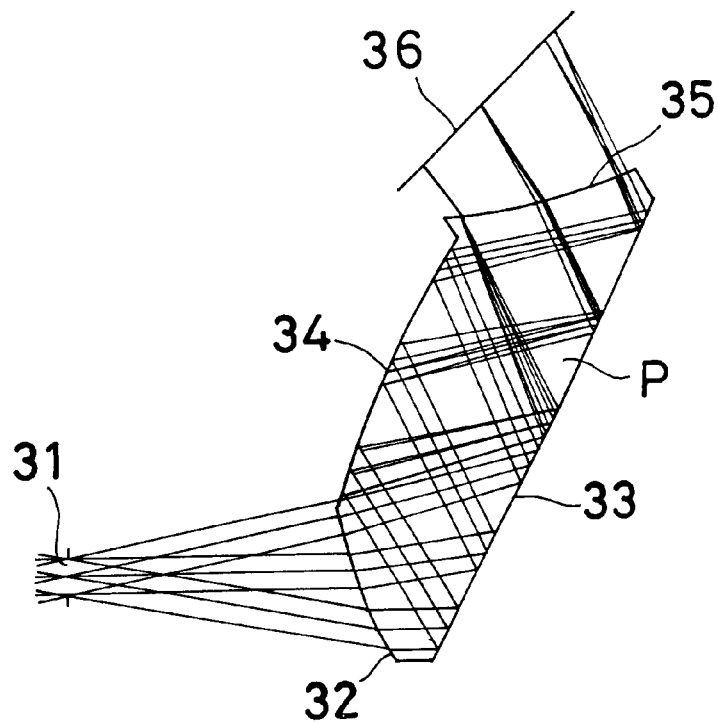
FIG. 33 is a diagram showing another example of decentered prisms applicable to the first prism in the image-forming optical system and viewing optical system according to the present invention.

In the case of FIG. 33, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then refracted by the fourth surface 35 to form an image on an image plane 36.

Figure 34:
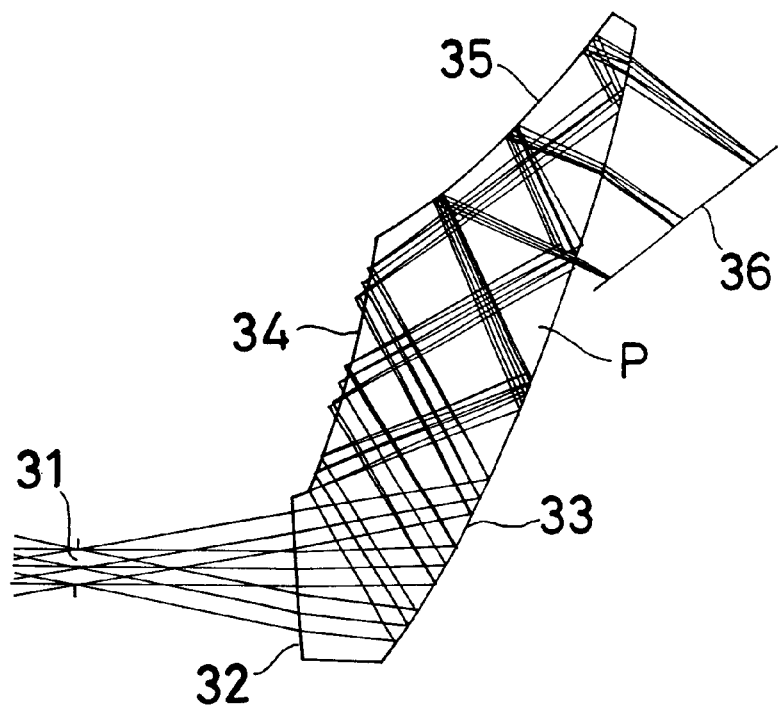
FIG. 34 is a diagram showing another example of decentered prisms applicable to the first prism in the image-forming optical system and viewing optical system according to the present invention.

In the case of FIG. 34, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then internally reflected by the fourth surface 35. The reflected light is then refracted by the second surface 33 to form an image on an image plane 36.

Figure 35:
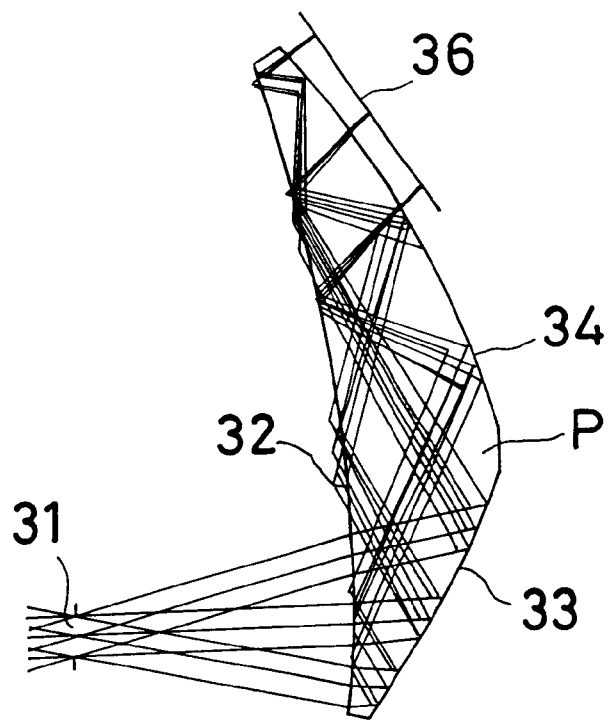
FIG. 35 is a diagram showing another example of decentered prisms applicable to the first prism in the image-forming optical system and viewing optical system according to the present invention.

In the case of FIG. 35, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. Then, the reflected light is refracted by the third surface 34 to form an image on an image plane 36.

Figure 36:
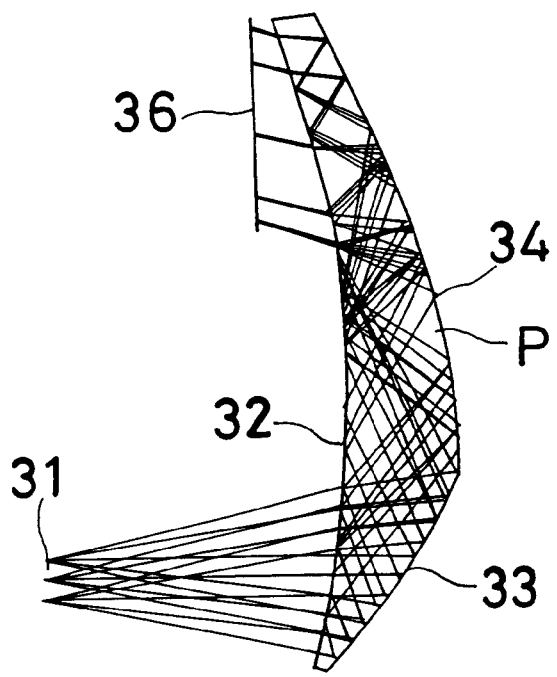
FIG. 36 is a diagram showing another example of decentered prisms applicable to the first prism in the image-forming optical system and viewing optical system according to the present invention.

In the case of FIG. 36, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. The reflected light is internally reflected by the third surface 34 and then refracted by the first surface 32 to form an image on an image plane 36.

Figure 37:
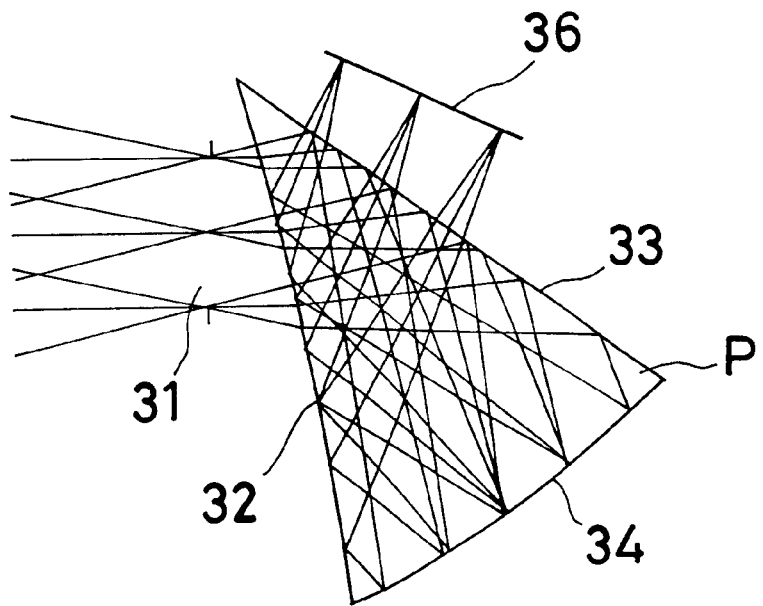
FIG. 37 is a diagram showing another example of decentered prisms applicable to the first prism in the image-forming optical system and viewing optical system according to the present invention.
Figure 38:
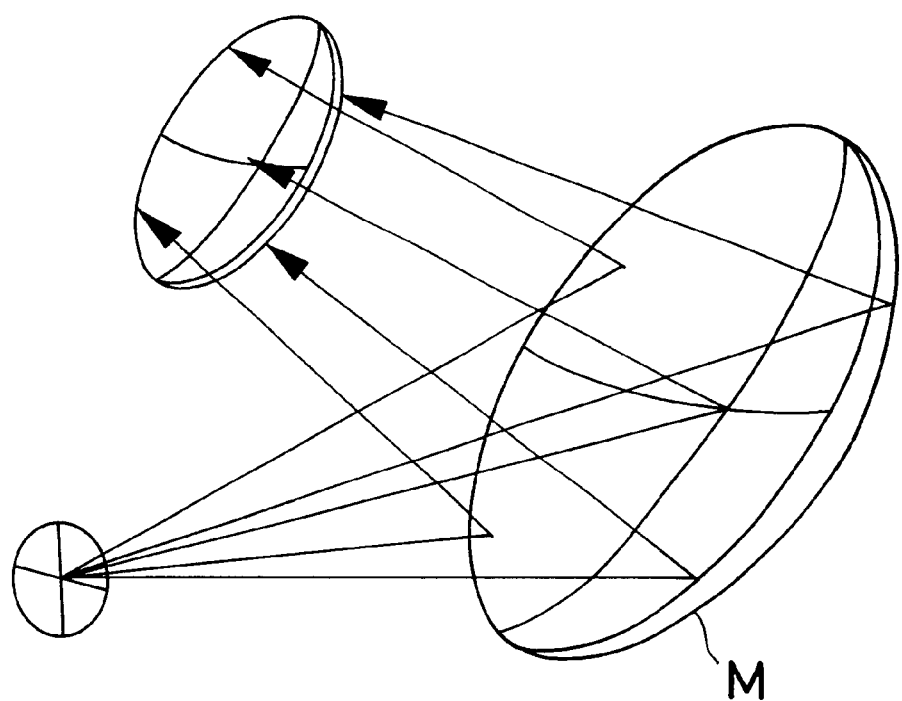
FIG. 38 is a conceptual view for describing curvature of field produced by a decentered reflecting surface.
Figure 39:
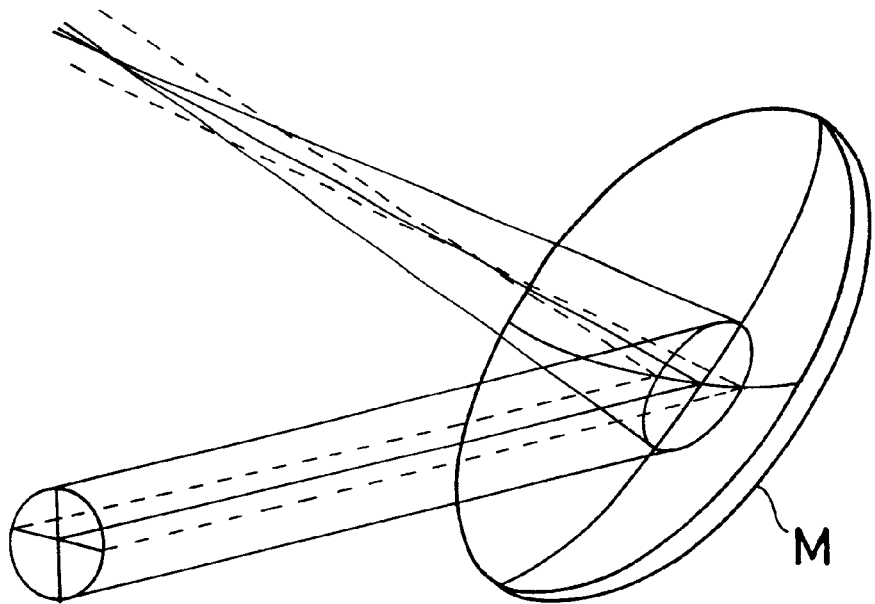
FIG. 39 is a conceptual view for describing astigmatism produced by a decentered reflecting surface.
Figure 40:
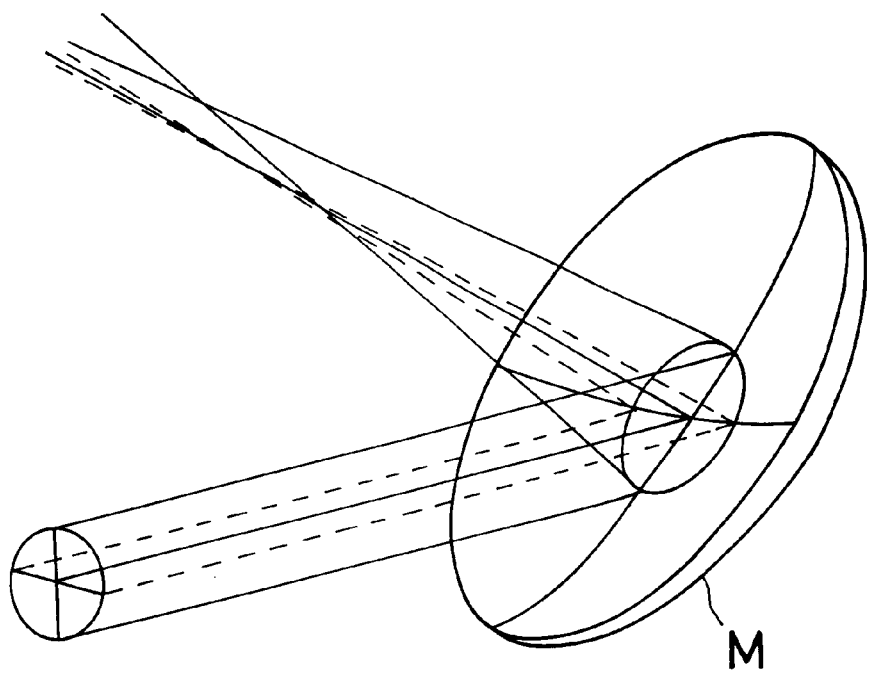
FIG. 40 is a conceptual view for describing coma produced by a decentered reflecting surface.

In the case of FIG. 37, a prism P has a first surface 32, a second surface 33, and a third surface 34. Incident light passing through an entrance pupil 31 enters the prism P while being refracted through the first surface 32. The incident light is internally reflected by the second surface 33 and further internally reflected by the third surface 34. The reflected light is totally reflected by the first surface 32. The reflected light is refracted by the second surface 33 to form an image on an image plane 36.

The above-described image-forming optical system and viewing optical system according to the present invention can be used in photographic apparatus in which an object image formed by the image-forming optical system is received with an image pickup device, such as a CCD or a silver halide film, to take a photograph of the object. The image-forming optical system and viewing optical system according to the present invention can also be used in observation apparatus in which an object image is viewed through an ocular lens. Specific examples of such apparatus are silver halide cameras, digital cameras, VTR cameras, microscopes, head-mounted image display apparatus, endoscopes, projectors, etc. Embodiments in which the present invention is applied to such apparatuses will be described below.

Figure 20:
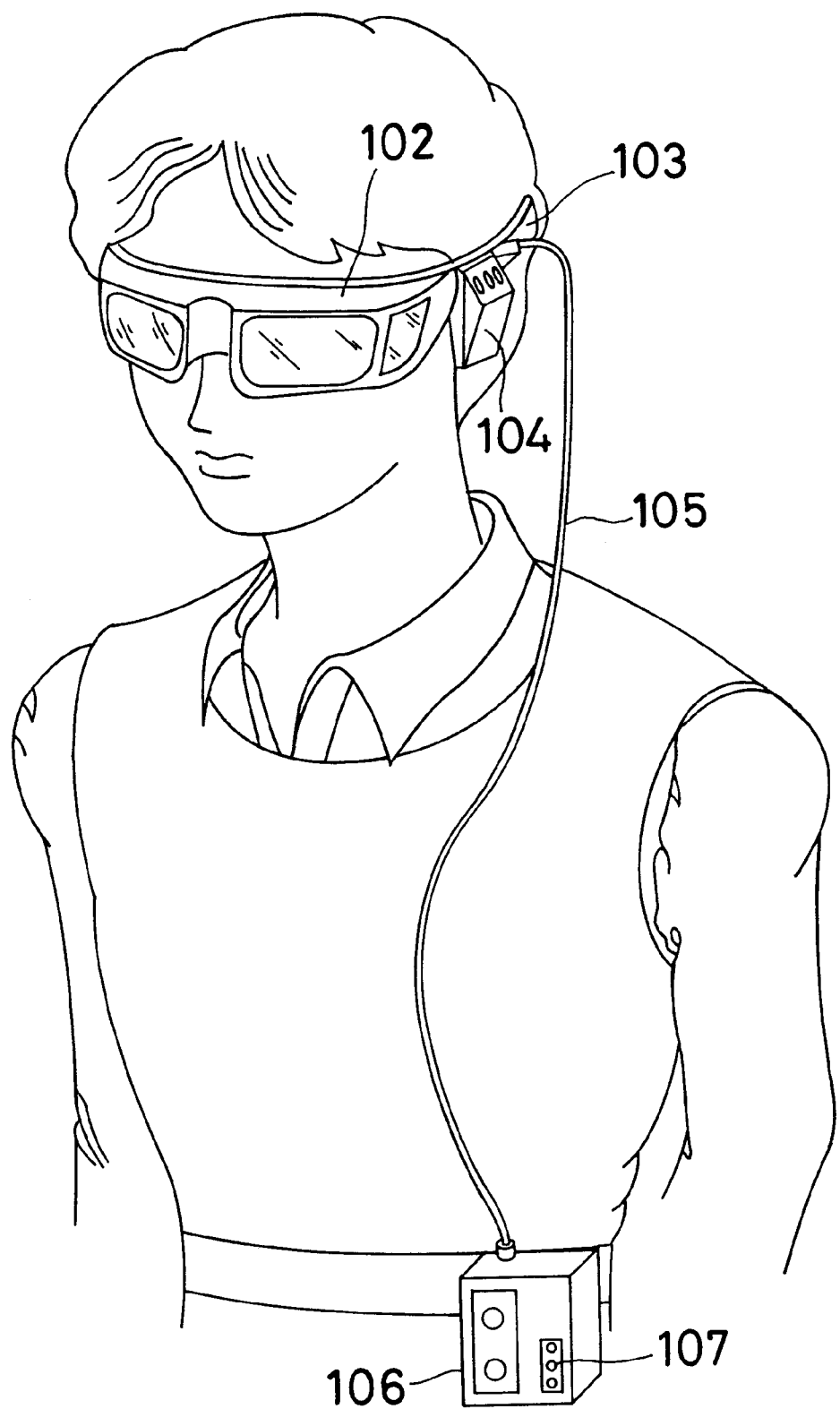
FIG. 20 is a diagram showing a head-mounted image display apparatus for both eyes using the viewing optical system according to the present invention in a state where it is fitted on an observer's head.
Figure 21:
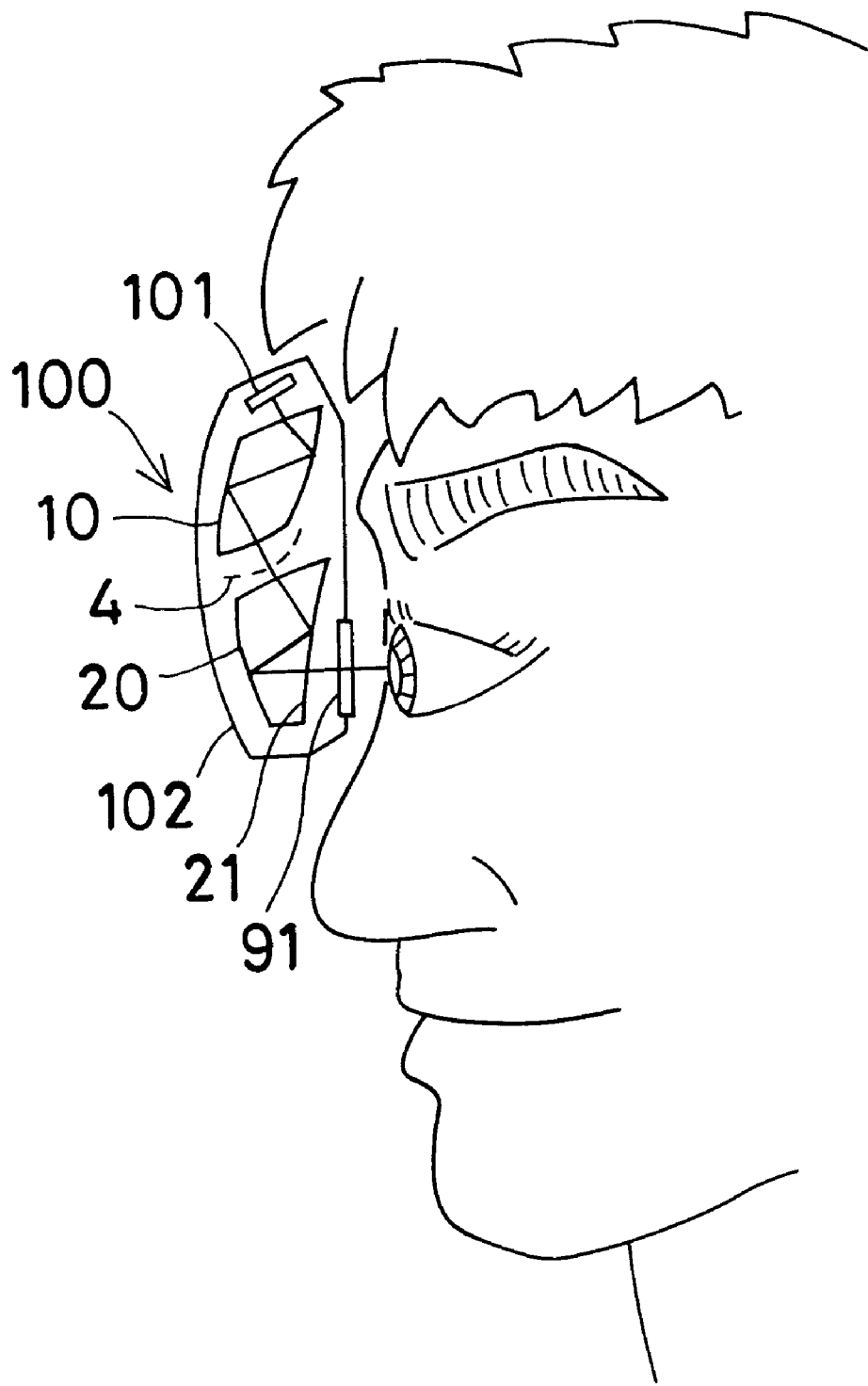
FIG. 21 is a sectional view of the head-mounted image display apparatus shown in FIG. 20.

As one example thereof, FIG. 20 shows a head-mounted image display apparatus arranged for two eyes in a state where the image display apparatus is fitted on an observer's head. FIG. 21 is a sectional view of the image display apparatus. As shown in FIG. 21, the viewing optical system according to the present invention is used as an ocular optical system 100 of the image display apparatus (in this case, an image-display device 101 is placed in an image plane 3 of a viewing optical system arranged as shown in Examples 13 to 18). A pair of combinations of an ocular optical system 100 and an image display device 101 are prepared for the left and right eyes and supported apart from each other by the interpupillary distance, i.e. the distance between the two eyes, thereby forming a stationary or portable image display apparatus 102, such as a head-mounted image display apparatus, which enables the observer to see with both eyes.

More specifically, the display apparatus body unit 102 is equipped with a pair of ocular optical systems 100 (left and right). The above-described viewing optical system is used as each ocular optical system 100. Image display devices 101, which are liquid-crystal display devices, are disposed in the respective image planes of the two ocular optical systems 100. As shown in FIG. 20, the display apparatus body unit 102 is provided with temporal frames 103 that are contiguous with the left and right ends thereof so that the display apparatus body unit 102 can be held in front of the observer's eyes. As shown in FIG. 21, to protect the first surface 21 (see FIGS. 1 to 18) of the second prism 20 in the ocular optical system 100 of each image display apparatus 102, a cover member 91 is placed between the exit pupil of the ocular optical system 100 and the first surface 21. As the cover member 91, any of a plane-parallel plate, a positive lens and a negative lens can be used.

Further, a speaker 104 is provided on each temporal frame 103 to enable the user to enjoy listening to stereophonic sound in addition to image observation. The display apparatus body unit 102 having the speakers 104 is connected with a replaying unit 106, e.g. a portable video cassette unit, through an image and sound transmitting cord 105. Therefore, the user can enjoy not only observing an image but also listening to sound with the replaying unit 106 retained on a desired position, e.g. a belt, as illustrated in FIG. 20. Reference numeral 107 in FIG. 20 denotes a switch and volume control part of the replaying unit 106. It should be noted that the display apparatus body unit 102 contains electronic parts such as image and sound processing circuits.

The cord 105 may have a jack and plug arrangement attached to the distal end thereof so that the cord 105 can be detachably connected to an existing video deck. The cord 105 may also be connected to a TV signal receiving tuner so as to enable the user to enjoy watching TV. Alternatively, the cord 105 may be connected to a computer to receive computer graphic images or message images or the like from the computer. To eliminate the bothersome cord, the image display apparatus may be arranged to receive external radio signals through an antenna connected thereto.

Figure 22:
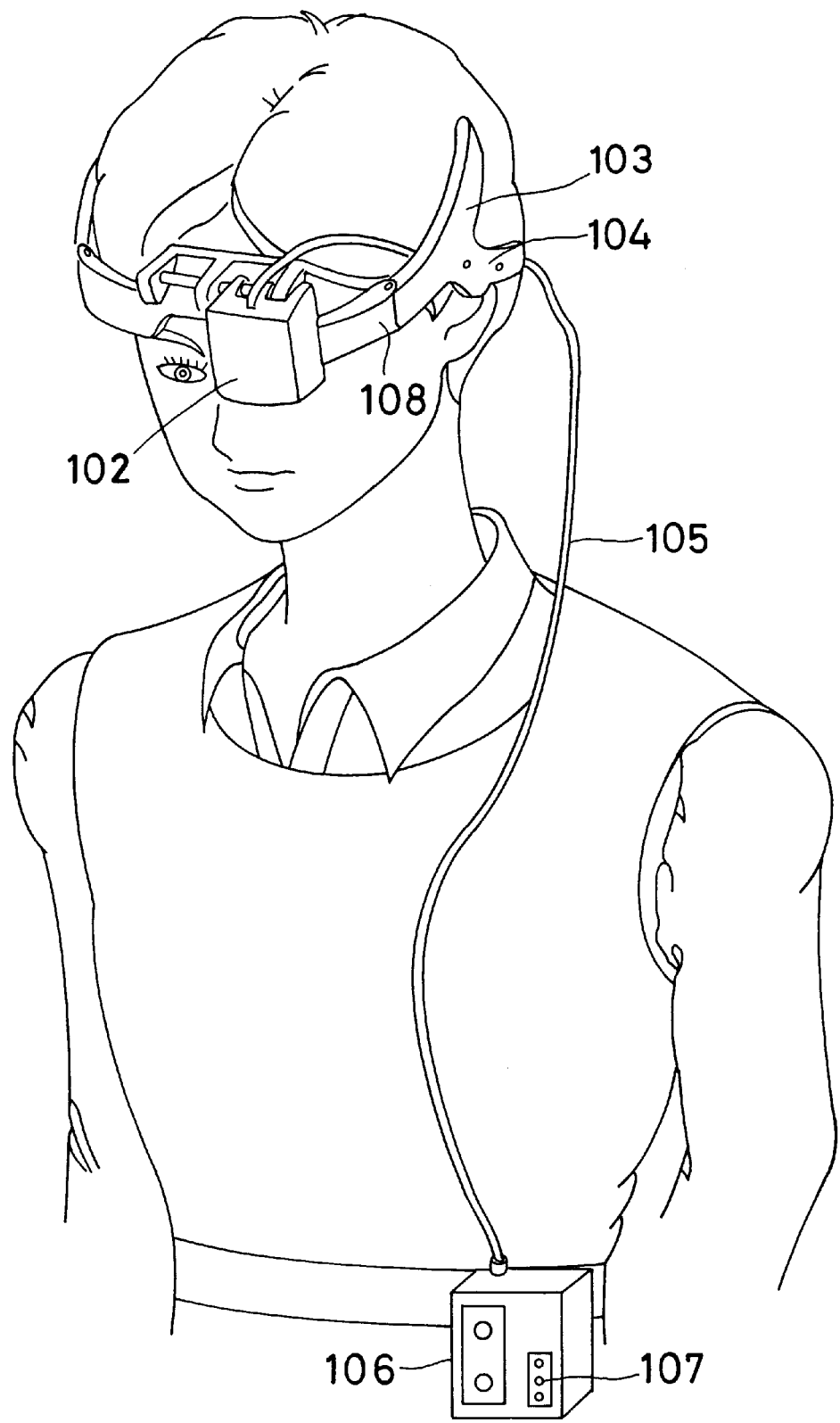
FIG. 22 is a diagram showing a head-mounted image display apparatus for a single eye using the viewing optical system according to the present invention in a state where it is fitted on an observer's head.

The viewing optical system according to the present invention may also be used in a head-mounted image display apparatus for a single eye by placing the ocular optical system in front of either of the left and right eyes. FIG. 22 shows the head-mounted image display apparatus for a single eye in a state where it is fitted on an observer's head (in this case, the apparatus is fitted for the left eye). In the illustrated arrangement, a display apparatus body unit 102 includes a single combination of an ocular optical system 100 and an image display device 101. The display apparatus body unit 102 is mounted on a front frame 108 so as to lie in front of the associated eye of the observer. As shown in FIG. 22, the front frame 108 is provided with temporal frames 103 that are contiguous with the left and right ends thereof so that the display apparatus body unit 102 can be held in front of one eye of the observer. The arrangement of the rest of the apparatus is the same as in the case of FIG. 20. Therefore, a description thereof is omitted.

Figure 23:
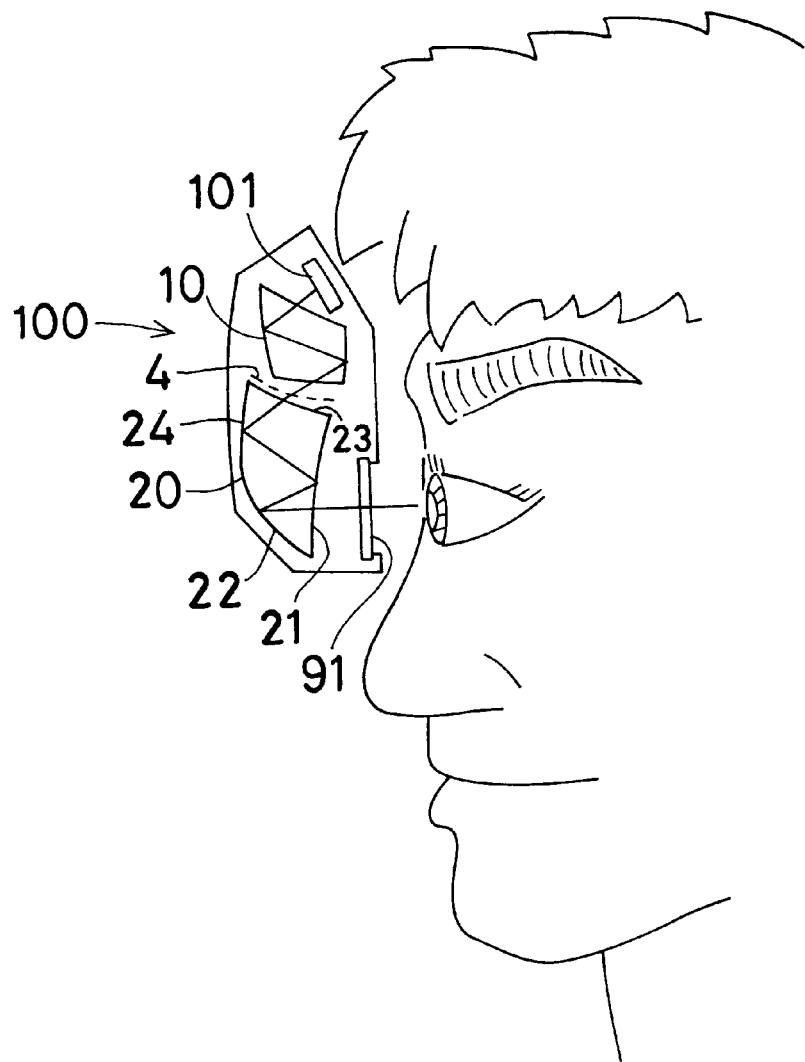
FIG. 23 is a sectional view for describing a modification of a second prism used in the image-forming optical system and viewing optical system according to the present invention.
Figure 23:
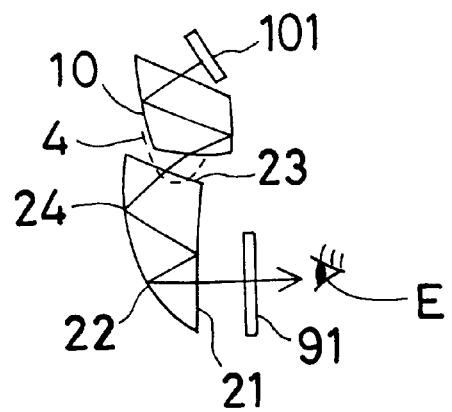

Regarding the second prism 20 in the viewing optical system and image-forming optical system according to the present invention, in the above-described Examples 1 to 18, the second prism 20 is formed from the first surface 21, the second surface 22 and the third surface 23. The third surface 23 allows a light beam exiting from the first prism 10 to enter the second prism 20. The first surface 21 reflects the light beam entering through the third surface 23 in the second prism 20. The second surface 22 reflects the light beam reflected from the first surface 21. The first surface 21 also allows the light beam reflected from the second surface 22 to exit from the second prism 20. However, a fourth surface 24 may be added between the third surface 23 and the second surface 22 of the second prism 20 as shown in part (a) of FIG. 23, which is a sectional view showing an arrangement in which the present invention is applied to an ocular optical system 100 of a head-mounted image display apparatus as in the case of FIG. 21. In the illustrated second prism 20, the light beam entering through the third surface 23 is reflected by the fourth surface 24 and then reflected by the first surface 21. The reflected light beam is further reflected by the second surface 22 and finally exits from the second prism 20 through the first surface 21. In this case, as shown in part (a) of FIG. 23, the fourth surface 24 and the second surface 22 may have different configurations. Alternatively, as shown in part (b) of FIG. 23, the fourth surface 24 and the second surface 22 may be the identical curved surface. That is, an area of the curved surface that is closer to the intermediate image 4 or the third surface 23 is used as the fourth surface 24, and an area of the curved surface that is remote from the third surface 23 is used as the second surface 22.

Figure 24:
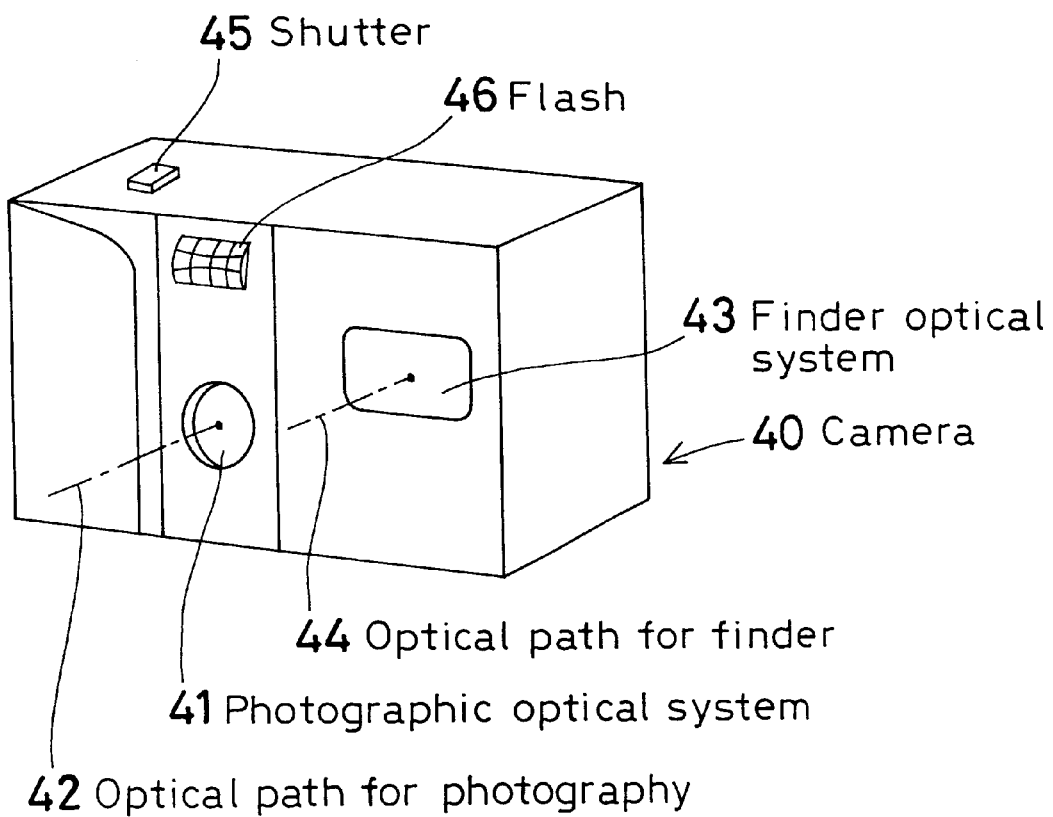
FIG. 24 is a perspective view showing the external appearance of an electronic camera to which the image-forming optical system and viewing optical system according to the present invention are applied, as viewed from the front side thereof.
Figure 25:
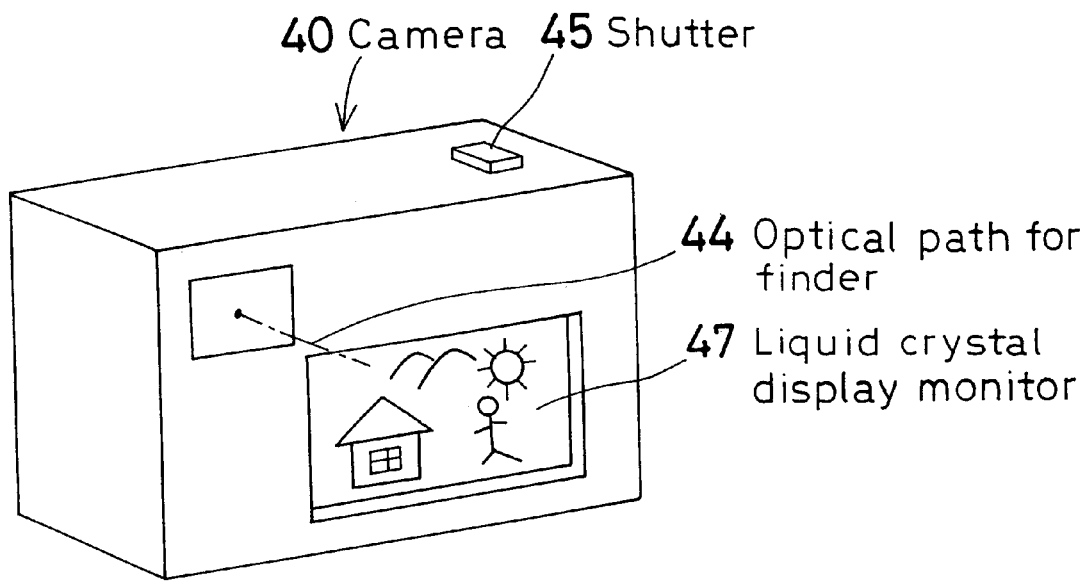
FIG. 25 is a perspective view of the electronic camera shown in FIG. 24, as viewed from the rear side thereof.
Figure 26:
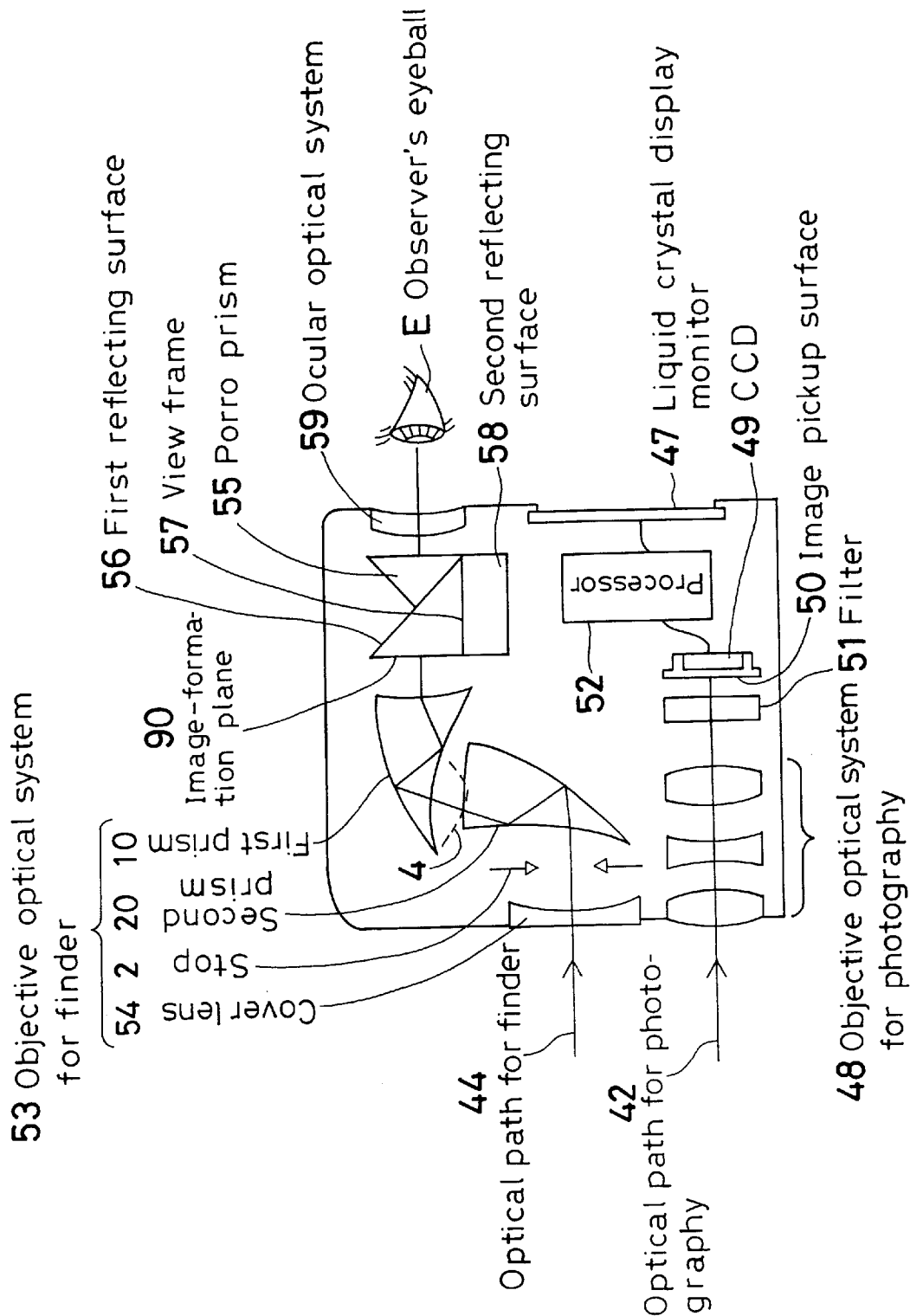
FIG. 26 is a sectional view showing one arrangement of the electronic camera in FIG. 24.

FIGS. 24 to 26 are conceptual views showing an arrangement in which the image-forming optical system according to the present invention is incorporated into an objective optical system of a finder unit of an electronic camera. FIG. 24 is a perspective view showing the external appearance of an electronic camera 40 as viewed from the front side thereof. FIG. 25 is a perspective view of the electronic camera 40 as viewed from the rear side thereof. FIG. 26 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an objective optical system 53 for the finder is placed in the optical path 44 for the finder. The objective optical system 53 includes a cover lens 54, a stop 2, a second prism 20, and a first prism 10. An optical system of the same type as Examples 1 to 6 is used as an image-forming optical system that includes the stop 2, the second prism 20, and the first prism 10. The cover lens 54, which is used as a cover member, is a lens having a negative power. The cover lens 54 enlarges the field angle. An object image produced by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 26, it should be noted that the objective optical system 48 for photography may be formed by using not only a refracting coaxial optical system but also any of the image-forming optical systems, which comprises two prisms 10 and 20, according to the present invention.

Figure 27:
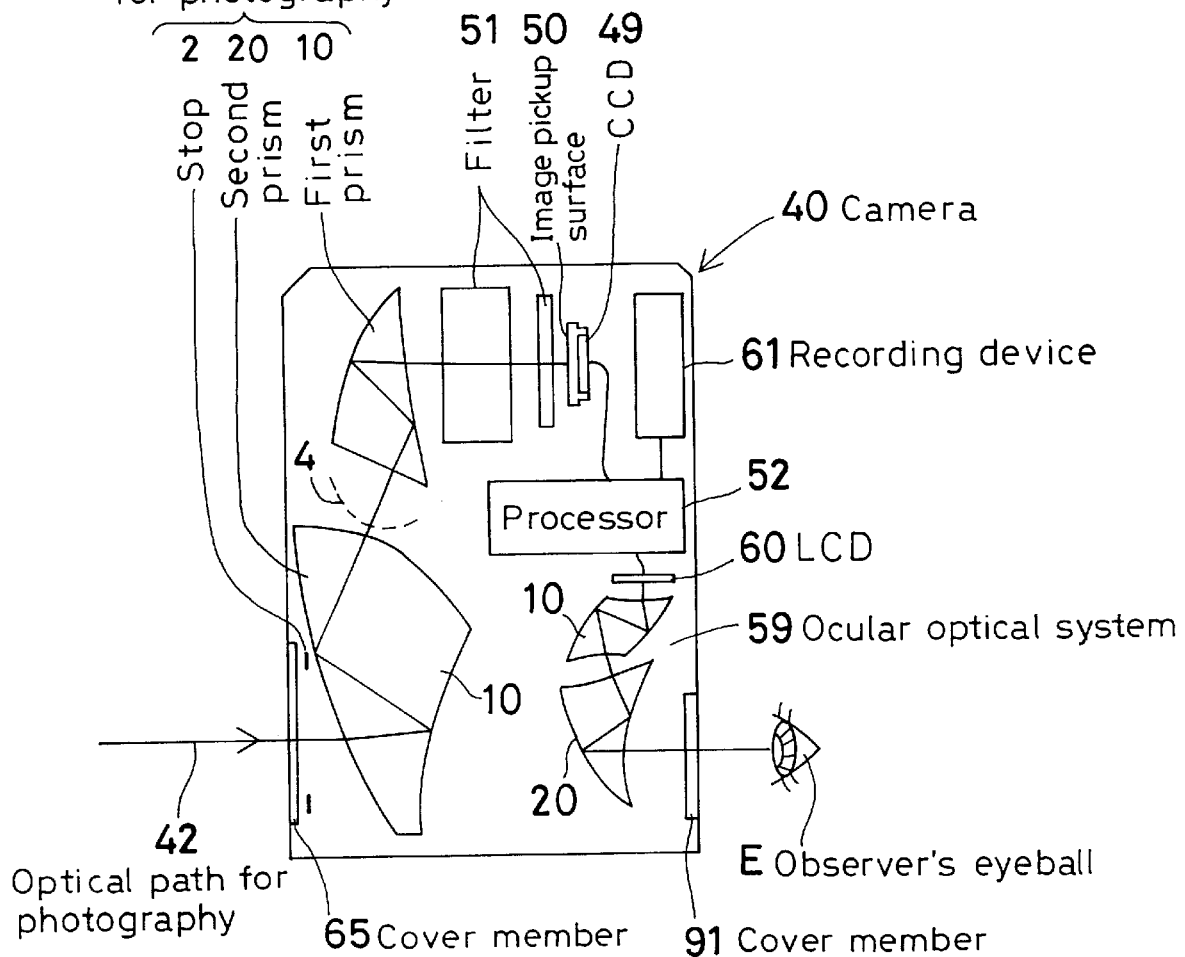
FIG. 27 is a conceptual view of another electronic camera to which the image-forming optical system and viewing optical system according to the present invention are applied.

FIG. 27 is a conceptual view showing an arrangement in which the image-forming optical system according to the present invention is incorporated into an objective optical system 48 in a photography part of an electronic camera 40. In this example, an image-forming optical system similar to Examples 7 to 12 is used in the objective optical system 48 for photography, which is placed in an optical path 42 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism optical system having a configuration similar to that of the viewing optical systems according to Examples 13 to 18 of the present invention. The objective optical system 48 for photography may include another lens (positive or negative lens) as a constituent element at a position on the object side of the two prisms 10 and 20, a position therebetween, or a position on the image side of the two prisms 10 and 20.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

The surface closest to the object side in the image-forming optical system according to the present invention may be used as a cover member instead of providing a cover member separately. In this example, the entrance surface of the prism 20 is the closest to the object side in the image-forming optical system. In such a case, however, because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 28:
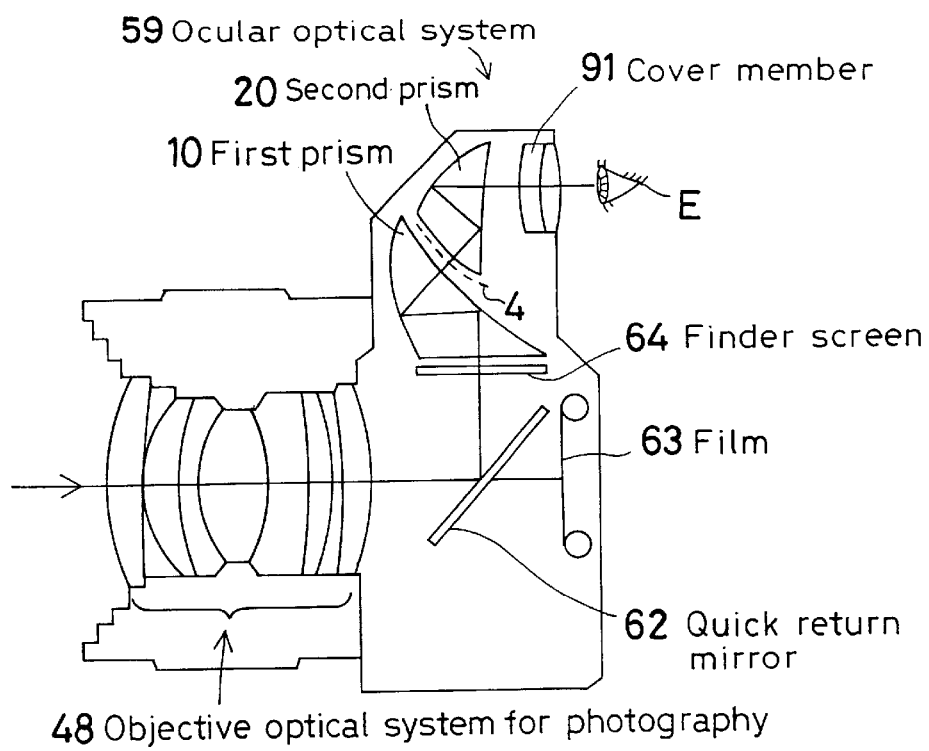
FIG. 28 is a conceptual view of a single-lens reflex camera to which the viewing optical system according to the present invention is applied.

In addition, the viewing optical system according to the present invention can be used as an ocular optical system in the finder unit of a single-lens reflex camera. FIG. 28 is a conceptual view of an arrangement in which the viewing optical system according to the present invention is incorporated into an ocular optical system 59 in the finder of a single-lens reflex camera. In the single-lens reflex camera, light from a subject is passed through an objective optical system 48 for photography to form an image on a film 63, thereby taking a photograph of the subject. A quick return mirror 62 is provided between the objective optical system 48 and the film 63. The quick return mirror 62 is capable of withdrawing from the optical path between the objective optical system 48 and the film 63. To allow the user to focus the camera on a subject or to compose a picture before taking a photograph, a subject image produced by the objective optical system 48 is formed on a finder screen 64 via the quick return mirror 62 inserted into the optical path. The subject image formed on the finder screen 64 is enlarged and projected into an observer's eyeball E by an ocular optical system 59 comprising the viewing optical system according to the present invention and a cover member 91. In this example, a viewing optical system similar to Examples 1 to 6 is used as the ocular optical system 59. As the cover member 91, a positive lens is used. The positive lens is a cemented lens consisting of two lens elements.

Although no mention is made of the arrangement of the objective optical system 48 for photography in this example, it should be noted that the objective optical system 48 for photography may be formed by using not only a refracting coaxial optical system but also any of the image-forming optical systems, which comprises two prisms 10 and 20, according to the present invention.

Figure 29:
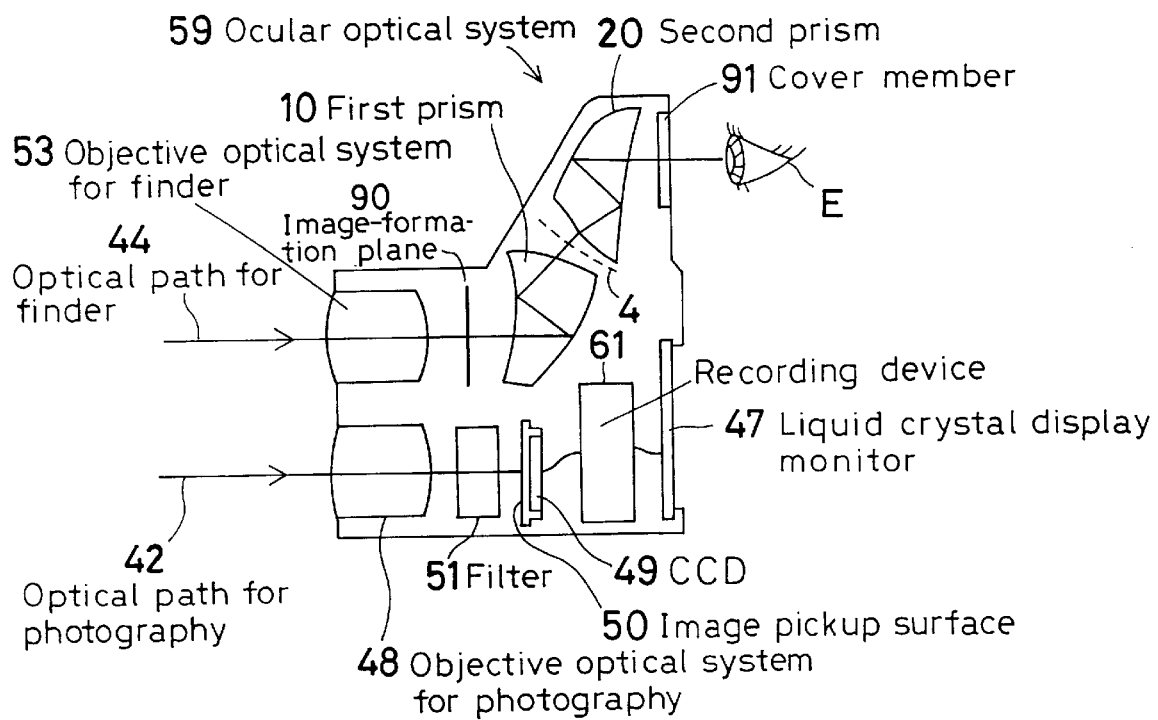
FIG. 29 is a conceptual view of another electronic camera to which the viewing optical system according to the present invention is applied.

In addition, the viewing optical system according to the present invention can be used as an ocular optical system in the finder unit of an electronic camera in which an optical path 42 for photography and an optical path 44 for the finder are provided in parallel. An example of this is shown in FIG. 29, which is a conceptual view of the example. The details of the arrangement will be clear from the foregoing description. Therefore, a description of the whole arrangement is omitted. In this example, an object image formed on an image-formation plane 90 of an objective optical system 53 for the finder is enlarged and projected into an observer's eyeball E by an ocular optical system 59 comprising the viewing optical system according to the present invention and a cover member 91. A viewing optical system similar to Examples 7 to 12 is used as the ocular optical system 59. As the cover member 91, a plane-parallel plate is used.

FIG. 30 is a conceptual view showing an arrangement in which the image-forming optical system according to the present invention is incorporated into an objective optical system 82 in an observation system of a video endoscope system, and the viewing optical system according to the present invention is incorporated into an ocular optical system 87 in the observation system of the video endoscope system. In this example, the objective optical system 82 in the observation system uses an optical system approximately similar to Examples 13 to 18, and the ocular optical system 87 uses an optical system approximately similar to Examples 1 to 12. As shown in part (a) of FIG. 30, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope system further includes a head-mounted image display apparatus (HMD) 78 such as that shown in FIG. 20, by way of example. The video endoscope 71 has an insert part 79 with a distal end portion 80 and an eyepiece part 81. The distal end portion 80 and the eyepiece part 81 are arranged as shown in part (b) of FIG. 30. A light beam from the light source unit 72 passes through a light guide fiber bundle 88 and illuminates a part to be observed through an objective optical system 89 for illumination. Light from the part to be observed enters an objective optical system 82 for observation through a cover member 85. Thus, an object image is formed by the objective optical system 82. The object image is formed on the image pickup surface of a CCD 84 through a filter 83, e.g. a low-pass filter or an infrared cutoff filter. Furthermore, the object image is converted into a video signal by the CCD 84. The video signal is displayed directly on the monitor 74 by the video processor 73, which is shown in part (a) of FIG. 30. In addition, the video signal is recorded in the VTR deck 75 and on the video disk 76 and also printed out in the form of an image from the video printer 77. In addition, the object image is displayed on the image display device 101 (see FIG. 21) of the HMD 78, thereby allowing a person wearing the HMD 78 to observe the displayed image. At the same time, the video signal converted by the CCD 84 is displayed in the form of an electronic image on a liquid crystal display device (LCD) 86 in the eyepiece part 81. The displayed image is led to an observer's eyeball E through the ocular optical system 87, which is formed from the viewing optical system according to the present invention.

The endoscope arranged as stated above can be constructed with a minimal number of optical members. Accordingly, a high-performance and low-cost endoscope can be realized. Moreover, because the constituent elements of the objective optical system 82 are arranged in series in the direction of the longitudinal axis of the endoscope, the above-described advantageous effects can be obtained without hindering the achievement of a reduction in the diameter of the endoscope.

Figure 41:
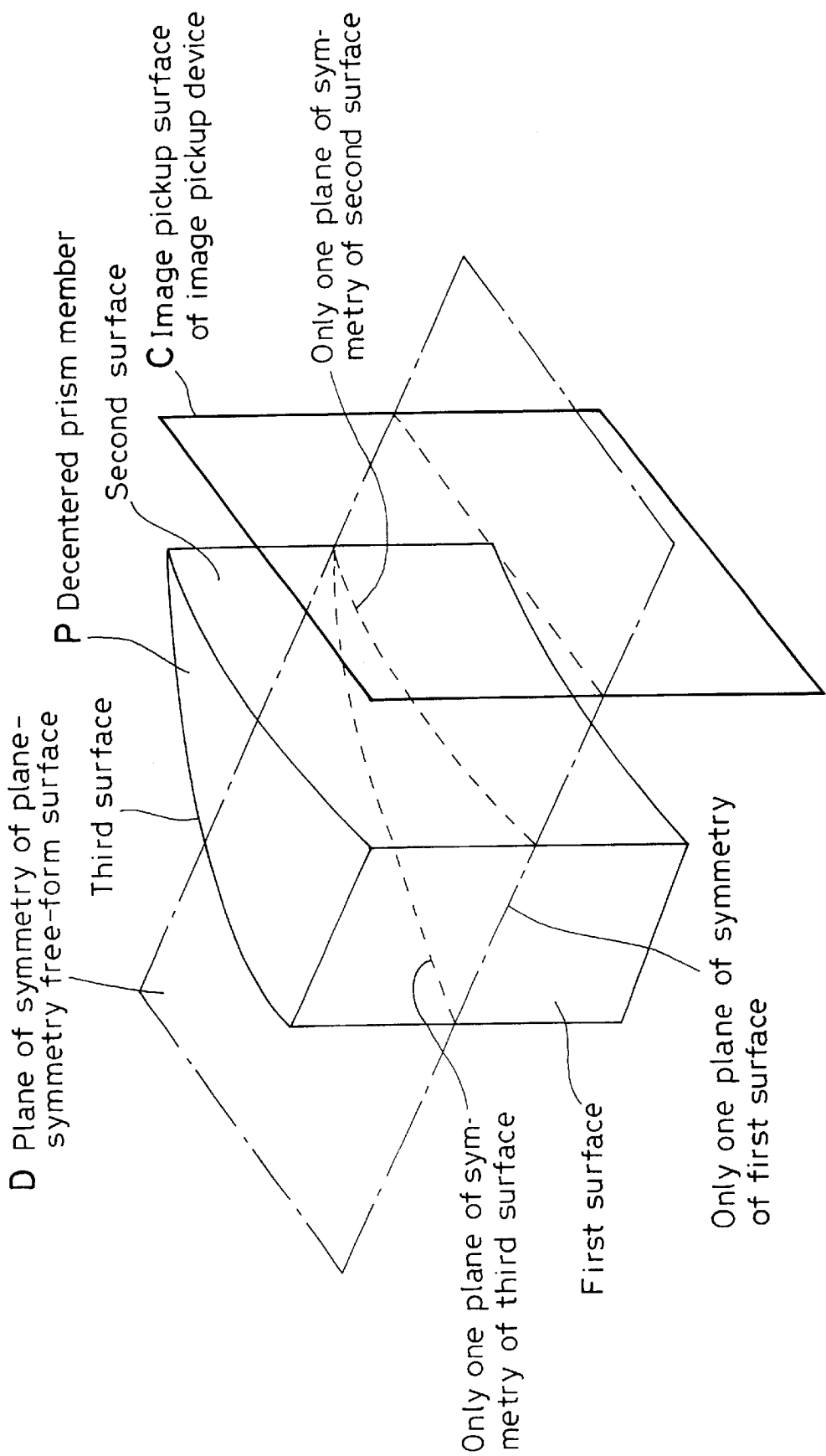
FIG. 41 is a diagram showing a desirable arrangement for the image-forming optical system according to the present invention when it is placed in front of an image pickup device.
Figure 42:
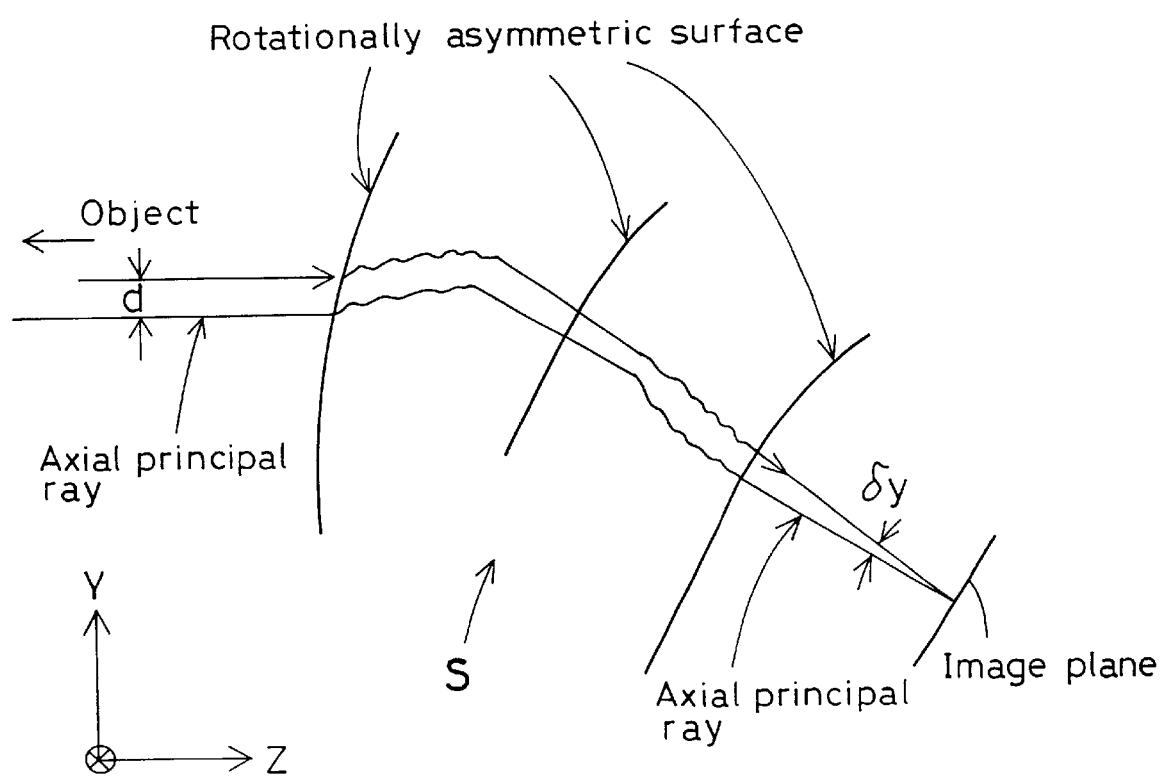
FIG. 42 is a diagram for describing the definition of the power of a decentered optical system and the power of an optical surface.

FIG. 41 is a diagram showing a desirable arrangement for the image-forming optical system according to the present invention when the image-forming optical system is placed in front of an image pickup device, e.g. a CCD, or a filter. In the figure, a decentered prism P is a first prism included in the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus. This is useful for mass-production.

When a plurality or all of the optical surfaces constituting the decentered prism P, i.e. the first surface, the second surface, the third surface, and so forth, are plane-symmetry free-form surfaces, it is desirable from the viewpoint of design and aberration correcting performance to arrange the decentered prism P so that the planes of symmetry of the plurality or all of the optical surfaces are in the same plane D. In addition, it is desirable that the plane D of symmetry and the image pickup surface C should be in the above-described relationship.

As will be clear from the foregoing description, the present invention provides a viewing optical system and image-forming optical system in which an intermediate image is formed once and two decentered prisms are arranged to correct each other's decentration aberrations, thereby attaining a wide viewing field angle and a short focal length.

What is claimed is:

1. An image-forming optical system for forming an image of an object, said image-forming optical system comprising:
   a first prism and a second prism, each of said first prism and second prism being formed from a medium having a refractive index (n) larger than 1 (n>1), said second prism being placed closer to the object than said first prism;
   said second prism having three optical surfaces that transmit or reflect a light beam, said three optical surfaces including:
   a first surface through which a light beam from an object side of said second prism enters said second prism;
   a second surface that reflects the light beam entering through said first surface in said second prism;

said first surface also reflecting the light beam reflected from said second surface in said second prism; and a third surface through which the light beam reflected from said first surface exits from said second prism;

wherein at least one of said first surface and second surface has a curved surface configuration that gives a power to a light beam, said curved surface configuration having a rotationally asymmetric surface configuration that corrects aberrations due to decentration;

said first prism having at least:

a decentered reflecting surface having a curved surface configuration and internally reflecting a light beam in said medium, said reflecting surface having a rotationally asymmetric surface configuration that gives a power to a light beam and corrects aberrations due to decentration;

an entrance surface through which a light beam enters said first prism; and an exit surface through which the light beam exits from said first prism;

wherein an intermediate image surface is formed between the first surface of said second prism and the exit surface of said first prism.

2. An image-forming optical system according to claim 1, wherein both the first surface and second surface of said second prism have rotationally asymmetric surface configurations, respectively, which give a power to a light beam and correct aberrations due to decentration.

3. An image-forming optical system according to claim 1, wherein the rotationally asymmetric surface configuration of at least one of the first surface and second surface of said second prism is a plane-symmetry free-form surface having only one plane of symmetry.

4. An image-forming optical system according to claim 2, wherein the rotationally asymmetric surface configurations of both the first surface and second surface of said second prism are plane-symmetry free-form surfaces each having only one plane of symmetry.

5. An image-forming optical system according to claim 4, wherein the only one plane of symmetry of the plane-symmetry free-form surface that forms the first surface of said second prism and the only one plane of symmetry of the plane-symmetry free-form surface that forms the second surface of said second prism are formed in a same plane.

6. An image-forming optical system according to any one of claims 1 to 5, wherein the third surface of said second prism has a rotationally asymmetric surface configuration that gives a power to a light beam and corrects aberrations due to decentration.

7. An image-forming optical system according to claim 6, wherein the rotationally asymmetric surface configuration of the third surface of said second prism is a plane-symmetry free-form surface having only one plane of symmetry.

8. An image-forming optical system according to claim 7, wherein the only one plane of symmetry of the plane-symmetry free-form surface that forms the third surface of said second prism is coincident with a plane that connects segments of a folded optical path of an axial principal ray that is formed by reflections in said second prism.

9. An image-forming optical system according to any one of claims 1 to 5, wherein the rotationally asymmetric surface configuration of the reflecting surface in said first prism is a plane-symmetry free-form surface having only one plane of symmetry.

10. An image-forming optical system according to claim 9, wherein said first prism and said second prism each have at least one plane-symmetry free-form surface having only one plane of symmetry, and the only one plane of symmetry of the at least one plane-symmetry free-form surface in said first prism and that of the at least one plane-symmetry free-form surface in said second prism are placed in a same plane.

11. An image-forming optical system according to any one of claims 1 to 5, wherein said first prism has at least two reflecting surfaces each having a curved surface configuration that gives a power to a light beam.

12. An image-forming optical system according to claim 11, wherein said first prism is formed from three optical surfaces, which are an entrance surface serving as both a reflecting surface and a transmitting surface, a reflecting surface, and an exit surface.

13. An image-forming optical system according to claim 11, wherein said first prism is formed from three optical surfaces, which are an entrance surface, a reflecting surface, and an exit surface serving as both a reflecting surface and a transmitting surface.

14. An image-forming optical system according to claim 11, wherein said first prism is formed from four optical surfaces, which are two reflecting surfaces that give a power to a light beam, an entrance surface, and an exit surface.

15. An image-forming optical system according to claim 11, wherein the first surface and second surface of said second prism and the two surfaces having a reflecting action in said first prism are rotationally asymmetric surfaces that correct decentration aberrations and each have only one plane of symmetry.

16. An image-forming optical system according to claim 15, wherein the first surface and second surface of said second prism and the two surfaces having a reflecting action in said first prism are rotationally asymmetric surfaces that correct decentration aberrations and each have only one plane of symmetry, and the only one plane of symmetry of each of said rotationally asymmetric surfaces is coincident with each other in approximately a same plane.

17. An image-forming optical system according to claim 16, wherein all the optical surfaces constituting said first prism and second prism are rotationally asymmetric surfaces that correct decentration aberrations and each have only one plane of symmetry, and the only one plane of symmetry of each of said rotationally asymmetric surfaces is coincident with each other in approximately a same plane.

18. An image-forming optical system according to any one of claims 1 to 5, wherein said first prism and said second prism are arranged so that said intermediate image surface is formed between the second surface of said second prism and the entrance surface of said first prism.

19. An image-forming optical system according to any one of claims 1 to 5, wherein surface configurations of decentration aberration-correcting optical surfaces in said first prism and second prism are arranged so that an entrance pupil surface and image-formation surface of said image-forming optical system are approximately flat surfaces, and so that the intermediate image surface formed between said entrance pupil surface and said image-formation surface has a non-planar, curved configuration.

20. An image-forming optical system according to any one of claims 1 to 5, wherein said first prism and said second prism are arranged so that an entrance pupil of said image-forming optical system is formed on an object side of said second prism.

21. An image-forming optical system according to claim 20, wherein a stop is placed on said entrance pupil.

22. An image-forming optical system according to any one of claims 1 to 5, wherein said second prism has a fourth surface placed in an optical path between said first surface and said third surface where the light beam reflected from said first surface travels in said second prism until it exits from said third surface, wherein said first surface allows the light beam from the object side to enter said second prism; said second surface reflects the light beam entering through said first surface in said second prism; said first surface also reflects the light beam reflected from said second surface in said second prism; said fourth surface reflects the light beam reflected from said first surface in said second prism; and said third surface allows the light beam reflected from said fourth surface to exit from said second prism.

23. An image-forming optical system according to claim 22, wherein said fourth surface and second surface of said second prism are formed in a same surface, wherein a reflecting area of said same surface that forms said fourth surface is closer to said intermediate image surface than a reflecting area of said same surface that forms said second surface.

24. An image-forming optical system according to claim 22, wherein said fourth surface and said second surface have different curved surface configurations.

25. An image-forming optical system according to any one of claims 1 to 5, wherein said intermediate image surface is placed on the third surface of said second prism.

26. An image-forming optical system according to claim 25, wherein said intermediate image surface is placed on the third surface of said second prism, some area of said intermediate image surface lying inside said second prism, a remaining area of said intermediate image surface projecting outside said second prism.

27. An image-forming optical system according to any one of claims 1 to 5, wherein when a decentration direction of said image-forming optical system is a Y-axis direction, and a plane parallel to an axial principal ray is a YZ-plane, and further a direction perpendicularly intersecting the YZ-plane is an X-axis direction, the following condition is satisfied:

$$100 < EP/Px < 1000 \quad (1)$$

where EP is a distance from an entrance pupil to an entrance surface of said second prism, and Px is a power in the X-axis direction of said image-forming optical system.

28. An image-forming optical system according to any one of claims 1 to 5, wherein when a decentration direction of said image-forming optical system is a Y-axis direction, and a plane parallel to an axial principal ray is a YZ-plane, and further a direction perpendicularly intersecting the YZ-plane is an X-axis direction, at least one of the following conditions is satisfied:

$$0.8 < \beta x < 5,$$
$$0.8 < \beta y < 5 \quad (2)$$

where $\beta x$ and $\beta y$ are magnifications in the X- and Y-axis directions, respectively, of an intermediate image formed by the first prism in backward ray tracing with respect to an image on an image-formation plane.

29. An image-forming optical system according to any one of claims 1 to 5, wherein when a decentration direction of said image-forming optical system is a Y-axis direction, and a plane parallel to an axial principal ray is a YZ-plane, and further a direction perpendicularly intersecting the YZ-plane is an x-axis direction, at least one of the following conditions is satisfied:

$$0.2 < Px2/Px < 3,$$
$$0.2 < Py2/Py < 3 \quad (3)$$

where Px2 is a power in the X-axis direction of said second prism; Py2 is a power in the Y-axis direction of said second prism; Px is a power in the X-axis direction of said image-forming optical system; and Py is a power in the Y-axis direction of said image-forming optical system.

30. An image-forming optical system according to any one of claims 1 to 5, wherein when a decentration direction of said image-forming optical system is a Y-axis direction, and a plane parallel to an axial principal ray is a YZ-plane, and further a direction perpendicularly intersecting the YZ-plane is an X-axis direction, at least one of the following conditions is satisfied:

$$0.2 < Pxs3/Px < 3,$$
$$0.2 < Pys3/Py < 3 \quad (4)$$

where Pxs3 is a power in the X-axis direction of the second surface of said second prism at a position where the axial principal ray impinges on said second surface; Pys3 is a power in the Y-axis direction of said second surface at said position; Px is a power in the X-axis direction of said image-forming optical system; and Py is a power in the Y-axis direction of said image-forming optical system.

31. An image-forming optical system according to claim 12, wherein when a decentration direction of said image-forming optical system is a Y-axis direction, and a plane parallel to an axial principal ray is a YZ-plane, and further a direction perpendicularly intersecting the YZ-plane is an X-axis direction, at least one of the following conditions is satisfied:

$$0 < Pxs9/Px < 5,$$
$$0 < Pys9/Py < 5 \quad (5)$$

where Pxs9 is a power in the X-axis direction of the surface having only a reflecting action in said first prism; Pys9 is a power in the Y-axis direction of the surface having only a reflecting action in said first prism; Px is a power in the X-axis direction of said image-forming optical system; and Py is a power in the Y-axis direction of said image-forming optical system.

32. An image-forming optical system according to claim 13, wherein when a decentration direction of said image-forming optical system is a Y-axis direction, and a plane parallel to an axial principal ray is a YZ-plane, and further a direction perpendicularly intersecting the YZ-plane is an X-axis direction, at least one of the following conditions is satisfied:

$$0 < Pxs10/Px < 5,$$
$$0 < Pys10/Py < 5 \quad (6)$$

where Pxs10 is a power in the X-axis direction of the surface having only a reflecting action in said first prism; Pys10 is a power in the Y-axis direction of the surface having only a reflecting action in said first prism; Px is a power in the X-axis direction of said image-forming optical system; and Py is a power in the Y-axis direction of said image-forming optical system.

33. An image-forming optical system according to claim 14, wherein when a decentration direction of said image-forming optical system is a Y-axis direction, and a plane parallel to an axial principal ray is a YZ-plane, and further a direction perpendicularly intersecting the YZ-plane is an X-axis direction, at least one of the following conditions is satisfied:

$$-1 < Pxs9/Pxs10 < 2,$$

$$-1 < Pys9/Pys10 < 2 \quad (7)$$

where Pxs9 is a power in the X-axis direction of the reflecting surface of said first prism that is closer to the entrance surface; Pys9 is a power in the Y-axis direction of the reflecting surface of said first prism that is closer to the entrance surface; Pxs10 is a power in the X-axis direction of the reflecting surface of said first prism that is closer to the exit surface; and Pys10 is a power in the Y-axis direction of the reflecting surface of said first prism that is closer to the exit surface.

34. An image-forming optical system according to any one of claims 1 to 5, which has a focal length shorter than 12 millimeters.

35. A finder optical system comprising:
the image-forming optical system of any one of claims 1 to 5, said image-forming optical system being provided as a finder objective optical system;
an image-inverting optical system for erecting an object image formed by said finder objective optical system; and
an ocular optical system.

36. A camera apparatus comprising:
the finder optical system of claim 35; and
an objective optical system for photography provided in parallel to said finder optical system.

37. An image pickup optical system comprising:
the image-forming optical system of any one of claims 1 to 5; and
an image pickup device placed in an image plane formed by said image-forming optical system.

38. A camera apparatus comprising:
the image-forming optical system of any one of claims 1 to 5, said image-forming optical system being provided as an objective optical system for photography; and
a finder optical system placed in one of an optical path separate from an optical path of said objective optical system for photography and an optical path branched from the optical path of said objective optical system for photography.

39. An electronic camera apparatus comprising:
the image-forming optical system of any one of claims 1 to 5;
an image pickup device placed in an image plane formed by said image-forming optical system;
a recording medium for recording image information received by said image pickup device; and
an image display device that receives image information from one of said recording medium and said image pickup device to form an image for observation.

40. An endoscope system comprising:
an observation system having the image-forming optical system of any one of claims 1 to 5 and an image transmitting member for transmitting an image formed by said image-forming optical system along a longitudinal axis; and
an illumination system having an illuminating light source and an illuminating light transmitting member for transmitting illuminating light from said illuminating light source along the longitudinal axis.

41. A viewing optical system that forms an exit pupil for viewing an observation image, said viewing optical system comprising:
a first prism and a second prism, each of said first prism and second prism being formed from a medium having a refractive index (n) larger than 1 (n>1);
said second prism being placed closer to said exit pupil than said first prism;
said first prism having at least:
a decentered reflecting surface having a curved surface configuration and internally reflecting a light beam in said medium, said reflecting surface having a rotationally asymmetric surface configuration that gives a power to a light beam and corrects aberrations due to decentration;
an entrance surface through which a light beam from said observation image enters said first prism; and
an exit surface through which the light beam exits from said first prism;
said second prism having three optical surfaces that transmit or reflect a light beam, said three optical surfaces including:
a third surface through which the light beam exiting from said first prism enters said second prism;
a first surface that reflects the light beam entering through said third surface in said second prism;
a second surface that reflects the light beam reflected from said first surface in said second prism; and
said first surface also allowing the light beam reflected from said second surface to exit from said second prism;
wherein at least one of said first surface and said second surface has a curved surface configuration that gives a power to a light beam, said curved surface configuration having a rotationally asymmetric surface configuration that corrects aberrations due to decentration,
wherein an intermediate image surface is formed between the first surface of said second prism and the entrance surface of said first prism.

42. A viewing optical system according to claim 41, wherein both the first surface and second surface of said second prism have rotationally asymmetric surface configurations, respectively, which give a power to a light beam and correct aberrations due to decentration.

43. A viewing optical system according to claim 42, wherein the rotationally asymmetric surface configuration of at least one of the first surface and second surface of said second prism is a plane-symmetry free-form surface having only one plane of symmetry.

44. A viewing optical system according to claim 42, wherein the rotationally asymmetric surface configurations of both the first surface and second surface of said second prism are plane-symmetry free-form surfaces each having only one plane of symmetry.

45. A viewing optical system according to claim 44, wherein the only one plane of symmetry of the plane-symmetry free-form surface that forms the first surface of said second prism and the only one plane of symmetry of the plane-symmetry free-form surface that forms the second surface of said second prism are formed in a same plane.

46. A viewing optical system according to any one of claims 41 to 45, wherein the third surface of said second prism has a rotationally asymmetric surface configuration that gives a power to a light beam and corrects aberrations due to decentration.

47. A viewing optical system according to claim 46, wherein the rotationally asymmetric surface configuration of the third surface of said second prism is a plane-symmetry free-form surface having only one plane of, symmetry.

48. A viewing optical system according to claim 47, wherein the only one plane of symmetry of the plane-symmetry free-form surface that forms the third surface of said second prism is coincident with a plane that connects segments of a folded optical path of an axial principal ray that is formed by reflections in said second prism.

49. A viewing optical system according to any one of claims 41 to 45, wherein the rotationally asymmetric surface configuration of the reflecting surface in said first prism is a plane-symmetry free-form surface having only one plane of symmetry.

50. A viewing optical system according to claim 49, wherein said first prism and said second prism each have at least one plane-symmetry free-form surface having only one plane of symmetry, and the only one plane of symmetry of the at least one plane-symmetry free-form surface in said first prism and that of the at least one plane-symmetry free-form surface in said second prism are placed in a same plane.

51. A viewing optical system according to any one of claims 41 to 45, wherein said first prism has at least two reflecting surfaces each having a curved surface configuration that gives a power to a light beam.

52. A viewing optical system according to claim 51, wherein said first prism is formed from three optical surfaces, which are an exit surface serving as both a reflecting surface and a transmitting surface, a reflecting surface, and an entrance surface.

53. A viewing optical system according to claim 51, wherein said first prism is formed from three optical surfaces, which are an exit surface, a reflecting surface, and an entrance surface serving as both a reflecting surface and a transmitting surface.

54. A viewing optical system according to claim 51, wherein said first prism is formed from four optical surfaces, which are two reflecting surfaces that give a power to a light beam, an entrance surface, and an exit surface.

55. A viewing optical system according to claim 51, wherein the first surface and second surface of said second prism and the two surfaces having a reflecting action in said first prism are rotationally asymmetric surfaces that correct decentration aberrations and each have only one plane of symmetry.

56. A viewing optical system according to claim 55, wherein the first surface and second surface of said second prism and the two surfaces having a reflecting action in said first prism are rotationally asymmetric surfaces that correct decentration aberrations and each have only one plane of symmetry, and the only one plane of symmetry of each of said rotationally asymmetric surfaces is coincident with each other in approximately a same plane.

57. A viewing optical system according to claim 56, wherein all the optical surfaces constituting said first prism and second prism are rotationally asymmetric surfaces that correct decentration aberrations and each have only one plane of symmetry, and the only one plane of symmetry of each of said rotationally asymmetric surfaces is coincident with each other in approximately a same plane.

58. A viewing optical system according to any one of claims 41 to 45, wherein said first prism and said second prism are arranged so that said intermediate image surface is formed between the second surface of said second prism and the exit surface of said first prism.

59. A viewing optical system according to any one of claims 41 to 45, wherein surface configurations of decentration aberration-correcting optical surfaces in said first prism and second prism are arranged so that an exit pupil surface and an observation image surface of said viewing optical system are approximately flat surfaces, and so that the intermediate image surface formed between said exit pupil surface and said observation image surface has a non-planar, curved configuration.

60. A viewing optical system according to any one of claims 41 to 45, wherein a cover member is provided between the first surface of said second prism and the exit pupil to cover said first surface.

61. A viewing optical system according to claim 60, wherein said cover member is a plane-parallel plate that gives no power to a light beam.

62. A viewing optical system according to claim 60, wherein said cover member is a positive lens that converges a light beam.

63. A viewing optical system according to any one of claims 41 to 45, wherein said second prism has a fourth surface placed in an optical path between said third surface and said first surface where the light beam entering said second prism through said third surface travels until it is reflected by said first surface, wherein said third surface allows the light beam exiting from said first prism to enter said second prism; said fourth surface reflects the light beam entering through said third surface in said second prism; said first surface reflects the light beam reflected from said fourth surface in said second prism; said second surface reflects the light beam reflected from said first surface in said second prism; and said first surface allows the light beam reflected from said second surface to exit from said second prism.

64. A viewing optical system according to claim 63, wherein said fourth surface and second surface of said second prism are formed in a same surface, wherein a reflecting area of said same surface that forms said fourth surface is closer to said intermediate image surface than a reflecting area of said same surface that forms said second surface.

65. A viewing optical system according to claim 63, wherein said fourth surface and said second surface have different curved surface configurations.

66. A viewing optical system according to any one of claims 41 to 45, wherein said intermediate image surface is placed on the third surface of said second prism.

67. A viewing optical system according to claim 66, wherein said intermediate image surface is placed on the third surface of said second prism, some area of said intermediate image surface lying inside said second prism, a remaining area of said intermediate image surface projecting outside said second prism.

68. A viewing optical system according to any one of claims 41 to 45, wherein when a decentration direction of said viewing optical system is a Y-axis direction, and a plane parallel to an axial principal ray is a YZ-plane, and further a direction perpendicularly intersecting the YZ-plane is an X-axis direction, the following condition is satisfied:

$$100 < EP/Px < 1000 \quad (1)$$

where EP is a distance from the exit pupil to an exit surface of said second prism, and Px is a power in the X-axis direction of said viewing optical system.

69. A viewing optical system according to any one of claims 41 to 45, wherein when a decentration direction of said viewing optical system is a Y-axis direction, and a plane parallel to an axial principal ray is a YZ-plane, and further a direction perpendicularly intersecting the YZ-plane is an X-axis direction, at least one of the following conditions is satisfied:

$$0.8 < \beta x < 5,$$
$$0.8 < \beta y < 5 \quad (2)$$

where βx and βy are magnifications in the X- and Y-axis directions, respectively, at which an image of an image display device is projected onto a first image-formation plane by said first prism.

70. A viewing optical system according to any one of claims 41 to 45, wherein when a decentration direction of said viewing optical system is a Y-axis direction, and a plane parallel to an axial principal ray is a YZ-plane, and further a direction perpendicularly intersecting the YZ-plane is an X-axis direction, at least one of the following conditions is satisfied:

$$0.2 < Px2/Px < 3,$$
$$0.2 < Py2/Py < 3 \quad (3)$$

where Px2 is a power in the X-axis direction of said second prism; Py2 is a power in the Y-axis direction of said second prism; Px is a power in the X-axis direction of said viewing optical system; and Py is a power in the Y-axis direction of said viewing optical system.

71. A viewing optical system according to any one of claims 41 to 45, wherein when a decentration direction of said viewing optical system is a Y-axis direction, and a plane parallel to an axial principal ray is a YZ-plane, and further a direction perpendicularly intersecting the YZ-plane is an X-axis direction, at least one of the following conditions is satisfied:

$$0.2 < Pxs3/Px < 3,$$
$$0.2 < Pys3/Py < 3 \quad (4)$$

where Pxs3 is a power in the X-axis direction of the second surface of said second prism at a position where the axial principal ray impinges on said second surface; Pys3 is a power in the Y-axis direction of said second surface at said position; Px is a power in the X-axis direction of said viewing optical system; and Py is a power in the Y-axis direction of said viewing optical system.

72. A viewing optical system according to claim 52, wherein when a decentration direction of said viewing optical system is a Y-axis direction, and a plane parallel to an axial principal ray is a YZ-plane, and further a direction perpendicularly intersecting the YZ-plane is an X-axis direction, at least one of the following conditions is satisfied:

$$0 < Pxs9/Px < 5,$$
$$0 < Pys9/Py < 5 \quad (5)$$

where Pxs9 is a power in the X-axis direction of the surface having only a reflecting action in said first prism; Pys9 is a power in the Y-axis direction of the surface having only a reflecting action in said first prism; Px is a power in the X-axis direction of said viewing optical system; and Py is a power in the Y-axis direction of said viewing optical system.

73. A viewing optical system according to claim 53, wherein when a decentration direction of said viewing optical system is a Y-axis direction, and a plane parallel to an axial principal ray is a YZ-plane, and further a direction perpendicularly intersecting the YZ-plane is an X-axis direction, at least one of the following conditions is satisfied:

$$0 < Pxs10/Px < 5,$$
$$0 < Pys10/Py < 5 \quad (6)$$

where Pxs10 is a power in the X-axis direction of the surface having only a reflecting action in said first prism; Pys10 is a power in the Y-axis direction of the surface having only a reflecting action in said first prism; Px is a power in the X-axis direction of said viewing optical system; and Py is a power in the Y-axis direction of said viewing optical system.

74. A viewing optical system according to claim 54, wherein when a decentration direction of said viewing optical system is a Y-axis direction, and a plane parallel to an axial principal ray is a YZ-plane, and further a direction perpendicularly intersecting the YZ-plane is an X-axis direction, at least one of the following conditions is satisfied:

$$-1 < Pxs9/Pxs10 < 2,$$
$$-1 < Pys9/Pys10 < 2 \quad (7)$$

where Pxs9 is a power in the X-axis direction of the reflecting surface of said first prism that is closer to the exit surface; Pys9 is a power in the Y-axis direction of the reflecting surface of said first prism that is closer to the exit surface; Pxs10 is a power in the X-axis direction of the reflecting surface of said first prism that is closer to the entrance surface; and Pys10 is a power in the Y-axis direction of the reflecting surface of said first prism that is closer to the entrance surface.

75. A viewing optical system according to any one of claims 41 to 45, which has a focal length shorter than 12 millimeters.

76. A finder optical system comprising:
the viewing optical system of any one of claims 41 to 45, said viewing optical system being provided as a finder ocular optical system; and
an objective optical system placed in front of said finder ocular optical system to form an observation image to be viewed through said finder ocular optical system.

77. A camera apparatus comprising:
the finder optical system of claim 76; and
an optical system for photography provided in parallel to said finder optical system.

78. An electronic finder optical system comprising:
an electronic image display device for forming an observation image on a display surface thereof; and
the viewing optical system of any one of claims 41 to 45 for viewing the image on the display surface of said image display device.

79. An electronic camera apparatus comprising:
an image-forming optical system;

an image pickup device placed in an image plane formed by said image-forming optical system;

a recording medium for recording image information received by said image pickup device;

an image display device that receives image information from one of said recording medium and said image pickup device to form an image for observation on a display surface thereof; and the viewing optical system of any one of claims 41 to 45 for viewing the image on the display surface of said image display device.

80. An endoscope system comprising:

an observation system having an image-forming optical system and an image transmitting member for transmitting an image formed by said image-forming optical system along a longitudinal axis;

an illumination system having an illuminating light source and an illuminating light transmitting member for transmitting illuminating light from said illuminating light source along the longitudinal axis; and the viewing optical system of any one of claims 41 to 45, said viewing optical system being used to view the image transmitted by the image transmitting member of said observation system.

81. A head-mounted image display apparatus comprising:

an apparatus body unit having an image display device for forming an observation image on an image display area thereof, and the viewing optical system of any one of claims 41 to 45 which is provided as an ocular optical system for viewing said observation image; and a support member arranged to be mounted on a head of an observer to retain said apparatus body unit in front of a face of the observer.

82. A head-mounted image display apparatus according to claim 81, wherein a combination of said image display device and said ocular optical system is provided for each of left and right eyes of the observer to enable the observer to see with his or her two eyes.

* * * * *